(12) United States Patent
Barnes et al.

(10) Patent No.: US 9,451,394 B2
(45) Date of Patent: Sep. 20, 2016

(54) COST-EFFECTIVE MOBILE CONNECTIVITY PROTOCOLS

(71) Applicant: Elwha LLC, Bellevue, WA (US)

(72) Inventors: Philip Lionel Barnes, Seattle, WA (US); Hon Wah Chin, Palo Alto, CA (US); Howard L. Davidson, San Carlos, CA (US); Kimberly D. A. Hallman, Bellevue, WA (US); Roderick A. Hyde, Redmond, WA (US); Muriel Y. Ishikawa, Livermore, CA (US); Jordin T. Kare, Seattle, WA (US); Brian Lee, Redmond, WA (US); Richard T. Lord, Tacoma, WA (US); Robert W. Lord, Seattle, WA (US); Craig J. Mundie, Seattle, WA (US); Nathan P. Myhrvold, Medina, WA (US); Nicholas F. Pasch, Bellevue, WA (US); Eric D. Rudder, Mercer Island, WA (US); Clarence T. Tegreene, Mercer Island, WA (US); Marc Tremblay, Clyde Hill, WA (US); David B. Tuckerman, Lafayette, CA (US); Charles Whitmer, North Bend, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 609 days.

(21) Appl. No.: 13/732,004

(22) Filed: Dec. 31, 2012

(65) Prior Publication Data
US 2014/0187279 A1    Jul. 3, 2014

(51) Int. Cl.
H04W 4/02    (2009.01)
H04L 29/08   (2006.01)
(Continued)

(52) U.S. Cl.
CPC ............... *H04W 4/02* (2013.01); *H04L 47/50* (2013.01); *H04L 67/16* (2013.01); *H04W 4/028* (2013.01); *H04W 4/206* (2013.01); *H04W 4/26* (2013.01); *H04L 67/125* (2013.01); *H04W 4/006* (2013.01); *H04W 4/021* (2013.01)

(58) Field of Classification Search
CPC ....... H04W 8/00; H04W 8/005; H04W 4/02; H04W 4/021; H04W 4/028; H04W 4/006; H04W 4/26; H04W 4/206; H04L 47/50; H04L 67/16; H04L 67/125
USPC ............ 455/422.1, 432.3, 404.2, 456.1, 517, 455/518; 709/227–229
See application file for complete search history.

(56) References Cited

U.S. PATENT DOCUMENTS

| 4,149,146 A | 4/1979 | Ebihara et al. |
| 4,965,738 A | 10/1990 | Bauer et al. |

(Continued)

FOREIGN PATENT DOCUMENTS

| EP | 1544787 A1 | 6/2005 |
| JP | 2004340864 | 2/2004 |

OTHER PUBLICATIONS

U.S. Appl. No. 13/731,907, Barnes et al.
(Continued)

*Primary Examiner* — Raymond Dean
(74) *Attorney, Agent, or Firm* — Suiter Swantz pc llo

(57) ABSTRACT

Structures and protocols are presented for signaling a status or decision concerning a wireless service or device within a region to a network participant or other communication device (smartphone or motor vehicle, e.g.).

13 Claims, 34 Drawing Sheets

(51) Int. Cl.
*H04L 12/863* (2013.01)
*H04W 4/20* (2009.01)
*H04W 4/26* (2009.01)
*H04W 4/00* (2009.01)

(56) References Cited

U.S. PATENT DOCUMENTS

| | | | |
|---|---|---|---|
| 5,390,293 A | 2/1995 | Nishioka et al. |
| 5,568,541 A | 10/1996 | Greene |
| 6,101,378 A | 8/2000 | Barabash et al. |
| 6,119,009 A | 9/2000 | Baranger et al. |
| 6,134,014 A | 10/2000 | Tzu et al. |
| 6,167,398 A | 12/2000 | Wyard et al. |
| 6,353,663 B1 | 3/2002 | Stevens et al. |
| 6,380,910 B1 | 4/2002 | Moustakas et al. |
| 6,424,729 B1 | 7/2002 | Soon |
| 6,629,136 B1 | 9/2003 | Naidoo |
| 6,788,927 B2 | 9/2004 | Pohutsky et al. |
| 6,898,430 B1 | 5/2005 | Liberti et al. |
| 6,934,316 B2 | 8/2005 | Cornwall et al. |
| 6,950,660 B1 | 9/2005 | Hsu et al. |
| 6,958,729 B1 | 10/2005 | Metz |
| 7,149,533 B2 | 12/2006 | Laird et al. |
| 7,218,190 B2 | 5/2007 | Engheta et al. |
| 7,237,261 B1 | 6/2007 | Huber et al. |
| 7,245,913 B1 | 7/2007 | Nguyen et al. |
| 7,254,123 B2 | 8/2007 | Jukarainen |
| 7,260,203 B2 | 8/2007 | Holt et al. |
| 7,305,079 B1 | 12/2007 | Forte |
| 7,344,063 B2 | 3/2008 | Wagner et al. |
| 7,392,017 B2 | 6/2008 | Chu et al. |
| 7,401,243 B2 | 7/2008 | Knepper et al. |
| 7,424,316 B1 | 9/2008 | Boyle |
| 7,443,787 B2 | 10/2008 | Karino et al. |
| 7,477,903 B2 | 1/2009 | Wilcock et al. |
| 7,516,092 B2 | 4/2009 | Upendran et al. |
| 7,519,373 B2 | 4/2009 | Kennedy, Jr. et al. |
| 7,522,992 B2 | 4/2009 | Obradovich et al. |
| 7,567,305 B2 | 7/2009 | Joo |
| 7,590,708 B2 | 9/2009 | Hsu |
| 7,593,812 B2 | 9/2009 | Obradovich et al. |
| 7,644,055 B2 | 1/2010 | Furst et al. |
| 7,646,712 B2 | 1/2010 | Cohen et al. |
| 7,650,319 B2 | 1/2010 | Hoffberg et al. |
| 7,664,720 B1 | 2/2010 | Freeman et al. |
| 7,716,585 B2 | 5/2010 | Glass |
| 7,733,223 B2 | 6/2010 | Levien et al. |
| 7,743,334 B2 | 6/2010 | Rider |
| 7,761,505 B2 | 7/2010 | Krzyzanowski et al. |
| 7,787,693 B2 | 8/2010 | Siegemund |
| 7,787,896 B2 | 8/2010 | Kundu et al. |
| 7,804,954 B2 | 9/2010 | Han et al. |
| 7,813,716 B2 | 10/2010 | Malackowski et al. |
| 7,821,986 B2 | 10/2010 | Thomson et al. |
| 7,831,559 B1 | 11/2010 | Mohan et al. |
| 7,835,314 B2 | 11/2010 | Yee et al. |
| 7,847,739 B2 | 12/2010 | Achour et al. |
| 7,848,292 B2 | 12/2010 | Bl et al. |
| 7,853,268 B2 | 12/2010 | Karaoguz et al. |
| 7,856,137 B2 | 12/2010 | Yonezawa et al. |
| 7,860,648 B2 | 12/2010 | Jung et al. |
| 7,881,992 B1 | 2/2011 | Seaman et al. |
| 7,882,307 B1 | 2/2011 | Wentzlaff et al. |
| 7,886,335 B1 | 2/2011 | Chickering et al. |
| 7,908,518 B2 | 3/2011 | West, Jr. et al. |
| 7,916,071 B2 | 3/2011 | Harper |
| 7,924,927 B1 | 4/2011 | Boesjes |
| 7,925,250 B2 | 4/2011 | Redpath |
| 7,925,995 B2 | 4/2011 | Krumm et al. |
| 7,928,900 B2 | 4/2011 | Fuller et al. |
| 7,930,389 B2 | 4/2011 | Jung et al. |
| 7,949,191 B1 | 5/2011 | Ramkumar et al. |
| 7,957,418 B2 | 6/2011 | Wijayanathan et al. |
| 7,961,076 B2 | 6/2011 | Kelley et al. |
| 7,965,997 B2 | 6/2011 | Sposato et al. |
| 8,000,314 B2 | 8/2011 | Brownrigg et al. |
| 8,000,528 B2 | 8/2011 | Ming et al. |
| 8,004,556 B2 | 8/2011 | Rodman et al. |
| 8,004,971 B1 | 8/2011 | Szabo et al. |
| 8,005,911 B2 | 8/2011 | Jhanji |
| 8,010,230 B2 | 8/2011 | Zini et al. |
| 8,018,856 B2 | 9/2011 | Matityahu et al. |
| 8,024,482 B2 | 9/2011 | Hoogerwerf et al. |
| 8,032,149 B2 | 10/2011 | Kennedy et al. |
| 8,037,126 B2 | 10/2011 | Plamondon |
| 8,045,957 B2 | 10/2011 | Dinh et al. |
| 8,049,664 B2 | 11/2011 | Millard et al. |
| 8,054,856 B2 | 11/2011 | Sala et al. |
| 8,059,011 B2 | 11/2011 | Van Wyk et al. |
| 8,059,650 B2 | 11/2011 | Shetty et al. |
| 8,059,788 B2 | 11/2011 | Allen, Jr. et al. |
| 8,060,017 B2 | 11/2011 | Schlicht et al. |
| 8,065,357 B2 | 11/2011 | Cocotis et al. |
| 8,065,404 B2 | 11/2011 | Jung et al. |
| 8,068,836 B2 | 11/2011 | Voyer et al. |
| 8,069,275 B2 | 11/2011 | Peck et al. |
| 8,072,291 B2 | 12/2011 | Itoh et al. |
| 8,081,138 B2 | 12/2011 | Wu et al. |
| 8,082,576 B2 | 12/2011 | Flynn et al. |
| 8,086,239 B2 | 12/2011 | Elmaleh |
| 8,094,009 B2 | 1/2012 | Allen et al. |
| 8,095,508 B2 | 1/2012 | Chamberlain et al. |
| 8,098,753 B2 | 1/2012 | Feher |
| 8,104,892 B2 | 1/2012 | Hillis et al. |
| 8,108,145 B2 | 1/2012 | Karaoguz et al. |
| 8,108,501 B2 | 1/2012 | Birnie et al. |
| 8,111,622 B2 | 2/2012 | Cohen et al. |
| 8,121,648 B2 | 2/2012 | Kezys |
| 8,125,896 B2 | 2/2012 | Cohen et al. |
| 8,126,867 B2 | 2/2012 | Jung et al. |
| 8,145,219 B2 | 3/2012 | Karaoguz et al. |
| 8,145,566 B1 | 3/2012 | Ahuja et al. |
| 8,145,975 B2 | 3/2012 | Lin et al. |
| 8,149,113 B2 | 4/2012 | Diem |
| 8,150,796 B2 | 4/2012 | Jung et al. |
| 8,155,077 B2 | 4/2012 | Grayson |
| 8,160,304 B2 | 4/2012 | Rhoads et al. |
| 8,161,542 B2 | 4/2012 | Tiwari |
| 8,165,091 B2 | 4/2012 | Nix |
| 8,165,600 B2 | 4/2012 | Walter |
| 8,166,237 B1 | 4/2012 | Atsatt et al. |
| 8,169,311 B1 | 5/2012 | Breed |
| 8,180,328 B2 | 5/2012 | Van De Groenendaal |
| 8,184,580 B2 | 5/2012 | Wilhelmsson et al. |
| 8,184,656 B2 | 5/2012 | Chandra et al. |
| 8,185,122 B2 | 5/2012 | Guill, Jr. |
| 8,185,137 B2 | 5/2012 | Berns et al. |
| 8,190,699 B2 | 5/2012 | McMillian et al. |
| 8,195,198 B1 | 6/2012 | Shaw et al. |
| 8,195,478 B2 | 6/2012 | Petersen et al. |
| 8,199,654 B2 | 6/2012 | Francisco et al. |
| 8,200,243 B1 | 6/2012 | Feher |
| 8,204,966 B1 | 6/2012 | Mendis et al. |
| 8,205,037 B2 | 6/2012 | Swing et al. |
| 8,205,066 B2 | 6/2012 | Brewer et al. |
| 8,208,489 B2 | 6/2012 | Hong et al. |
| 8,208,940 B2 | 6/2012 | Noldus et al. |
| 8,209,400 B2 | 6/2012 | Baum et al. |
| 8,219,312 B2 | 7/2012 | Davidson et al. |
| 8,223,012 B1 | 7/2012 | Diem |
| 8,223,694 B2 | 7/2012 | Jayapalan et al. |
| 8,223,752 B2 | 7/2012 | Low et al. |
| 8,224,349 B2 | 7/2012 | Meredith et al. |
| 8,225,081 B2 | 7/2012 | Aldereguia et al. |
| 8,230,516 B2 | 7/2012 | Davison et al. |
| 8,233,471 B2 | 7/2012 | Brownrigg et al. |
| 8,234,262 B2 | 7/2012 | Jung et al. |
| 8,234,523 B2 | 7/2012 | Bharadwaj et al. |
| 8,238,869 B2 | 8/2012 | Brayton |
| 8,243,887 B2 | 8/2012 | Conahan |
| 8,244,228 B1 | 8/2012 | Sutardja |
| 8,248,968 B2 | 8/2012 | Handforth et al. |
| 8,249,256 B2 | 8/2012 | Korus et al. |
| 8,249,616 B2 | 8/2012 | Boejer et al. |

(56) References Cited

U.S. PATENT DOCUMENTS

| | | |
|---|---|---|
| 8,259,822 B1 | 9/2012 | Feher |
| 8,260,896 B2 | 9/2012 | Trevino et al. |
| 8,264,953 B2 | 9/2012 | Licardie et al. |
| 8,265,655 B2 | 9/2012 | Khushu |
| 8,269,618 B2 | 9/2012 | Murray et al. |
| 8,271,626 B2 | 9/2012 | Childers et al. |
| 8,279,838 B2 | 10/2012 | Chou et al. |
| 8,280,913 B2 | 10/2012 | Bergin |
| 8,284,100 B2 | 10/2012 | Vartanian et al. |
| 8,289,210 B2 | 10/2012 | Thomson et al. |
| 8,290,509 B2 | 10/2012 | Jung et al. |
| 8,290,551 B2 | 10/2012 | Landesman et al. |
| 8,294,396 B2 | 10/2012 | Wichowski |
| 8,295,352 B2 | 10/2012 | Leprovost et al. |
| 8,295,395 B2 | 10/2012 | Mueck et al. |
| 8,295,853 B2 | 10/2012 | Heikkila et al. |
| 8,299,967 B2 | 10/2012 | Xu et al. |
| 8,300,532 B1 | 10/2012 | Venkatramani et al. |
| 8,300,575 B2 | 10/2012 | Willars |
| 8,301,159 B2 | 10/2012 | Hamynen et al. |
| 8,301,375 B2 | 10/2012 | Chiayee et al. |
| 8,301,564 B2 | 10/2012 | Mon et al. |
| 8,306,005 B1 | 11/2012 | Gurin |
| 8,306,518 B1 | 11/2012 | Gailloux et al. |
| 8,311,035 B2 | 11/2012 | Bossler et al. |
| 8,311,509 B2 | 11/2012 | Feher |
| 8,311,513 B1 | 11/2012 | Nasserbakht et al. |
| 8,311,532 B2 | 11/2012 | Waller |
| 8,311,579 B2 | 11/2012 | Rofougaran et al. |
| 8,315,203 B2 | 11/2012 | Ashley, Jr. et al. |
| 8,315,622 B2 | 11/2012 | Rofougaran |
| 8,316,394 B2 | 11/2012 | Yates |
| 8,316,435 B1 | 11/2012 | Varadhan et al. |
| 8,320,261 B2 | 11/2012 | Vasamsetti et al. |
| 8,321,727 B2 | 11/2012 | D'Abreu et al. |
| 8,325,901 B1 | 12/2012 | Dolan et al. |
| 8,327,117 B2 | 12/2012 | Smilg et al. |
| 8,327,431 B2 | 12/2012 | Trojanowski |
| 8,340,476 B2 | 12/2012 | Cohen et al. |
| 8,340,578 B2 | 12/2012 | Tolentino et al. |
| 8,341,469 B2 | 12/2012 | Miyama et al. |
| 8,346,282 B1 | 1/2013 | Dronamraju et al. |
| 8,346,879 B2 | 1/2013 | Meunier et al. |
| 8,352,872 B2 | 1/2013 | Fish |
| 8,358,975 B2 | 1/2013 | Bahl et al. |
| 8,369,871 B1 | 2/2013 | Izdepski et al. |
| 8,378,815 B1 | 2/2013 | Mcnulty et al. |
| 8,380,188 B2 | 2/2013 | Ramachandra Rao et al. |
| 8,391,930 B1 | 3/2013 | Delker et al. |
| 8,406,753 B2 | 3/2013 | Alles et al. |
| 8,412,590 B2 | 4/2013 | Elliott |
| 8,412,946 B2 | 4/2013 | Savitzky et al. |
| 8,417,215 B2 | 4/2013 | Baldus et al. |
| 8,423,046 B2 | 4/2013 | Phillips |
| 8,442,482 B2 | 5/2013 | Maier et al. |
| 8,447,352 B2 | 5/2013 | Forte |
| 8,689,021 B1 | 4/2014 | Bai et al. |
| 8,729,977 B2 | 5/2014 | Filipovic et al. |
| 8,755,821 B2 | 6/2014 | Brisebois et al. |
| 8,810,452 B2 | 8/2014 | Bull |
| 9,143,530 B2 | 9/2015 | Qureshi et al. |
| 2002/0147002 A1 | 10/2002 | Trop et al. |
| 2003/0013449 A1* | 1/2003 | Hose ............... G08G 1/207 455/440 |
| 2003/0021263 A1 | 1/2003 | Lee |
| 2003/0032404 A1* | 2/2003 | Wager ............... H04L 41/12 455/406 |
| 2003/0061503 A1 | 3/2003 | Katz et al. |
| 2003/0076904 A1* | 4/2003 | Magee ............... G06F 17/142 375/340 |
| 2003/0083988 A1 | 5/2003 | Reith |
| 2003/0096591 A1 | 5/2003 | Pohutsky et al. |
| 2003/0118015 A1 | 6/2003 | Gunnarsson et al. |
| 2003/0128115 A1 | 7/2003 | Giacopelli et al. |
| 2003/0143986 A1 | 7/2003 | Mufti et al. |
| 2003/0220107 A1 | 11/2003 | Lioy et al. |
| 2004/0006477 A1* | 1/2004 | Craner ............... G10L 15/26 704/275 |
| 2004/0023669 A1 | 2/2004 | Reddy |
| 2004/0063451 A1 | 4/2004 | Bonta et al. |
| 2004/0123159 A1 | 6/2004 | Kerstens et al. |
| 2004/0132427 A1 | 7/2004 | Lee et al. |
| 2004/0174927 A1 | 9/2004 | Cooper |
| 2004/0176024 A1 | 9/2004 | Hsu et al. |
| 2004/0192342 A1 | 9/2004 | Ranganathan |
| 2004/0203718 A1 | 10/2004 | Knauerhase et al. |
| 2004/0222834 A1 | 11/2004 | Frans et al. |
| 2005/0048965 A1 | 3/2005 | Ebata |
| 2005/0059400 A1 | 3/2005 | Jagadeesan et al. |
| 2005/0181728 A1 | 8/2005 | Hansen et al. |
| 2005/0190902 A1 | 9/2005 | Benco et al. |
| 2005/0195759 A1 | 9/2005 | Hosein et al. |
| 2006/0004942 A1 | 1/2006 | Hetherington et al. |
| 2006/0035605 A1* | 2/2006 | Ozluturk ............. H01Q 21/29 455/101 |
| 2006/0069916 A1 | 3/2006 | Jenisch et al. |
| 2006/0072527 A1 | 4/2006 | Beck et al. |
| 2006/0094414 A1 | 5/2006 | Miyake et al. |
| 2006/0111112 A1 | 5/2006 | Maveddat |
| 2006/0116127 A1 | 6/2006 | Wilhoite et al. |
| 2006/0171364 A1 | 8/2006 | Bosch et al. |
| 2006/0171523 A1 | 8/2006 | Greenwell |
| 2006/0205400 A1 | 9/2006 | Kiyomoto |
| 2007/0008928 A1 | 1/2007 | Kezys |
| 2007/0082677 A1 | 4/2007 | Hart et al. |
| 2007/0111714 A1 | 5/2007 | Edwards |
| 2007/0157041 A1 | 7/2007 | Youngs |
| 2007/0220589 A1 | 9/2007 | Salowey et al. |
| 2007/0267491 A1 | 11/2007 | Muto et al. |
| 2008/0022354 A1 | 1/2008 | Grewal et al. |
| 2008/0026704 A1 | 1/2008 | Maeda et al. |
| 2008/0031307 A1 | 2/2008 | Fukuoka et al. |
| 2008/0039132 A1 | 2/2008 | Delibie et al. |
| 2008/0107051 A1 | 5/2008 | Chen |
| 2008/0113692 A1 | 5/2008 | Zhao et al. |
| 2008/0137545 A1 | 6/2008 | Shiue et al. |
| 2008/0167045 A1 | 7/2008 | Lee et al. |
| 2008/0214155 A1 | 9/2008 | Ramer et al. |
| 2008/0258981 A1 | 10/2008 | Achour et al. |
| 2008/0267069 A1 | 10/2008 | Thielman et al. |
| 2008/0280590 A1 | 11/2008 | Ward |
| 2008/0310340 A1 | 12/2008 | Isozu |
| 2009/0043626 A1 | 2/2009 | Choi et al. |
| 2009/0068984 A1 | 3/2009 | Burnett |
| 2009/0110113 A1 | 4/2009 | Wu et al. |
| 2009/0222539 A1* | 9/2009 | Lewis ............... G06F 19/322 709/221 |
| 2009/0227229 A1 | 9/2009 | Waller |
| 2009/0252263 A1 | 10/2009 | Liu et al. |
| 2009/0268640 A1 | 10/2009 | Tsai et al. |
| 2009/0276570 A1 | 11/2009 | Cheng et al. |
| 2009/0316612 A1 | 12/2009 | Poilasne et al. |
| 2009/0325601 A1 | 12/2009 | Park et al. |
| 2010/0030831 A1* | 2/2010 | Standfield ............ G06F 17/142 708/404 |
| 2010/0046358 A1 | 2/2010 | van Nee |
| 2010/0071038 A1 | 3/2010 | Flynn et al. |
| 2010/0201516 A1 | 8/2010 | Gelvin et al. |
| 2010/0203863 A1 | 8/2010 | Kapelushnik et al. |
| 2010/0216491 A1 | 8/2010 | Winkler et al. |
| 2010/0273487 A1 | 10/2010 | Alonso-Rubio et al. |
| 2010/0291863 A1 | 11/2010 | Hsu et al. |
| 2010/0303182 A1 | 12/2010 | Daneshrad et al. |
| 2010/0305931 A1 | 12/2010 | Fordham |
| 2011/0029236 A1 | 2/2011 | Zhou |
| 2011/0034176 A1 | 2/2011 | Lord et al. |
| 2011/0034179 A1 | 2/2011 | David et al. |
| 2011/0081890 A1 | 4/2011 | Ahmadvand et al. |
| 2011/0082621 A1 | 4/2011 | Berkobin et al. |
| 2011/0136507 A1 | 6/2011 | Hauser et al. |
| 2011/0171977 A1 | 7/2011 | Putkiranta |
| 2011/0173312 A1 | 7/2011 | Robin |
| 2011/0191205 A1 | 8/2011 | Enmei |
| 2011/0201318 A1 | 8/2011 | Kobylarz |

(56) References Cited

U.S. PATENT DOCUMENTS

| | | |
|---|---|---|
| 2011/0202879 A1 | 8/2011 | Stovicek et al. |
| 2011/0227925 A1 | 9/2011 | De Pauw et al. |
| 2011/0263220 A1 | 10/2011 | Bot |
| 2011/0275366 A1 | 11/2011 | Russell et al. |
| 2011/0298669 A1 | 12/2011 | Rao et al. |
| 2011/0321130 A1 | 12/2011 | Tor et al. |
| 2011/0321152 A1 | 12/2011 | Tor et al. |
| 2012/0005323 A1* | 1/2012 | Li ................ H04L 65/1026 709/223 |
| 2012/0008570 A1 | 1/2012 | Li et al. |
| 2012/0054468 A1 | 3/2012 | Egger et al. |
| 2012/0056720 A1 | 3/2012 | Barvick et al. |
| 2012/0069131 A1 | 3/2012 | Abelow |
| 2012/0083291 A1 | 4/2012 | Thomson et al. |
| 2012/0148043 A1 | 6/2012 | Tofighbakhsh |
| 2012/0159090 A1 | 6/2012 | Andrews et al. |
| 2012/0202454 A1 | 8/2012 | Smith et al. |
| 2012/0240197 A1 | 9/2012 | Tran et al. |
| 2012/0249284 A1 | 10/2012 | Almquist et al. |
| 2012/0256702 A1 | 10/2012 | Khlat et al. |
| 2012/0257527 A1 | 10/2012 | Jorgensen |
| 2012/0281526 A1 | 11/2012 | Singamsetty et al. |
| 2012/0281558 A1 | 11/2012 | Anderson et al. |
| 2012/0282890 A1 | 11/2012 | Gaikwad et al. |
| 2012/0297202 A1 | 11/2012 | Gallet et al. |
| 2012/0329447 A1 | 12/2012 | Gilbert et al. |
| 2012/0331537 A1 | 12/2012 | Flynn et al. |
| 2013/0007488 A1 | 1/2013 | Jo |
| 2013/0022030 A1 | 1/2013 | Hillier |
| 2013/0023235 A1 | 1/2013 | Fan et al. |
| 2013/0031631 A1 | 1/2013 | Waltermann et al. |
| 2013/0093460 A1 | 4/2013 | Voogel et al. |
| 2013/0103939 A1 | 4/2013 | Radpour |
| 2013/0106892 A1 | 5/2013 | Davis et al. |
| 2013/0107748 A1 | 5/2013 | Dravida et al. |
| 2013/0133023 A1 | 5/2013 | Burstein et al. |
| 2013/0140649 A1 | 6/2013 | Rogers et al. |
| 2013/0157688 A1 | 6/2013 | Kateley et al. |
| 2013/0179681 A1 | 7/2013 | Benson et al. |
| 2013/0339771 A1 | 12/2013 | Ryu |
| 2014/0018110 A1 | 1/2014 | Yoakum |
| 2014/0066074 A1 | 3/2014 | Folke et al. |
| 2014/0068717 A1 | 3/2014 | Mayes et al. |
| 2014/0122689 A1 | 5/2014 | Park et al. |
| 2014/0143629 A1 | 5/2014 | Hassan et al. |
| 2014/0173733 A1 | 6/2014 | Ford |
| 2015/0237596 A1 | 8/2015 | Carlsson et al. |
| 2015/0271759 A1 | 9/2015 | Abraham et al. |

OTHER PUBLICATIONS

"Android rooting"; Wikipedia, the free encyclopedia; bearing a date of Jun. 10, 2013; printed on Jun. 13, 2013; pp. 1-6; located at: http://en.wikipedia.org/wiki/Android_rooting.
"Computer architecture"; Wikipedia, the free encyclopedia; bearing a date of Jun. 12, 2013; printed on Jun. 13, 2013; pp. 1-7; located at: http://en.wikipedia.org/wiki/Computer_architecture.
"High-level programming language"; Wikipedia, the free encyclopedia; bearing a date of Jun. 13, 2013; printed on Jun. 13, 2013; pp. 1-4; located at: http://en.wikipedia.org/wiki/High-level_programming_language.
Hussain, Faisal; "How to ROOT Samsung Galaxy S3 for AT&T, Sprint, and T-Mobile"; WonderHowTo; printed on Jun. 13, 2013; pp. 1-3; located at: http://gs3.wonderhowto.com/how-to/root-samsung-galaxy-s3-for-at-t-spring-and-t-mobile-014229/.
"Instructions per second"; Wikipedia, the free encyclopedia; bearing a date of Jun. 2, 2013; printed on Jun. 13, 2013; pp. 1-8; located at: http://en.wikipedia.org/wiki/Instructions_per_second.
"iOS jailbreaking"; Wikipedia, the free encyclopedia; bearing a date of Jun. 8, 2013; printed on Jun. 13, 2013; pp. 1-13; located at: http://en.wikipedia.org/wiki/IOS_jailbreaking.
Khalid, Hamza; "How to Jailbreak (Unlock) Samsung Focus [Guide]"; AddictiveTips; Jul. 21, 2011; printed on Jun. 13, 2013; pp. 1-4; located at: http://www.addictivetips.com/mobile/how-to-jailbreak-unlock-samsung-focus-guide/.
"Logic gate"; Wikipedia, the free encyclopedia; bearing a date of Jun. 9, 2013; printed on Jun. 13, 2013; pp. 1-9; located at: http://en.wikipedia.org/wiki/Logic_gate.
"Natural language"; Wikipedia, the free encyclopedia; bearing a date of May 9, 2013; printed on Jun. 13, 2013; pp. 1-5; located at: http://en.wikipedia.org/wiki/Natural_language.
Page, Sebastien; "The Difference Between Jailbreaking and Unlocking"; iDownloadBlog; Jul. 10, 2009; printed on Jun. 13, 2013; pp. 1-5; located at: http://www.idownloadblog.com/2009/07/10/difference-jailbreaking-unlocking/.
"PlayStation Jailbreak"; Wikipedia, the free encyclopedia; bearing a date of May 11, 2013; printed on Jun. 13, 2013; located at: http://en.wikipedia.org/wiki/PlayStation_Jailbreak.
"Rooting vs Jailbreak"; AndroidCentral.com; Feb. 25, 2012; printed on Jun. 13, 2013; pp. 1-6; located at: http://forums.androidcentral.com/t-mobile-galaxy-s-ii/158273-rooting-us-jailbreak.html.
PCT International Search Report; International App. No. PCT/US13/78330; Apr. 23, 2014; pp. 1-2.
PCT International Search Report; International App. No. PCT/US13/78343; Apr. 17, 2014; pp. 1-3.
PCT International Search Report; International App. No. PCT/US13/78349; Apr. 17, 2014; pp. 1-2.
U.S. Appl. No. 13/371,988, Davis et al.
U.S. Appl. No. 12/925,511, Bowers et al.
U.S. Appl. No. 12/220,703, Bowers et al.
U.S. Appl. No. 12/156,443, Bowers et al.
U.S. Appl. No. 11/252,206, Cohen et al.
U.S. Appl. No. 11/221,421, Cohen et al.
U.S. Appl. No. 11/221,396, Cohen et al.
"20 Myths of Wi-Fi Interference"; Cisco Spectrum Expert, Cisco Systems; printed on Dec. 3, 2012; pp. 1-6; located at: http://www.cisco.com/en/US/prod/collateral/wireless/ps9391/ps9393/ps9394/prod_white_paper0900aecd807395a9.html.
"Google Talk"; Wikipedia, the free encyclopedia; bearing a date of Nov. 10, 2012, printed on Nov. 26, 2012; pp. 1-10; located at: http://en.wikipedia.org/wiki/Google_talk.
"Google Voice"; Wikipedia, the free encyclopedia; bearing a date of Nov. 11, 2012, printed on Nov. 26, 2012; pp. 1-13; located at: http://en.wikipedia.org/wiki/Google_voice.
"Make a computer to computer voice or video chat"; Google Chat Help; bearing a date of 2012, printed on Nov. 26, 2012; pp. 1-2; located at: http://support.google.com/chat/bin/answer.py?hl=en&answer=161986.
"Meraki WiFi Stumbler"; Cisco Systems, Inc.; printed on Feb. 7, 2013; pp. 1-5; located at: http://www.meraki.com/products/wireless/wifi-stumbler#faq:what_is_wifi_stumbler.
"Metamaterial antenna"; Wikipedia, the free encyclopedia; bearing a date of Jan. 6, 2013, printed on Feb. 7, 2013; pp. 1-24; located at: http://en.wikipedia.org/wiki/Metamaterial_antenna.
"Tunable metamaterials"; Wikipedia, the free encyclopedia; bearing a date of Jan. 28, 2013, printed on Feb. 7, 2013; pp. 1-13; located at: http://en.wikipedia.org/wiki/Tunable_metamaterials.
"Wireless LAN"; Wikipedia, the free encyclopedia; bearing a date of Dec. 2, 2012, printed on Dec. 3, 2012; pp. 1-7; located at: http://en.wikipedia.org/wiki/Wireless_lan.
"Comcast to Boost Neighborhood Wi-Fi"; Zacks Equity Research, Analyst Blog; bearing a date of Jun. 11, 2013; printed on Jun. 19, 2013; pp. 1-3; located at: http://www.zacks.com/stock/news/101334/comcast-to-boost-neighborhood-wifi.
"Comcast Unveils Plans for Millions of Xfinity WiFi Hotspots"; Comcast; bearing a date of Jun. 10, 2013; printed on Jun. 19, 2013; pp. 1-2; Washington, D.C. and Philadelphia, PA; located at: http://corporate.comcast.com/news-information/news-feed/comcast-unveils-plans-for-millions-of-xfinity-wifi-hotspots-through-its-home-based-neighborhood-hotspot-initiative-2.
"How it works"; Fon Ltd.; printed on Jun. 19, 2013; pp. 1-4; located at: http://corp.fon.com/how-it-works.
"The all-new AirPort Time Capsule"; Apple—Mac; printed on Jun. 19, 2013; pp. 1-6; located at: http://www.apple.com/airport-time-capsule/.
Howard Forums Mobile Community, Thread: 3026; Dec. 21, 2011; accessed May 14, 2014; located at: www.howardforums.com/showthread.php/1747000-3026.
European Patent Office, Supplementary European Search Report, Pursuant to Rule 62 EPC; App. No. EP 13867549; May 11, 2016 (received by our Agent on Jun. 6, 2016); 1 page.

* cited by examiner

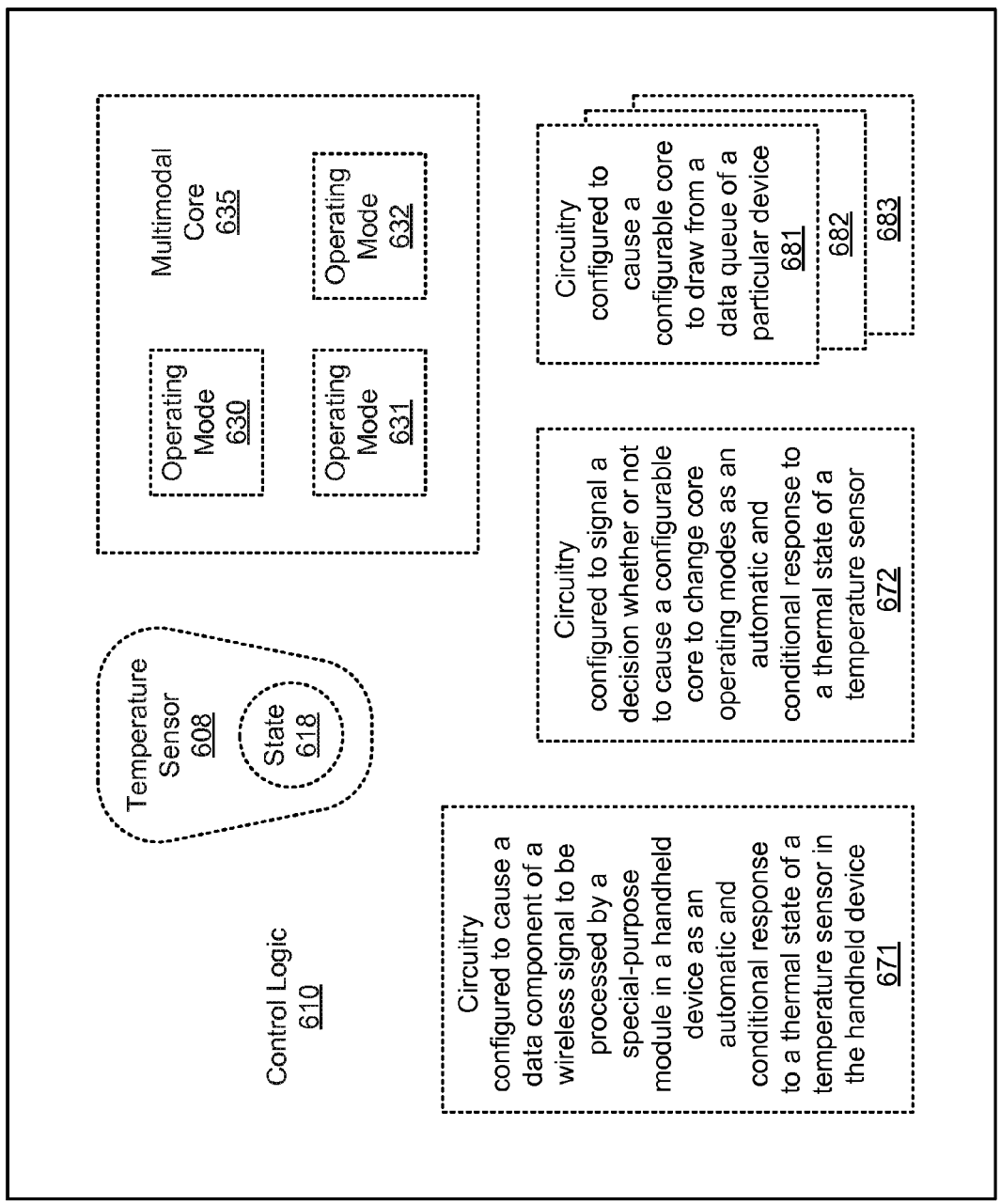

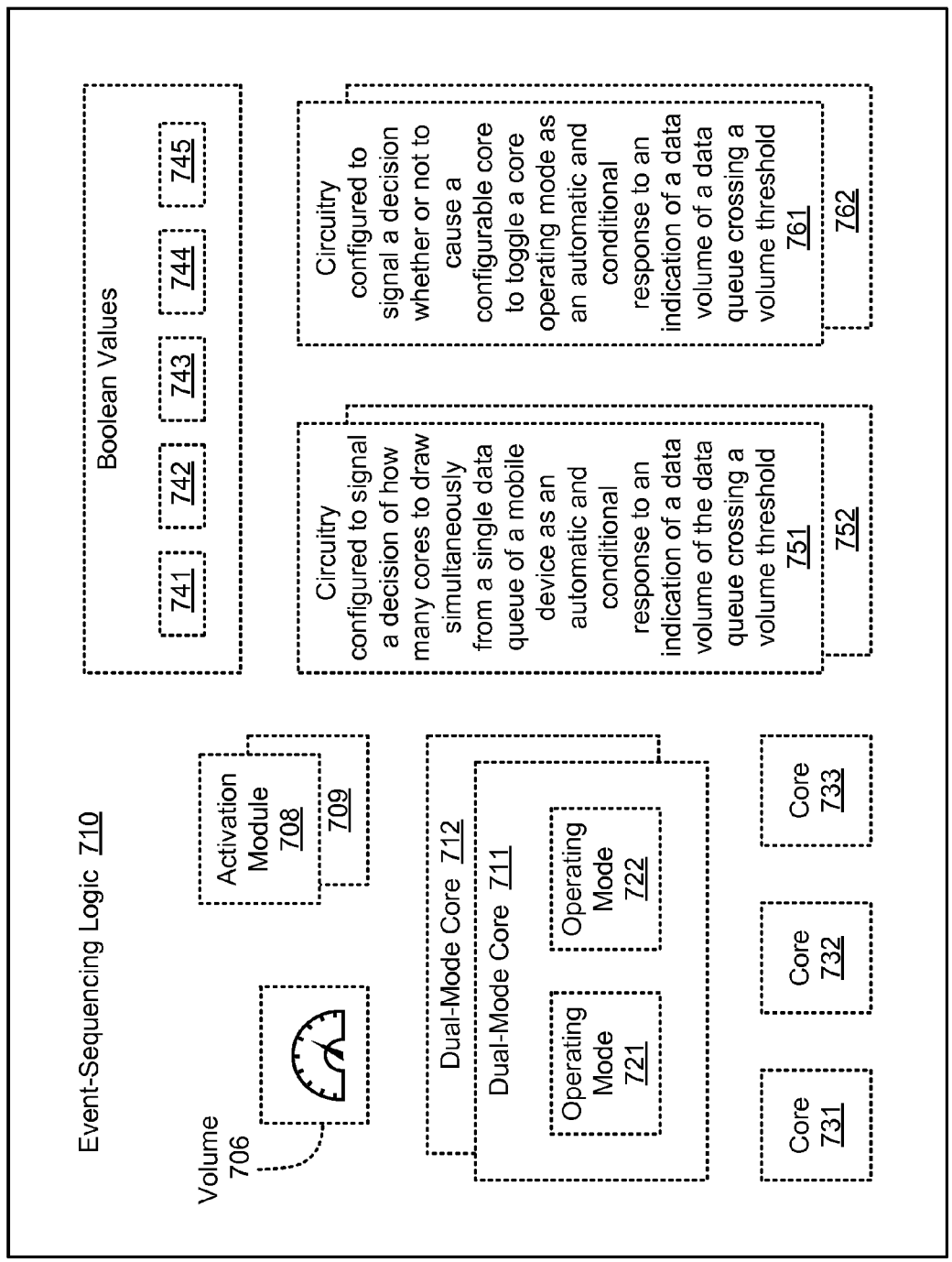

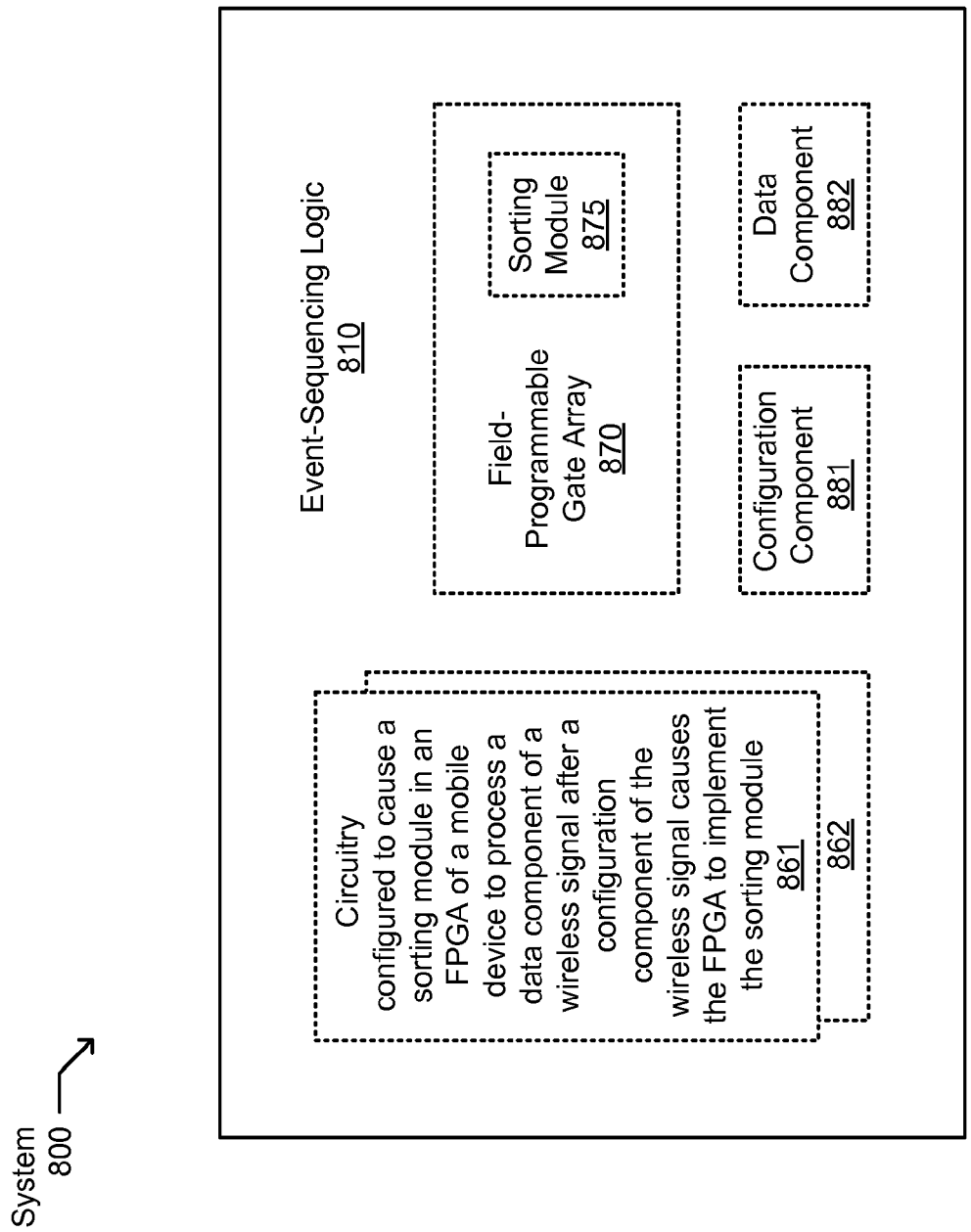

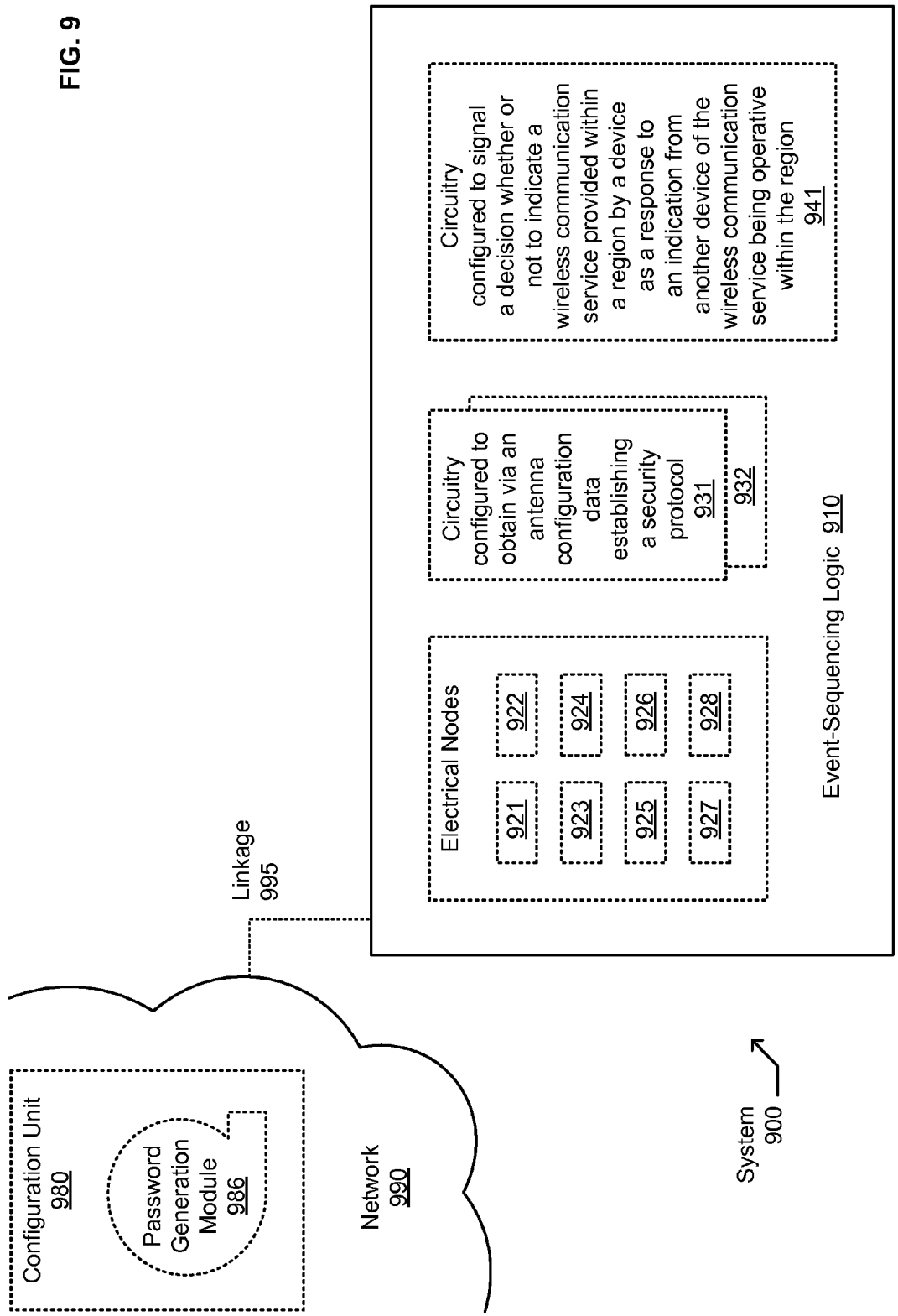

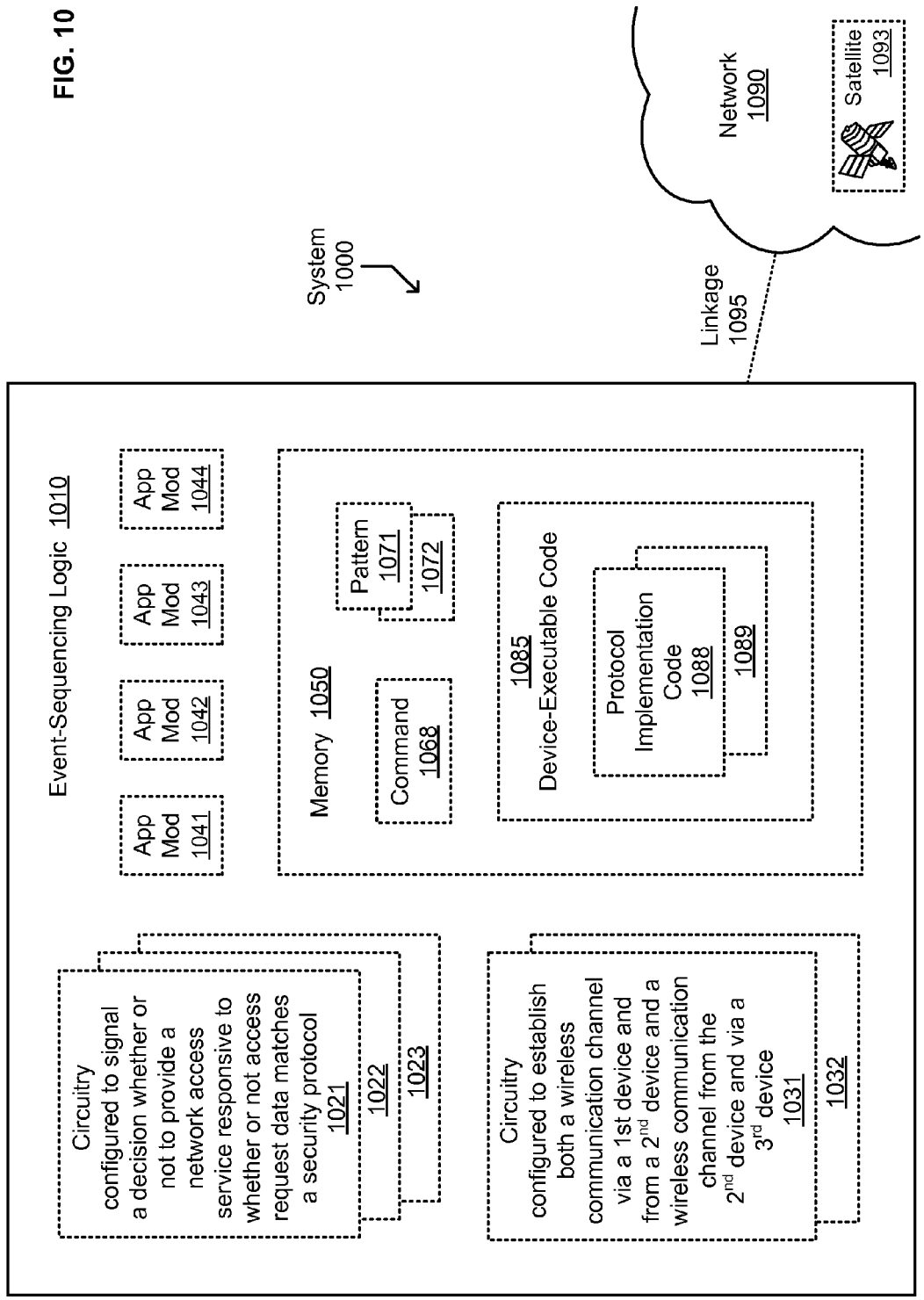

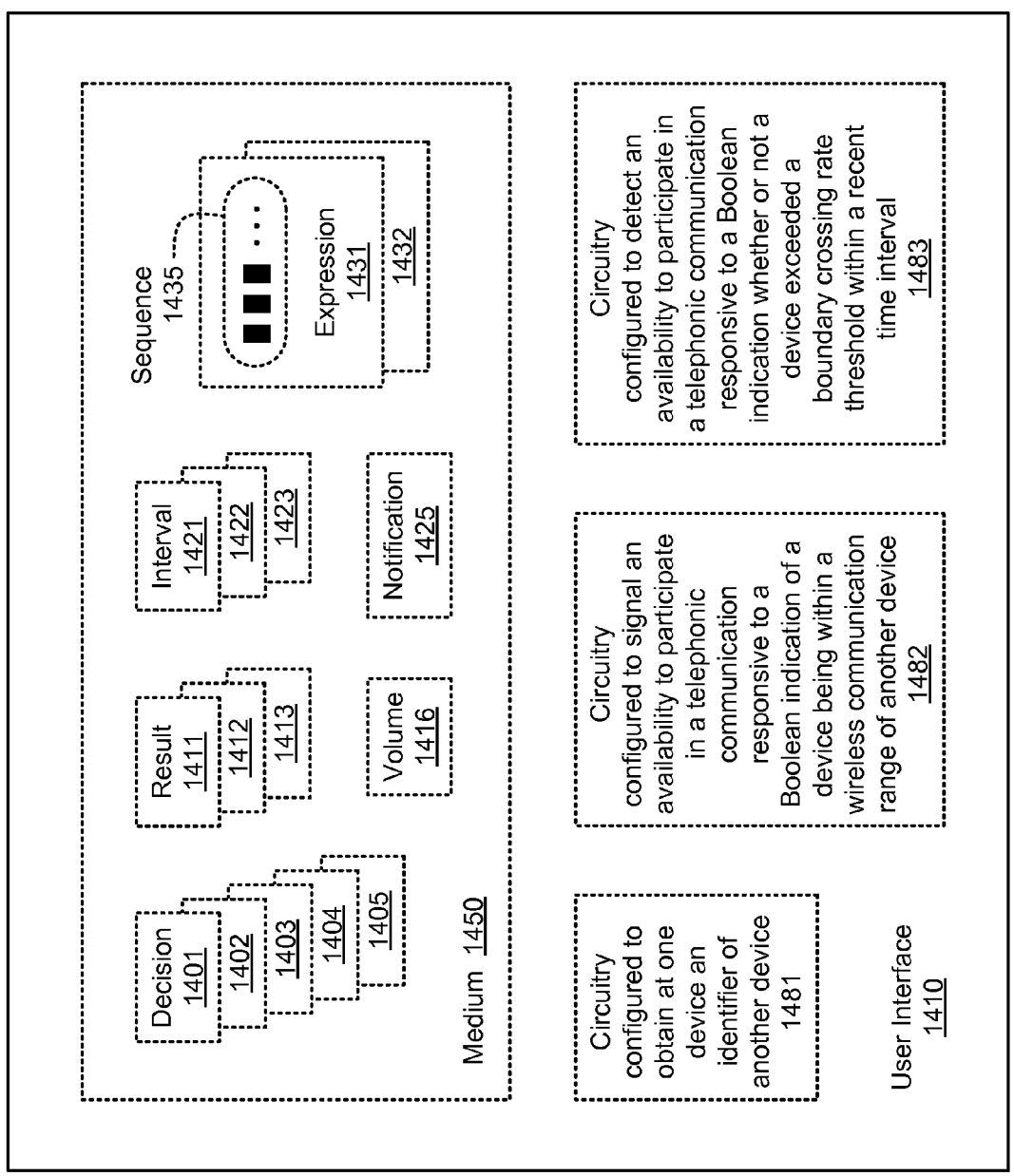

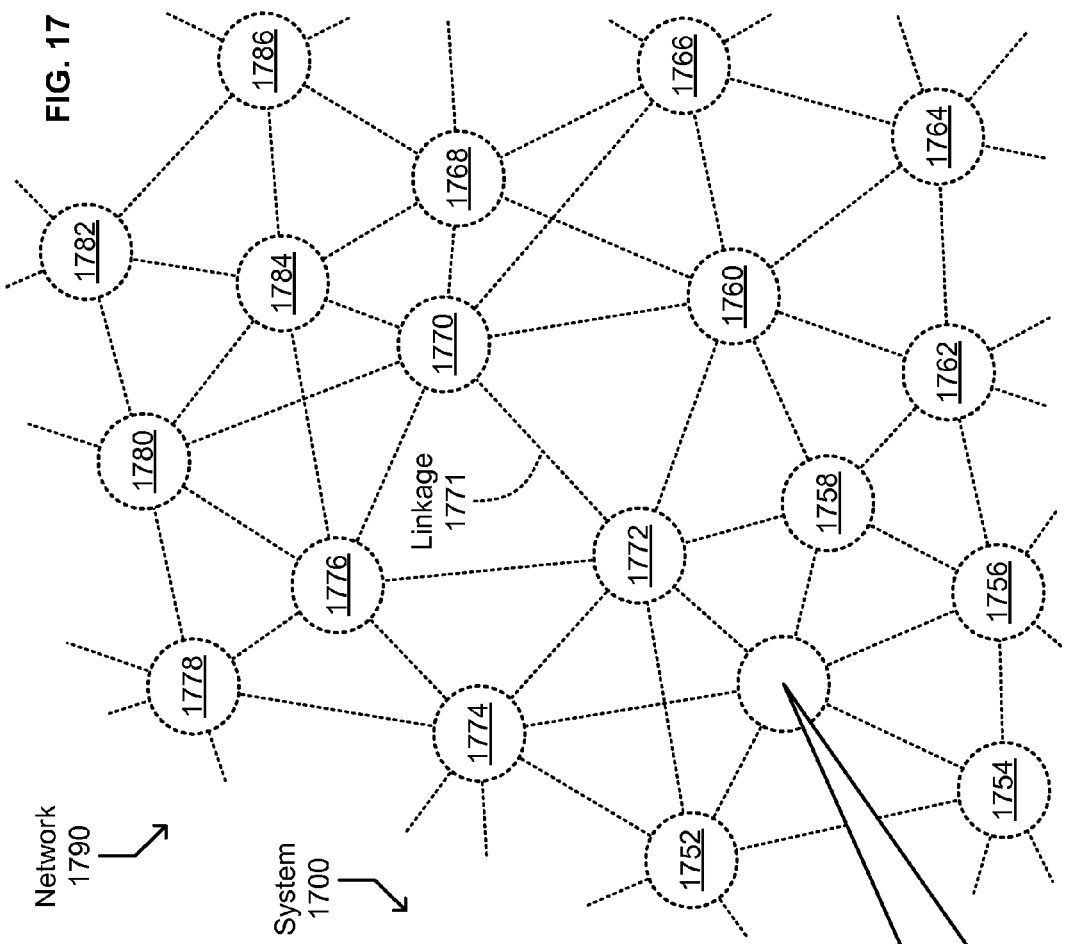
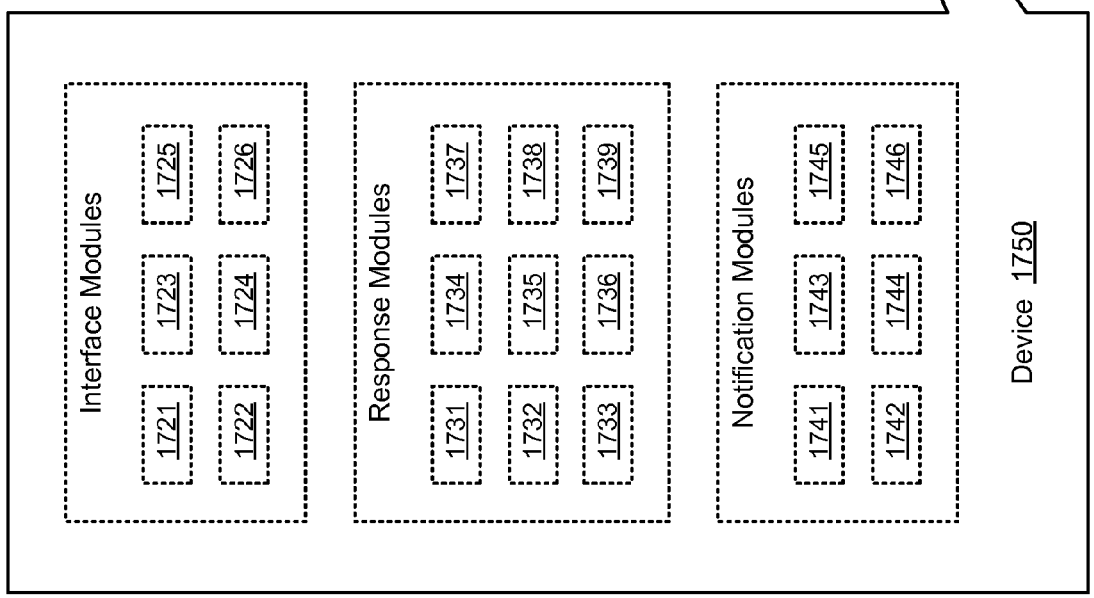
FIG. 17

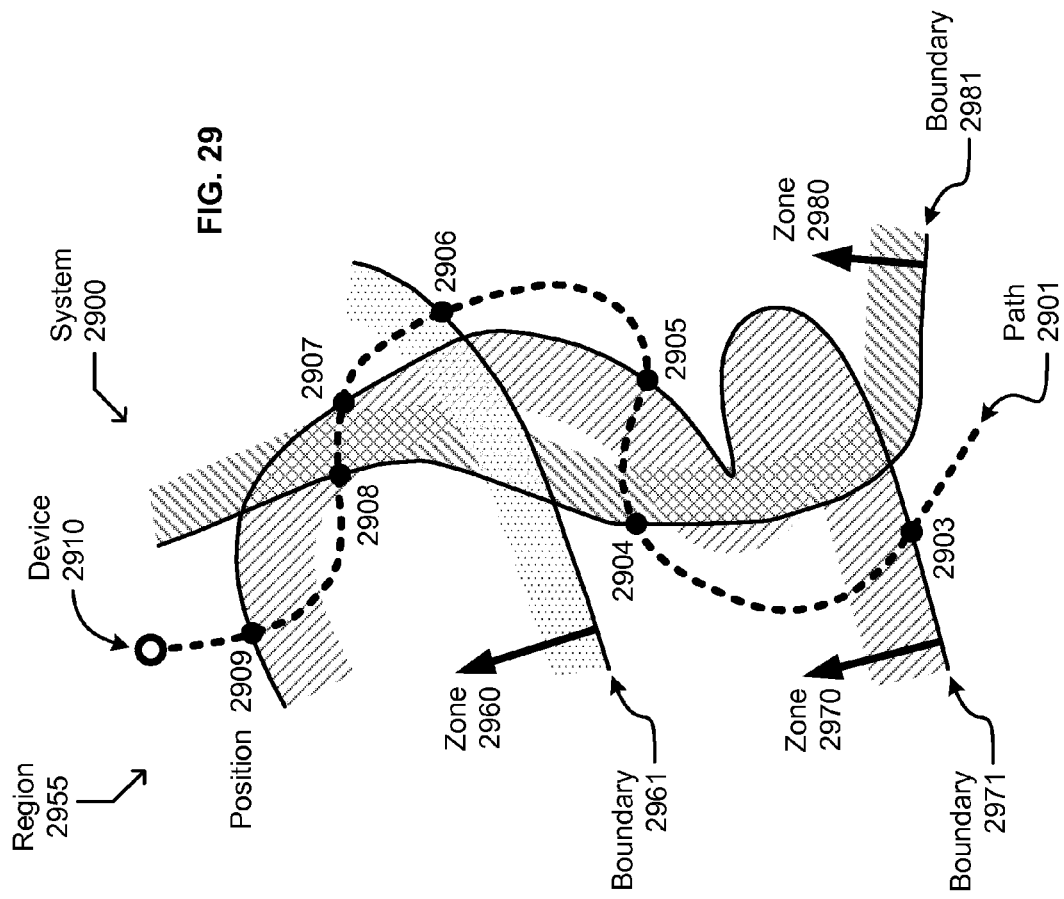

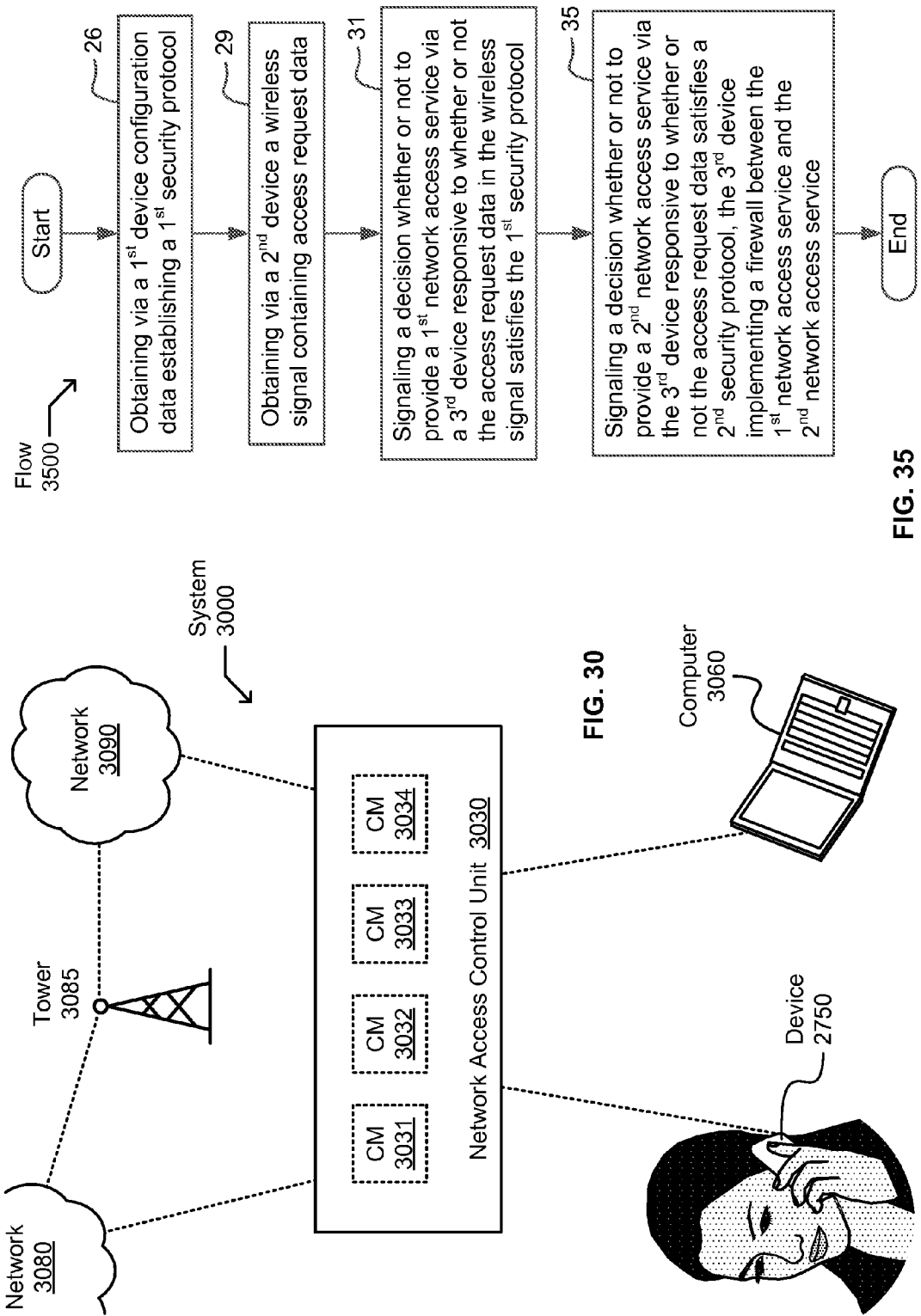

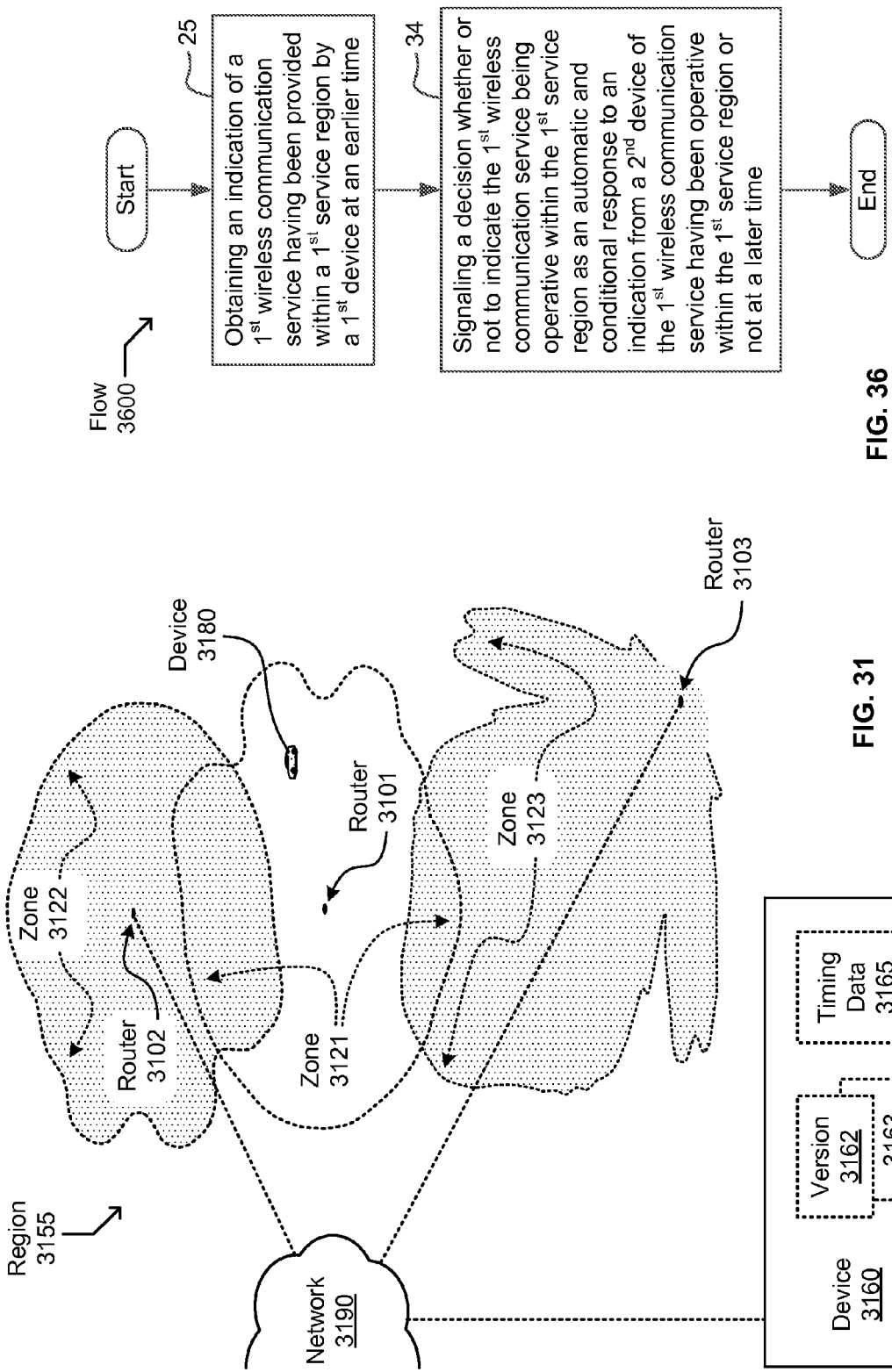

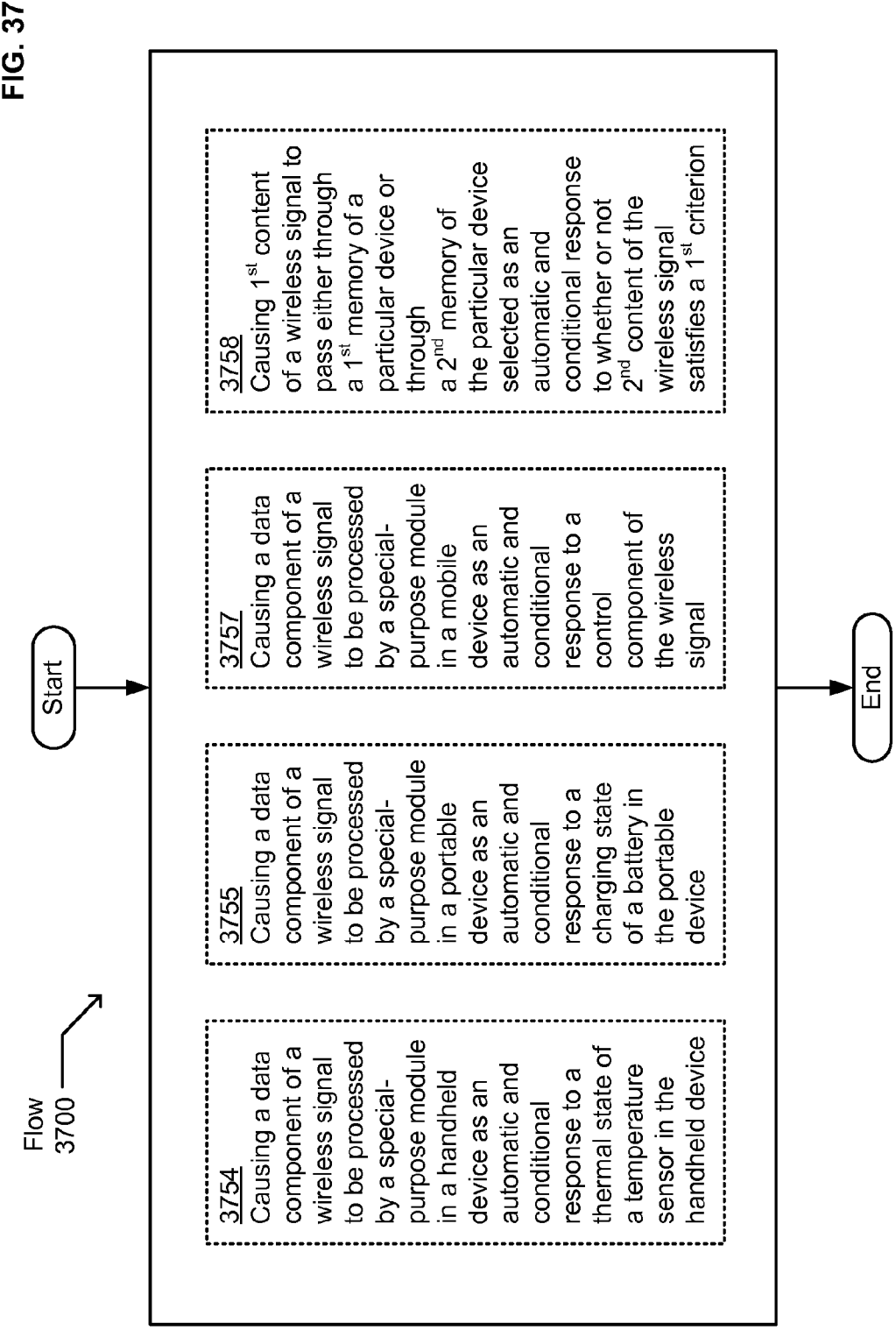

COST-EFFECTIVE MOBILE CONNECTIVITY PROTOCOLS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None.

RELATED APPLICATIONS

U.S. patent application Ser. No. To Be Assigned, entitled COST-EFFECTIVE MOBILE CONNECTIVITY PROTOCOLS, naming Philip Lionel Barnes; Hon Wah Chin; Howard L. Davidson; Kimberly D. A. Hallman; Roderick A. Hyde; Muriel Y. Ishikawa; Jordin T. Kare; Brian Lee; Richard T. Lord; Robert W. Lord; Craig J. Mundie; Nathan P. Myhrvold; Nicholas F. Pasch; Eric D. Rudder; Clarence T. Tegreene; Marc Tremblay; David B. Tuckerman; Charles Whitmer; and Lowell L. Wood, Jr. as inventors, filed on 31 Dec. 2012, is related to the present application.

U.S. patent application Ser. No. To Be Assigned, entitled COST-EFFECTIVE MOBILE CONNECTIVITY PROTOCOLS, naming Philip Lionel Barnes; Hon Wah Chin; Howard L. Davidson; Kimberly D. A. Hallman; Roderick A. Hyde; Muriel Y. Ishikawa; Jordin T. Kare; Brian Lee; Richard T. Lord; Robert W. Lord; Craig J. Mundie; Nathan P. Myhrvold; Nicholas F. Pasch; Eric D. Rudder; Clarence T. Tegreene; Marc Tremblay; David B. Tuckerman; Charles Whitmer; and Lowell L. Wood, Jr. as inventors, filed on 31 Dec. 2012, is related to the present application.

U.S. patent application Ser. No. To Be Assigned, entitled COST-EFFECTIVE MOBILE CONNECTIVITY PROTOCOLS, naming Philip Lionel Barnes; Hon Wah Chin; Howard L. Davidson; Kimberly D. A. Hallman; Roderick A. Hyde; Muriel Y. Ishikawa; Jordin T. Kare; Brian Lee; Richard T. Lord; Robert W. Lord; Craig J. Mundie; Nathan P. Myhrvold; Nicholas F. Pasch; Eric D. Rudder; Clarence T. Tegreene; Marc Tremblay; David B. Tuckerman; Charles Whitmer; and Lowell L. Wood, Jr. as inventors, filed on 31 Dec. 2012, with is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

This disclosure relates to facilitating connectivity in wireless communications.

SUMMARY

An embodiment provides a method. In one implementation, the method includes but is not limited to establishing both a wireless communication channel via a first device and from a second device and a wireless communication channel from the second device and via a third device and signaling a decision of how much user data to transmit via the wireless communication channel from the second device and via the third device responsive to an indication that a data block delivery failure rate of the wireless communication channel via the first device and from the second device exceeds a failure rate threshold. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. §101 of hardware, software, and/or firmware configured to effect the herein-referenced method aspects depending upon the design choices of the system designer.

An embodiment provides a system. In one implementation, the system includes but is not limited to circuitry for establishing both a wireless communication channel via a first device and from a second device and a wireless communication channel from the second device and via a third device and circuitry for signaling a decision of how much user data to transmit via the wireless communication channel from the second device and via the third device responsive to an indication that a data block delivery failure rate of the wireless communication channel via the first device and from the second device exceeds a failure rate threshold. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to establishing both a wireless communication channel via a first device and from a second device and a wireless communication channel from the second device and via a third device and signaling a decision of how much user data to transmit via the wireless communication channel from the second device and via the third device responsive to an indication that a data block delivery failure rate of the wireless communication channel via the first device and from the second device exceeds a failure rate threshold. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for establishing both a wireless communication channel via a first device and from a second device and a wireless communication channel from the second device and via a third device and signaling a decision of how much user data to transmit via the wireless communication channel from the second device and via the third device responsive to an indication that a data block delivery failure rate of the wireless communication channel via the first device and from the second device exceeds a failure rate threshold. In addition to the foregoing, other system aspects are described in the claims, drawings, and text forming a part of the present disclosure.

An embodiment provides a method. In one implementation, the method includes but is not limited to obtaining at a first device an identifier of a second device and causing the first device to display a Boolean indication whether or not the second device is within a wireless local area network communication range of a third device without a bidirectional interpersonal communication existing between the first device and the second device. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. §101 of hardware, software, and/or firmware configured to effect the herein-referenced method aspects depending upon the design choices of the system designer.

An embodiment provides a system. In one implementation, the system includes but is not limited to circuitry for obtaining at a first device an identifier of a second device and circuitry for causing the first device to display a Boolean indication whether or not the second device is within a wireless local area network communication range of a third device without a bidirectional interpersonal communication existing between the first device and the second device. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to obtaining at a first device an identifier of a second device and causing the first device to display a Boolean indication whether or not the second device is within a wireless local area network communication range of a third device without a bidirectional interpersonal communication existing between the first device and the second device. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for obtaining at a first device an identifier of a second device and causing the first device to display a Boolean indication whether or not the second device is within a wireless local area network communication range of a third device without a bidirectional interpersonal communication existing between the first device and the second device. In addition to the foregoing, other system aspects are described in the claims, drawings, and text forming a part of the present disclosure.

An embodiment provides a method. In one implementation, the method includes but is not limited to obtaining a Boolean indication of whether or not a first device exceeded a wireless service boundary crossing rate threshold within a recent time interval, the recent time interval being less than an hour and signaling an availability to participate in a bidirectional interpersonal communication conditionally, partly based on the Boolean indication whether or not the first device exceeded the wireless service boundary crossing rate threshold within the recent time interval and partly based on a Boolean indication of the first device being within a wireless communication range of a second device. (In such contexts, an interval is "recent" if it began yesterday or today.) In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. §101 of hardware, software, and/or firmware configured to effect the herein-referenced method aspects depending upon the design choices of the system designer.

An embodiment provides a system. In one implementation, the system includes but is not limited to circuitry for obtaining a Boolean indication of whether or not a first device exceeded a wireless service boundary crossing rate threshold within a recent time interval, the recent time interval being less than an hour and circuitry for signaling an availability to participate in a bidirectional interpersonal communication conditionally, partly based on the Boolean indication whether or not the first device exceeded the wireless service boundary crossing rate threshold within the recent time interval and partly based on a Boolean indication of the first device being within a wireless communication range of a second device. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to obtaining a Boolean indication of whether or not a first device exceeded a wireless service boundary crossing rate threshold within a recent time interval, the recent time interval being less than an hour and signaling an availability to participate in a bidirectional interpersonal communication conditionally, partly based on the Boolean indication whether or not the first device exceeded the wireless service boundary crossing rate threshold within the recent time interval and partly based on a Boolean indication of the first device being within a wireless communication range of a second device. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for obtaining a Boolean indication of whether or not a first device exceeded a wireless service boundary crossing rate threshold within a recent time interval, the recent time interval being less than an hour and signaling an availability to participate in a bidirectional interpersonal communication conditionally, partly based on the Boolean indication whether or not the first device exceeded the wireless service boundary crossing rate threshold within the recent time interval and partly based on a Boolean indication of the first device being within a wireless communication range of a second device. In addition to the foregoing, other system aspects are described in the claims, drawings, and text forming a part of the present disclosure.

An embodiment provides a method. In one implementation, the method includes but is not limited to obtaining via a first device configuration data establishing a first security protocol; obtaining via a second device a wireless signal containing access request data; signaling a decision whether or not to provide a first network access service via a third device responsive to whether or not the access request data in the wireless signal satisfies the first security protocol; and signaling a decision whether or not to provide a second network access service via the third device responsive to whether or not the access request data satisfies a second security protocol, the third device implementing a firewall between the first network access service and the second network access service. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. §101 of hardware, software, and/or firmware configured to effect the herein-referenced method aspects depending upon the design choices of the system designer.

An embodiment provides a system. In one implementation, the system includes but is not limited to circuitry for obtaining via a first device configuration data establishing a first security protocol; circuitry for obtaining via a second device a wireless signal containing access request data; circuitry for signaling a decision whether or not to provide a first network access service via a third device responsive to whether or not the access request data in the wireless signal satisfies the first security protocol; and circuitry for signaling a decision whether or not to provide a second network access service via the third device responsive to whether or not the access request data satisfies a second security protocol, the third device implementing a firewall between the first network access service and the second network access service. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to obtaining via a first device configuration data establishing a first security protocol; obtaining via a second device a wireless signal containing access request data; signaling a decision whether or not to provide a first network access service via a third device responsive to whether or not the access request data in the wireless signal satisfies the first security protocol; and signaling a decision whether or not to provide a second network access service via the third device responsive to whether or not the access request data satisfies a second security protocol, the third device implementing a firewall between the first network access service and the second network access service. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for obtaining via a first device configuration data establishing a first security protocol; obtaining via a second device a wireless signal containing access request data; signaling a decision whether or not to provide a first network access service via a third device responsive to whether or not the access request data in the wireless signal satisfies the first security protocol; and signaling a decision whether or not to provide a second network access service via the third device responsive to whether or not the access request data satisfies a second security protocol, the third device implementing a firewall between the first network access service and the second network access service. In addition to the foregoing, other system aspects are described in the claims, drawings, and text forming a part of the present disclosure.

An embodiment provides a method. In one implementation, the method includes but is not limited to obtaining an indication of a first wireless communication service having been provided within a first service region by a first device at an earlier time and signaling a decision whether or not to indicate the first wireless communication service being operative within the first service region as an automatic and conditional response to an indication from a second device of the first wireless communication service having been operative within the first service region or not at a later time. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. §101 of hardware, software, and/or firmware configured to effect the herein-referenced method aspects depending upon the design choices of the system designer.

An embodiment provides a system. In one implementation, the system includes but is not limited to circuitry for obtaining an indication of a first wireless communication service having been provided within a first service region by a first device at an earlier time and circuitry for signaling a decision whether or not to indicate the first wireless communication service being operative within the first service region as an automatic and conditional response to an indication from a second device of the first wireless communication service having been operative within the first service region or not at a later time. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to obtaining an indication of a first wireless communication service having been provided within a first service region by a first device at an earlier time and signaling a decision whether or not to indicate the first wireless communication service being operative within the first service region as an automatic and conditional response to an indication from a second device of the first wireless communication service having been operative within the first service region or not at a later time. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for obtaining an indication of a first wireless communication service having been provided within a first service region by a first device at an earlier time and signaling a decision whether or not to indicate the first wireless communication service being operative within the first service region as an automatic and conditional response to an indication from a second device of the first wireless communication service having been operative within the first service region or not at a later time. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth below.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 6 depicts another exemplary environment in which one or more technologies may be implemented in control logic.

FIGS. 7-13 each depict another exemplary environment in which one or more technologies may be implemented in circuitry or other event-sequencing logic.

FIG. 14 depicts another exemplary environment in which one or more technologies may be implemented in a user interface.

FIG. 17 depicts another exemplary environment in which one or more technologies may be implemented in a communications network.

FIG. 29 depicts an exemplary environment in which one or more technologies may be implemented.

FIG. 34 depicts a high-level logic flow of an operational process (described with reference to FIG. 29, e.g.).

FIG. 30 depicts an exemplary environment in which one or more technologies may be implemented.

FIG. 35 depicts a high-level logic flow of an operational process (described with reference to FIG. 30, e.g.).

FIG. 31 depicts an exemplary environment in which one or more technologies may be implemented.

FIG. 36 depicts a high-level logic flow of an operational process (described with reference to FIG. 31, e.g.).

FIG. 37 likewise depicts variants of earlier-presented flows (in any of FIGS. 32-36).

DETAILED DESCRIPTION

Figure 1:
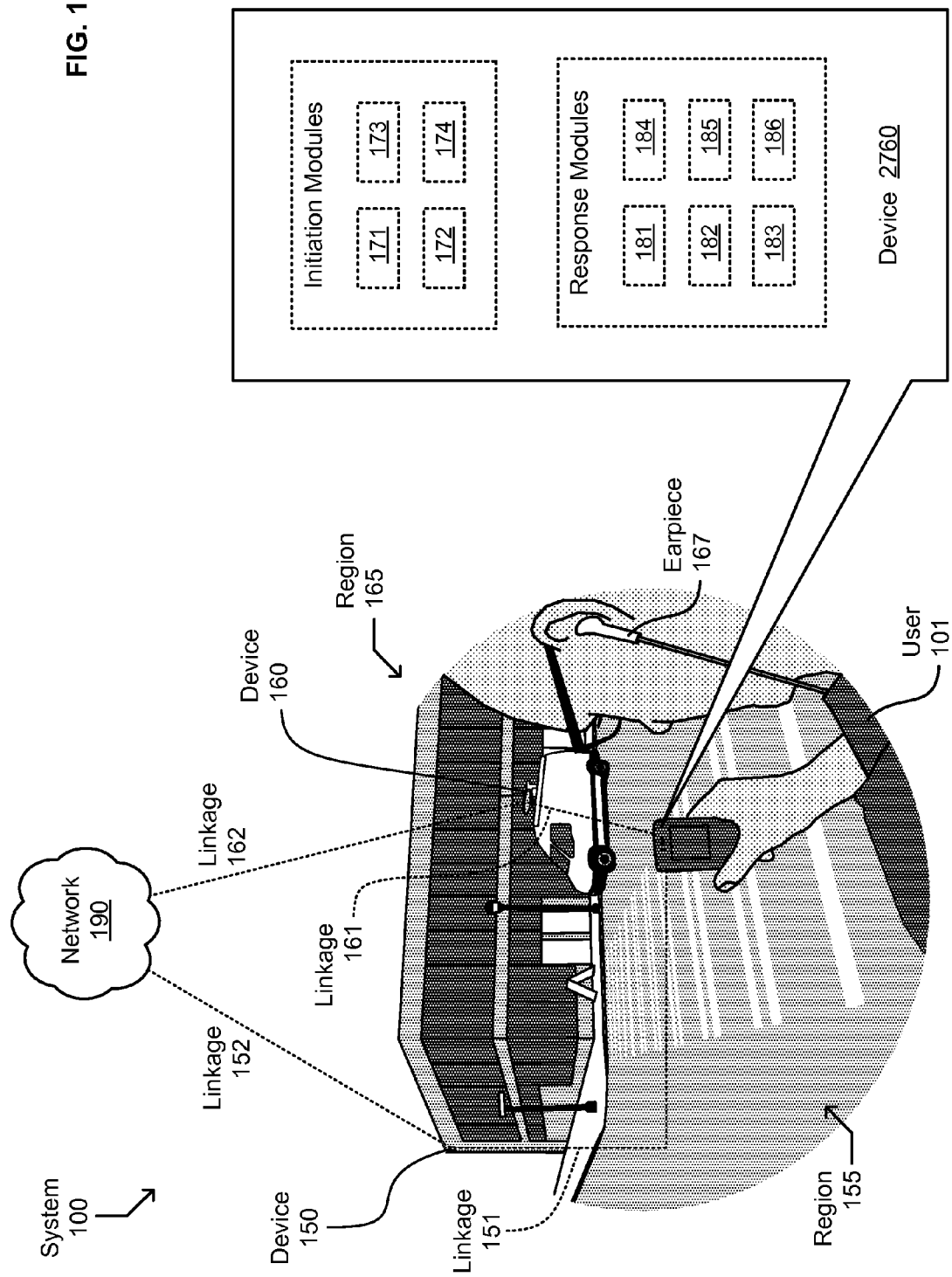
FIG. 1 depicts an exemplary environment in which one or more technologies may be implemented on a city street.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to a human reader. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail herein, these logical operations/functions are not representations of abstract ideas, but rather are representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood by a human reader). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of logic, such as Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around -5 volts applied to a specific "wire." In addition to specifying voltages of the machines' configurations, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible to most humans. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that useful, tangible, and concrete work is done. For example, as indicated above, such machine language—the compiled version of the higher-level language—functions as a technical specification which selects out hardware logic gates, specifies voltage levels, voltage transition timings, etc., such that the useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality of logic(s), or (d) virtually any combination of the foregoing. Indeed, any physical object which has a stable, measurable, and changeable state may be used to construct a machine based on the above technical description. Charles Babbage, for example, constructed the first mechanized computational apparatus out of wood, with the apparatus powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language should not be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

The proliferation of automation in many transactions is apparent. For example, Automated Teller Machines ("ATMs") dispense money and receive deposits. Airline ticket counter machines check passengers in, dispense tickets, and allow passengers to change or upgrade flights. Train and subway ticket counter machines allow passengers to purchase a ticket to a particular destination without invoking a human interaction at all. Many groceries and pharmacies have self-service checkout machines which allow a consumer to pay for goods purchased by interacting only with a machine. Large companies now staff telephone answering systems with machines that interact with customers, and invoke a human in the transaction only if there is a problem with the machine-facilitated transaction.

Nevertheless, as such automation increases, convenience and accessibility may decrease. Self-checkout machines at grocery stores may be difficult to operate. ATMs and ticket counter machines may be mostly inaccessible to disabled persons or persons requiring special access. Where before, the interaction with a human would allow disabled persons to complete transactions with relative ease, if a disabled person is unable to push the buttons on an ATM, there is little the machine can do to facilitate the transaction to completion. While some of these public terminals allow speech operations, they are configured to the most generic forms of speech, which may be less useful in recognizing particular speakers, thereby leading to frustration for users attempting to speak to the machine. This problem may be especially challenging for the disabled, who already may face significant challenges in completing transactions with automated machines.

In addition, smartphones and tablet devices also now are configured to receive speech commands. Speech and voice controlled automobile systems now appear regularly in motor vehicles, even in economical, mass-produced vehicles. Home entertainment devices, e.g., disc players, televisions, radios, stereos, and the like, may respond to speech commands. Additionally, home security systems may respond to speech commands. In an office setting, a worker's computer may respond to speech from that worker, allowing faster, more efficient work flows. Such systems and machines may be trained to operate with particular users, either through explicit training or through repeated interactions. Nevertheless, when that system is upgraded or replaced, e.g., a new television is purchased, that training may be lost with the device. Thus, in some embodiments described herein, adaptation data for speech recognition systems may be separated from the device which recognizes the speech, and may be more closely associated with a user, e.g., through a device carried by the user, or through a network location associated with the user.

Further, in some environments, there may be more than one device that transmits and receives data within a range of interacting with a user. For example, merely sitting on a couch watching television may involve five or more devices, e.g., a television, a cable box, an audio/visual receiver, a remote control, and a smartphone device. Some of these devices may transmit or receive speech data. Some of these devices may transmit, receive, or store adaptation data, as will be described in more detail herein. Thus, in some embodiments, which will be described in more detail herein, there may be methods, systems, and devices for determining which devices in a system should perform actions that allow a user to efficiently interact with an intended device through that user's speech.

With reference now to FIG. 1, shown is an example of a system 100 in which one or more technologies may be implemented. A wearable article (earpiece 167, e.g.) is operably coupled with a handheld device 2760 that includes one or more instances of initiation modules 171, 172, 173, 174 or of response modules 181, 182, 183, 184, 185, 186. When in use (by user 101, e.g.) device 2760 may be operably coupled via a first channel (comprising a WLAN or other wireless linkage 151 and a wall-mounted device 150 in region 155 and a second linkage 152, e.g.) to one or more other devices in network 190. Alternatively or additionally, device 2760 may (optionally) be operably coupled via a second channel (comprising a wireless linkage 161 and a device 160 comprising a vehicle implementing a mobile hotspot in region 165 and a second linkage 162, e.g.) to network 190.

Figure 2:
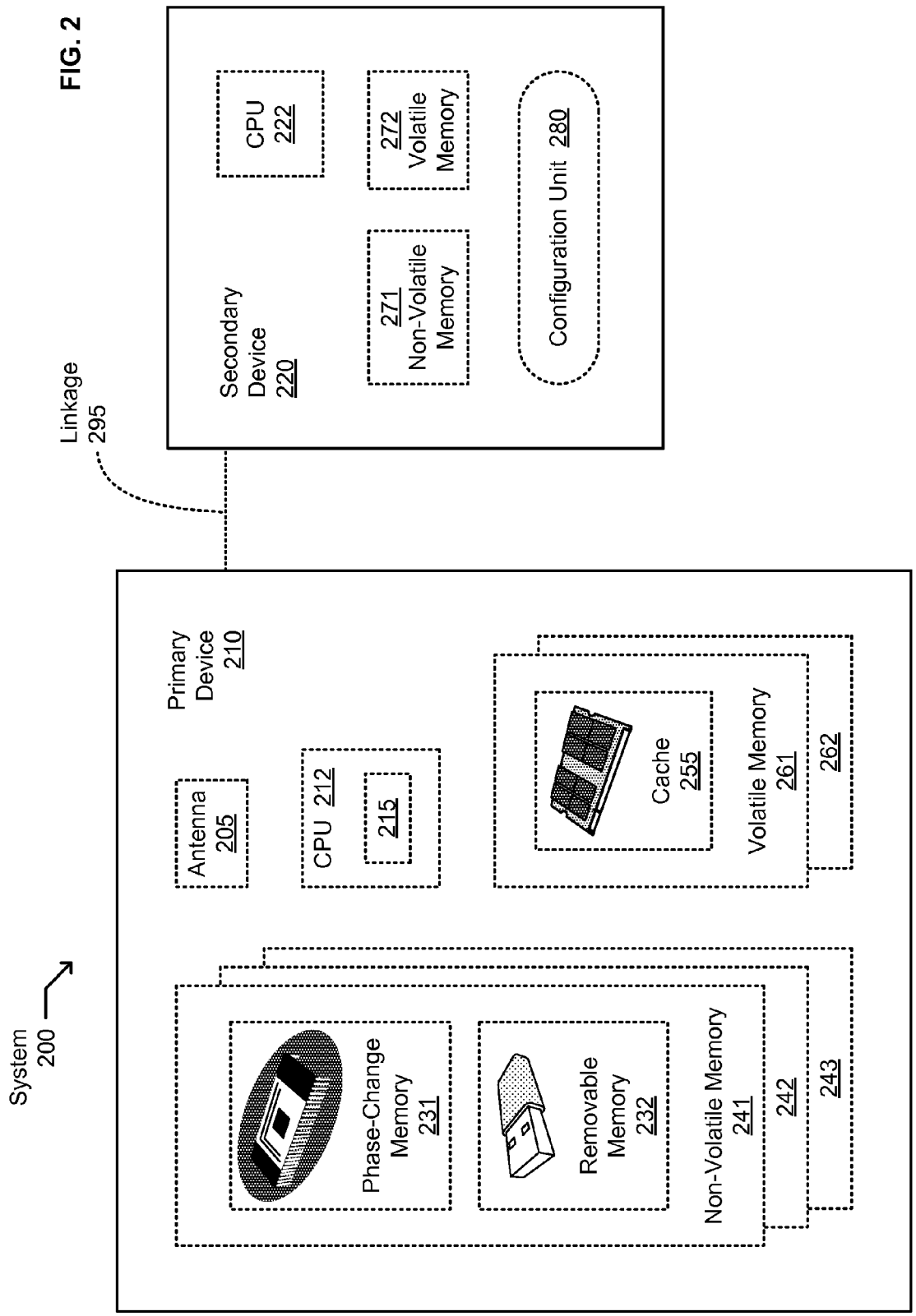
FIG. 2 depicts an exemplary environment in which one or more technologies may be implemented between a primary device and a secondary device.

With reference now to FIG. 2, shown is another example of a system 200 in which one or more technologies may be implemented. Primary device 210 (a vehicle or router or integrated circuit, e.g.) may include one or more instances of a general-purpose central processing unit (CPU) 212 (comprising an internal cache 215, e.g.); of non-volatile memories 241, 242, 243 (a phase-change memory 231 or removable memory 232, e.g.); or of volatile memories 261, 262 (a cache 255, e.g.). In some variants, secondary device 220 may include one or more instances of CPUs 222, non-volatile memories 271, volatile memories 272, or configuration units 280. One or both of primary and secondary devices 210, 220 may be a tablet computer or smartphone (device 2760, e.g.) with an Android operating system and an antenna 205 configure to facilitate a wireless linkage 295 between them.

Figure 3:
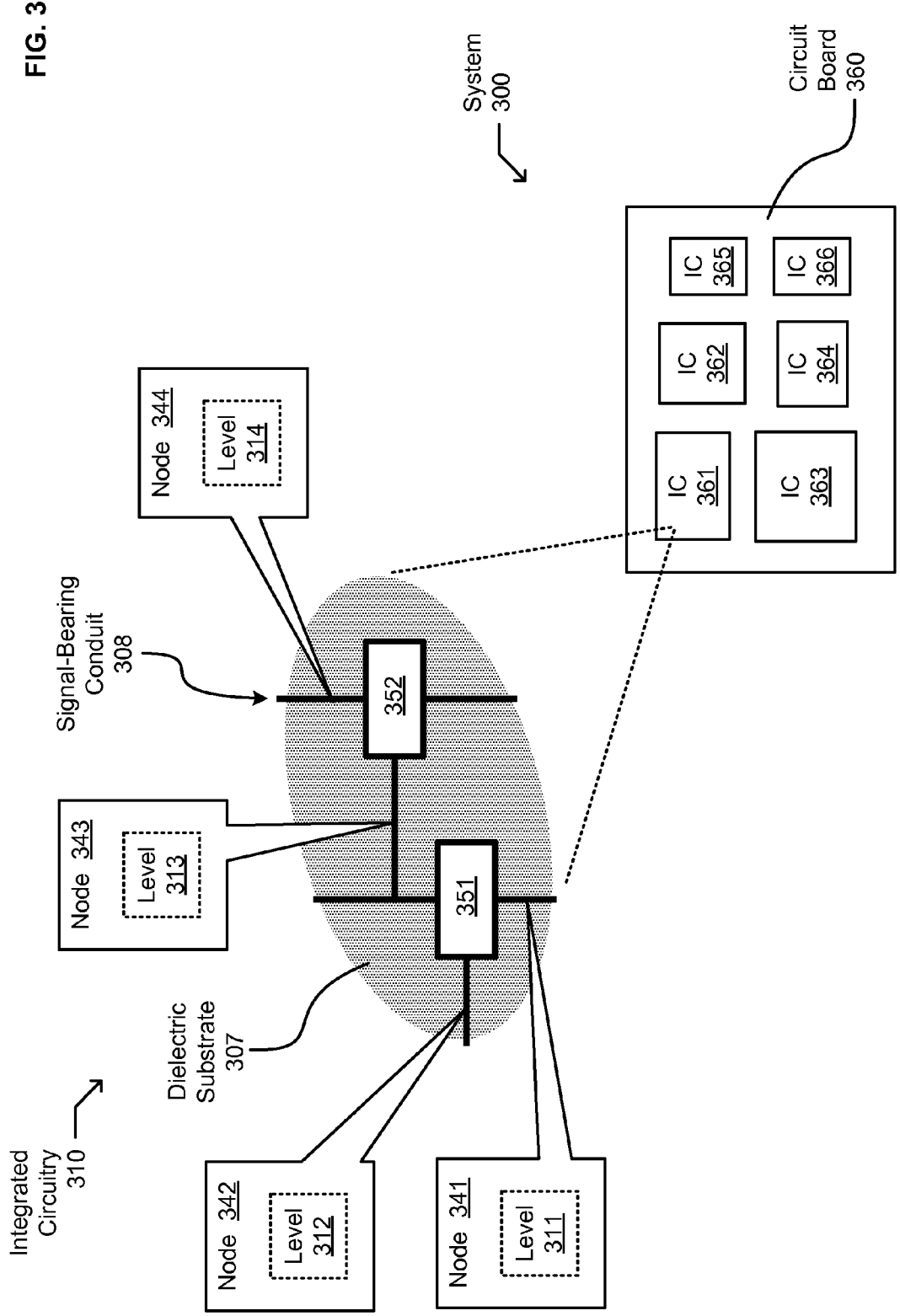
FIG. 3 depicts an exemplary environment in which one or more technologies may be implemented among electrical nodes and transistors of an integrated circuit.

With reference now to FIG. 3, shown is another example of a system 300 in which one or more technologies may be implemented. A circuit board 360 includes several integrated circuits (ICs) 361, 362, 363, 364, 365, 366. Integrated circuitry 310 within IC 361, for example, includes transistors 351, 352 each formed onto a single dielectric substrate 307. Transistor 351, for example, comprises a control terminal (a gate or base, e.g.) at node 342 and two end terminals (at nodes 341, 343) as shown. Such formation may be achieved by a series of several lithographic processes (chemical and thermal and optical treatments for applying and treating and etching dielectrics or dopants or other materials, e.g.). Many millions of such transistors 351, 352 are linked in a network of signal-bearing conduits 308 (forked or other serpentine signal traces, e.g.) according to intricate circuit designs formed of circuit blocks (initiation modules 171-174 and response modules 181-186, e.g.) of a same general type as those described herein. Even among the relatively complex circuit blocks presented herein in context, however, many such blocks (excluding a variety of components such as antenna 205, e.g.) are linked by electrical nodes 341, 342, 343, 344 each having a corresponding nominal voltage level 311, 312, 313, 314 that is spatially uniform generally throughout the node (within a device or local system as described herein, e.g.). Such nodes (lines on an integrated circuit or circuit board 360, e.g.) may each comprise a forked or other signal path (adjacent one or more transistors 351, 352, e.g.). Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol.

In some variants, primary device 210 comprises a circuit board 360 upon which a metamaterial antenna system is constructed. In light of teachings herein, in fact, numerous existing techniques may be applied for configuring special-purpose circuitry or other structures effective for implementing such antennas for use as described herein without undue experimentation. See, e.g., U.S. Pat. No. 8,299,967 ("Non planar metamaterial antenna structures"); U.S. Pat. No. 8,081,138 ("Antenna structure with antenna radome and method for rising gain thereof"); U.S. Pat. No. 8,072,291 ("Compact dual band metamaterial based hybrid ring coupler"); U.S. Pat. No. 7,847,739 ("Antennas based on metamaterial structures"); U.S. Pat. No. 7,218,190 ("Waveguides and scattering devices incorporating epsilon-negative and/or mu-negative slabs"); U.S. Pat. No. 6,958,729 ("Phased array metamaterial antenna system"); U.S. patent application Ser. No. 12/925,511 ("Metamaterial surfaces"); U.S. patent application Ser. No. 12/220,703 ("Emitting and negatively refractive focusing apparatus methods and systems"); and U.S. patent application Ser. No. 12/156,443 ("Focusing and sensing apparatus methods and systems").

Figure 4:
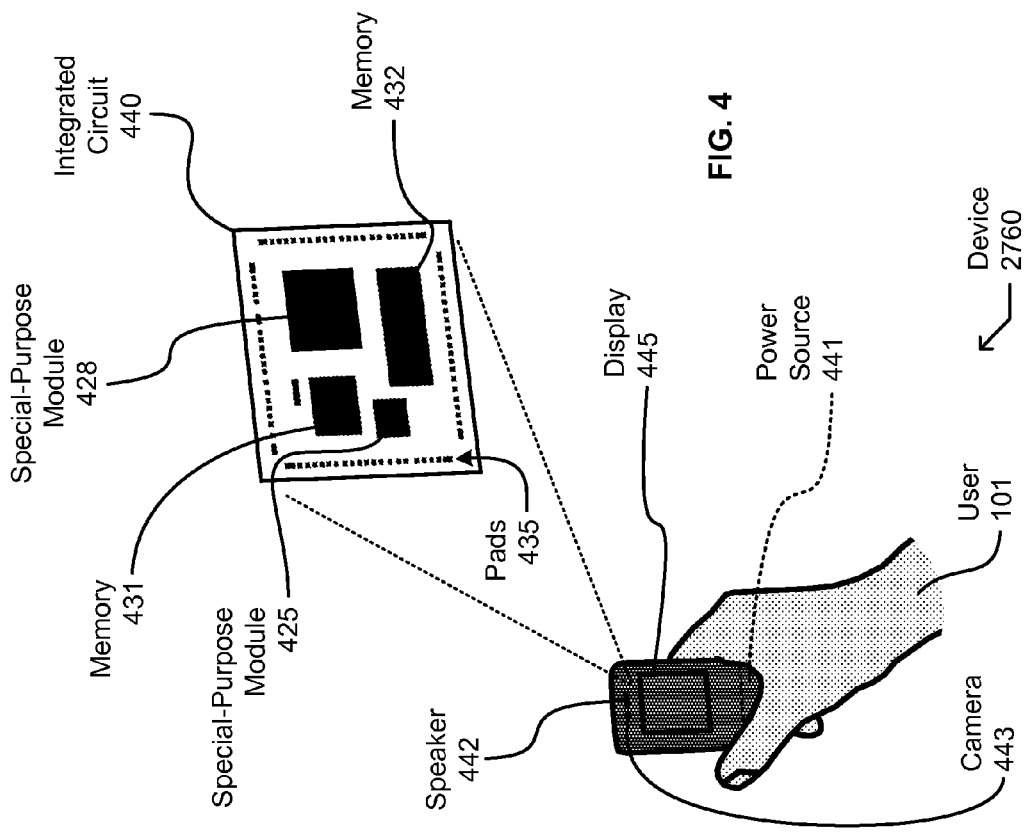
FIG. 4 depicts an exemplary environment in which one or more technologies may be implemented in a handheld device.

With reference now to FIG. 4, shown is another view of the mobile device 2760 introduced in FIG. 1 in which a speaker 442, camera 443, and display 445 (touchscreen, e.g.) are visible. Also within device 2760 as shown is at least an integrated circuit 440 and a power source 441 (rechargeable battery, e.g.). A few of the electrical nodes thereof (comprising pads 435 along the sides as shown, e.g.) provide external connectivity (for power or ground or input signals or output signals, e.g.) via bonding wires, not shown. Significant blocks of integrated circuitry 310 on integrated circuit 440 include special-purpose modules 425, 428 (comprising a sensor or other hard-wired special-purpose circuitry as described below, e.g.); and different structures of memory 431, 432 (volatile or non-volatile, e.g.) interlinked by numerous signal-bearing conduits 308 (each comprising an internal node, e.g.) and otherwise configured as described below. See FIGS. 6 & 26.

Figure 5:
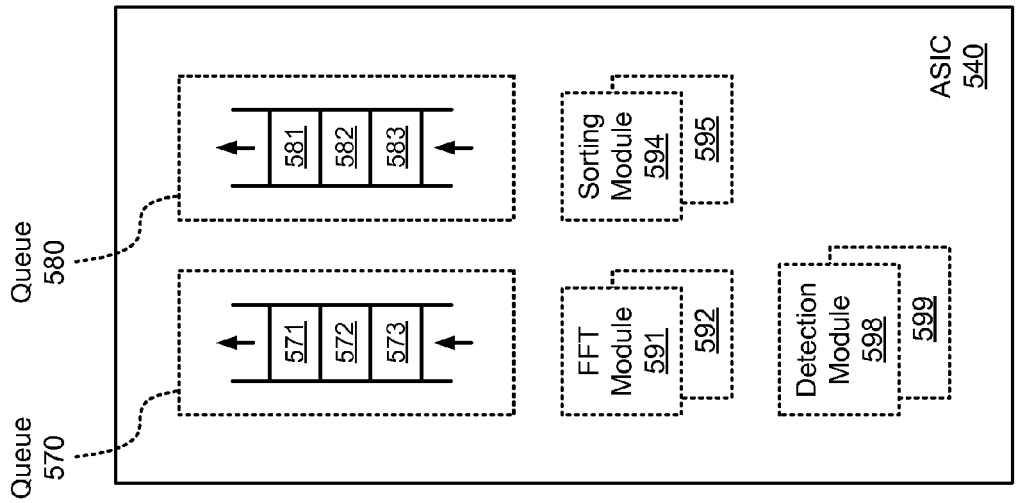
FIG. 5 depicts an exemplary environment in which one or more technologies may be implemented in an application-specific integrated circuit (ASIC).

With reference now to FIG. 5, shown is another example of a system in which one or more technologies may be implemented comprising a schematic view of an application-specific integrated circuit (ASIC) 540. ASIC 540 may (optionally) include a queue 570 (implemented in a volatile memory 272, 432, e.g.) comprising a series of items 571, 572, 573 (data blocks or tasks, e.g.) for handling (by a central processing unit 222 or other core, e.g.). This can occur, for example, in a context in which ASIC 540 implements secondary device 220 or IC 363. Alternatively or additionally, ASIC 540 may include a queue 580 (implemented in non-volatile memory 431 or volatile memory 272, e.g.) comprising a series of items 581, 582, 583 (data blocks or tasks, e.g.) for processing (by a hard-wired special-purpose module 425 or general-purpose CPU 212 configured to execute special-purpose software, e.g.). Alternatively or additionally, special-purpose modules specifically identified herein (as circuitry in FIGS. 6-14, e.g.) may be implemented selectively by configuration (in a field-programmable gate array, e.g.) by a remote device (via a wireless linkage 162, e.g.) under various circumstances as described below. In some variants, for example, a gate array (comprising integrated circuit 366, e.g.) may implement an FFT module 591, 592 or sorting module 594, 595 or detection module 598, 599 in a manifestation that is remotely reconfigurable. This can occur, for example, in a context in which other such functional implementations (a rarely used FFT module 592, e.g.) are currently either omitted or manifested as software instead (as a module resident in a memory and executable by a core, e.g.).

With reference now to FIG. 6, shown is an example of a system 600 (a network subsystem, e.g.) in which one or more technologies may be implemented. Control logic 610 may (optionally) include one or more instances of temperature sensors 608 having a corresponding state 618 (current temperature, e.g.). Alternatively or additionally, control logic 610 may (optionally) include one or more instances of a general-purpose multimodal cores 635 configured to process instructions in one of the following modes: an "error-tolerant" operating mode 630 (relative to the other modes, e.g.) or a "high-latency" operating mode 631 (relative to the other modes, e.g.) or a "high-performance" operating mode 632 (relative to the other modes, e.g.). In some contexts a multimodal core 635 may also be configured to do nothing (in an "idle" or "off" mode, e.g.) or to operate in some other mode instead (a "normal" mode, e.g.). As further explained below, in some contexts, control logic 610 may likewise include one or more instances (1) of special-purpose circuitry configured to cause a data component of a wireless signal to be processed by a special-purpose module in a handheld device as an automatic and conditional response to a thermal state of a temperature sensor in the handheld device 671; (2) of special-purpose circuitry configured to signal a decision whether or not to cause a configurable core to change core operating modes as an automatic and conditional response to a thermal state of a temperature sensor 672; or (3) of special-purpose circuitry configured to cause a configurable core to draw from a data queue of a particular device 681, 682, 683.

Several variants described herein refer to device-detectable "implementations" such as one or more instances of computer-readable code, transistor or latch connectivity layouts or other geometric expressions of logical elements, firmware or software expressions of transfer functions implementing computational specifications, digital expressions of truth tables, or the like. Such instances can, in some implementations, include source code or other human-readable portions. Alternatively or additionally, functions of implementations described herein may constitute one or more device-detectable outputs such as decisions, manifestations, side effects, results, coding or other expressions, displayable images, data files, data associations, statistical correlations, streaming signals, intensity levels, frequencies or other measurable attributes, packets or other encoded expressions, or the like from invoking or monitoring the implementation as described herein.

In some embodiments, a "state" of a component may comprise "available" or some other such state-descriptive labels, an event count or other such memory values, a partial depletion or other such physical property of a supply device, a voltage, or any other such conditions or attributes that may change between two or more possible values irrespective of device location. Such states may be received directly as a measurement or other detection, in some variants, and/or may be inferred from a component's behavior over time. A distributed or other composite system may comprise vector-valued device states, moreover, which may affect dispensations or departures in various ways as exemplified herein.

"Automatic," "conditional," "detectable," "handheld," "bidirectional," "effective," "employed," "explicit," "in a vicinity," "local," "wireless," "portable," "mobile," "recent," "incrementally," "multiple," "objective," "interpersonal," "ad hoc," "single," "between," "particular," "isotropic," "thermal," "within," "passive," "partly," "prior," "proximate," "associated," "audible," "received," "remote," "responsive," "earlier," "resident," "later," "operative," "selective," "specific," "special-purpose," "caused," "stationary," "between," "matching," "significant," "common," or other such descriptors herein are used in their normal yes-or-no sense, not as terms of degree, unless context dictates otherwise. In light of the present disclosure those skilled in the art will understand from context what is meant by "vicinity," by being "in" a region or "within" a range, by "remote," and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

In some embodiments a "manual" occurrence includes, but is not limited to, one that results from one or more actions consciously taken by a device user in real time. Conversely an "automatic" occurrence is not affected by any action consciously taken by a device user in real time except where context dictates otherwise.

In some embodiments, "signaling" something can include identifying, contacting, requesting, selecting, or indicating the thing. In some cases a signaled thing is susceptible to fewer than all of these aspects, of course, such as a task definition that cannot be "contacted."

In some embodiments, "status indicative" data can reflect a trend or other time-dependent phenomenon. Alternatively or additionally, a status indicative data set can include portions that have no bearing upon such status. Although some types of distillations can require authority or substantial expertise, many other types of distillations can readily be implemented without undue experimentation in light of teachings herein.

In some embodiments, "causing" events can include triggering, producing or otherwise directly or indirectly bringing the events to pass. This can include causing the events remotely, concurrently, partially, or otherwise as a "cause in fact," whether or not a more immediate cause also exists.

Some descriptions herein refer to an "indication whether" an event has occurred. An indication is "positive" if it indicates that the event has occurred, irrespective of its numerical sign or lack thereof. Whether positive or negative, such indications may be weak (i.e. slightly probative), definitive, or many levels in between. In some cases the "indication" may include a portion that is indeterminate, such as an irrelevant portion of a useful photograph.

Some descriptions herein refer to a "device" or other physical article. A physical "article" described herein may be a long fiber, a transistor 351, a submarine, or any other such contiguous physical object. An "article" may likewise be a portion of a device as described herein (part of a memory 432 or a speaker 442 of a smartphone, e.g.) or a mechanically coupled grouping of devices (a tablet computer with a removable memory 232 and earpiece 167 attached, e.g.) as described herein, except where context dictates otherwise. A communication "linkage" may refer to a unidirectional or bidirectional signal path via one or more articles (antennas 205 or other signal-bearing conduit 308, e.g.) except where context dictates otherwise. Such linkages may, in some contexts, pass through a free space medium or a network 190. See FIGS. 17 & 28.

With reference now to FIG. 7, shown is an example of a system 700 (a network subsystem, e.g.) in which one or more technologies may be implemented. Contiguous or other event-sequencing logic 710 may (optionally) include one or more instances of activation modules 708, 709; of dual-mode cores 711, 712 (each having a lower-voltage operating mode 721 and a higher-voltage operating mode 722, e.g.); or of other cores 731, 732, 733. In some contexts event-sequencing logic 710 (implemented in a circuit board 360 or ASIC 540, e.g.) may also include one or more instances of Boolean values 741-745 or of scalar quantities (a volume 706 or other quantification expressed in a plurality of electrical nodes, e.g.) each expressed as one or more bits. See FIGS. 2, 3, and 20-23 (depicting data-handling media suitable for expressing such individual values digitally, e.g.). Also as further explained below, in some contexts, event-sequencing logic 710 may include one or more instances (1) of special-purpose circuitry configured to signal a decision of how many cores to draw simultaneously from a single data queue of a mobile device as an automatic and conditional response to an indication of a data volume of the data queue crossing a volume threshold 751, 752 or (2) of special-purpose circuitry configured to signal a decision whether or not to cause a configurable core to change core operating modes as an automatic and conditional response to an indication of a data volume of a data queue crossing a volume threshold 761, 762.

With reference now to FIG. 8, shown is an example of a system 800 in which one or more technologies may be implemented. Event-sequencing logic 810 may manifest one or more instances (a) of circuitry configured to cause a sorting module in an FPGA of a mobile device to process a data component of a wireless signal after a configuration component of the wireless signal causes the FPGA to implement the sorting module 861, 862; (b) of an FPGA 870; (c) of configuration components 881 or data components 882 of a signal; or (d) of event-sequencing logic 710. In some contexts, for example, FPGA 870 may be configured or reconfigured to implement a sorting module 875 (a bubble sort utility, e.g.) or other such utility modules as described below.

In light of teachings herein numerous existing techniques may be applied for configuring special purpose circuitry or other structures effective for configuring a field programmable gate array (FPGA) as described herein without undue experimentation. See, e.g., U.S. Pat. No. 8,341,469 ("Configuration device for configuring FPGA"); U.S. Pat. No. 8,327,117 ("Reconfigurable FADEC with flash based FPGA control channel and ASIC sensor signal processor for aircraft engine control"); U.S. Pat. No. 8,294,396 ("Compact FPGA-based digital motor controller"); U.S. Pat. No. 8,225,081 ("Updating programmable logic devices"); U.S. Pat. No. 8,205,066 ("Dynamically configured coprocessor for different extended instruction set personality specific to application program with shared memory storing instructions invisibly dispatched from host processor"); U.S. Pat. No. 8,205,037 ("Data storage device capable of recognizing and controlling multiple types of memory chips operating at different voltages"); U.S. Pat. No. 8,190,699 ("System and method of multi-path data communications"); U.S. Pat. No. 8,166,237 ("Configurable allocation of thread queue resources in an FPGA"); U.S. Pat. No. 8,095,508 ("Intelligent data storage and processing using FPGA devices"); and U.S. Pat. No. 8,069,275 ("Network-based system for configuring a programmable hardware element in a measurement system using hardware configuration programs generated based on a user specification").

With reference now to FIG. 9, shown is an example of a system 900 in which one or more technologies may be implemented. A password generation module 986 or other configuration unit 980 (implemented in network 990, e.g.) is operably coupled to event-sequencing logic 910 via a wireless LAN or other linkage 995. Contiguous or other event-sequencing logic 910 comprises one or more instances (a) of electrical nodes 921, 922, 923, 924, 925, 926, 927, 928; (b) of circuitry configured to obtain via an antenna configuration data establishing a security protocol 931, 932; or (c) of circuitry configured to signal a decision whether or not to indicate a wireless communication service provided within a region by a device as a response to an indication from another device of the wireless communication service being operative within the region 941.

With reference now to FIG. 10, shown is an example of a system 1000 in which one or more technologies may be implemented. Event-sequencing logic 1010 may manifest (as a general-purpose processing core executing software or in an FPGA 870 implemented in a mobile device, e.g.) one or more instances (a) of circuitry configured to signal a decision whether or not to provide a network access service responsive to whether or not access request data satisfies a security protocol 1021, 1022, 1023; (b) of circuitry configured to establish both a wireless communication channel via a first device and from a second device and a wireless communication channel from the second device and via a third device 1031, 1032; or (c) of application modules 1041, 1042, 1043, 1044. Alternatively or additionally, event-sequencing logic 1010 (implemented in a circuit board 360 or ASIC 540, e.g.) may include data-handling media 1050 containing one or more instances of commands 1068 or of patterns 1071, 1072 or of protocol implementation code 1088, 1089 or other device-executable code 1085. In some variants, moreover, such logic may be operably coupled via linkage 1095 with a wide area network 1095 (comprising one or more satellites 1093, e.g.).

Figure 11:
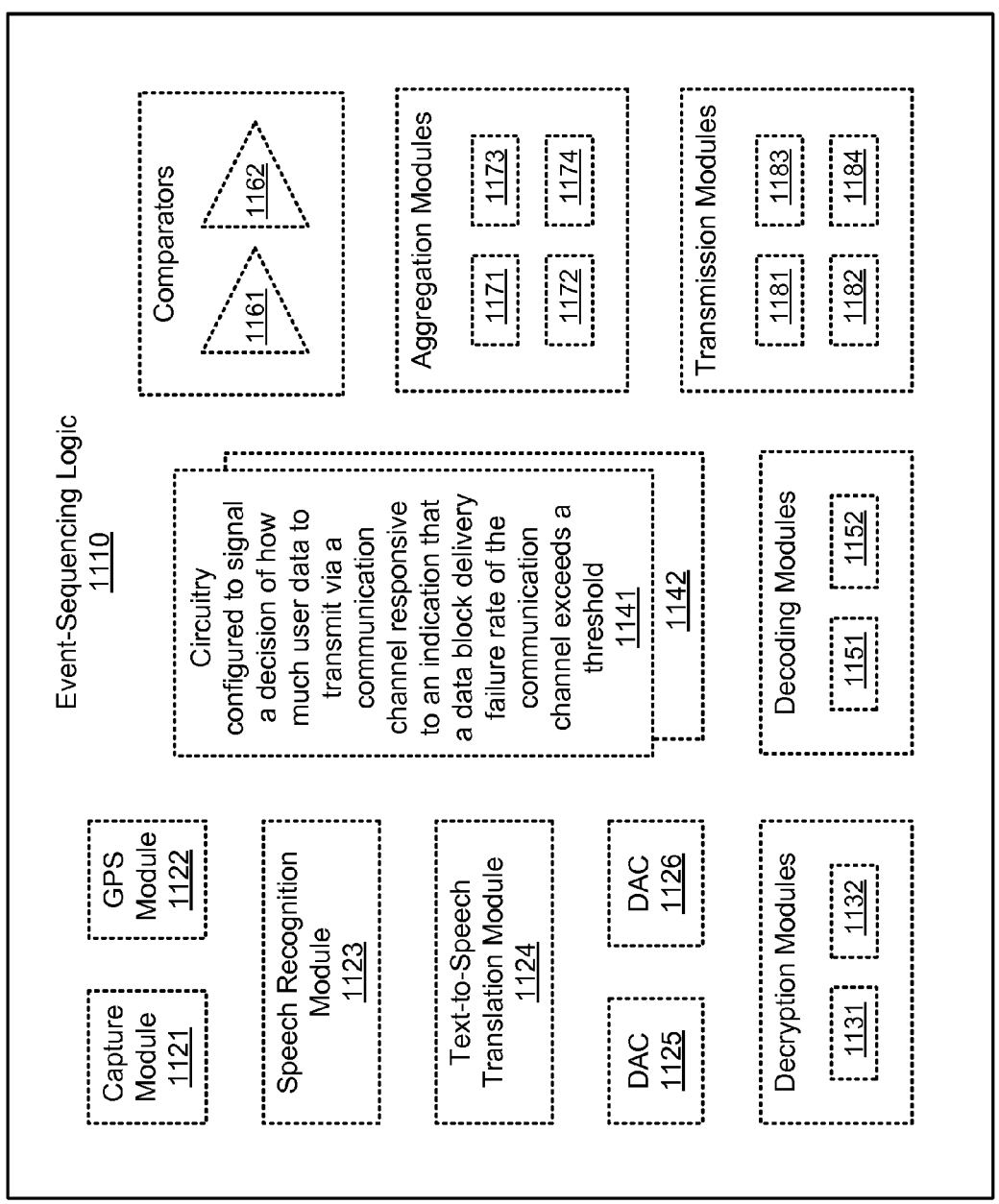

With reference now to FIG. 11, shown is an example of a system 1100 (a network subsystem, e.g.) in which one or more technologies may be implemented. Event-sequencing logic 1110 may manifest (as a general-purpose processing core executing software or in a mixed-signal or other FPGA 870 implemented in a mobile device, e.g.) one or more instances (a) of capture modules 1121 configured to capture audio clips; (b) of capture modules 1121 configured to capture video clips; (c) of global positioning system (GPS) modules 1122 configured to annotate wireless signals with position data; (d) of speech recognition modules; (e) of text-to-speech translation modules 1124; (f) of digital-to-analog converters 1125, 1126; (f) of decryption modules 1131, 1132; (g) of circuitry configured to signal a decision of how much user data to transmit via a communication channel responsive to an indication that a data block delivery failure rate of the communication channel exceeds a threshold 1141, 1142; (h) of decoding modules 1151, 1152; (i) of comparators 1161, 1162; (j) of aggregation modules 1171, 1172, 1173, 1174; or (k) of transmission modules 1181, 1182, 1183, 1184. In some contexts, for example, event-sequencing logic 1110 may be implemented in a circuit board 360 or ASIC 540.

Figure 12:
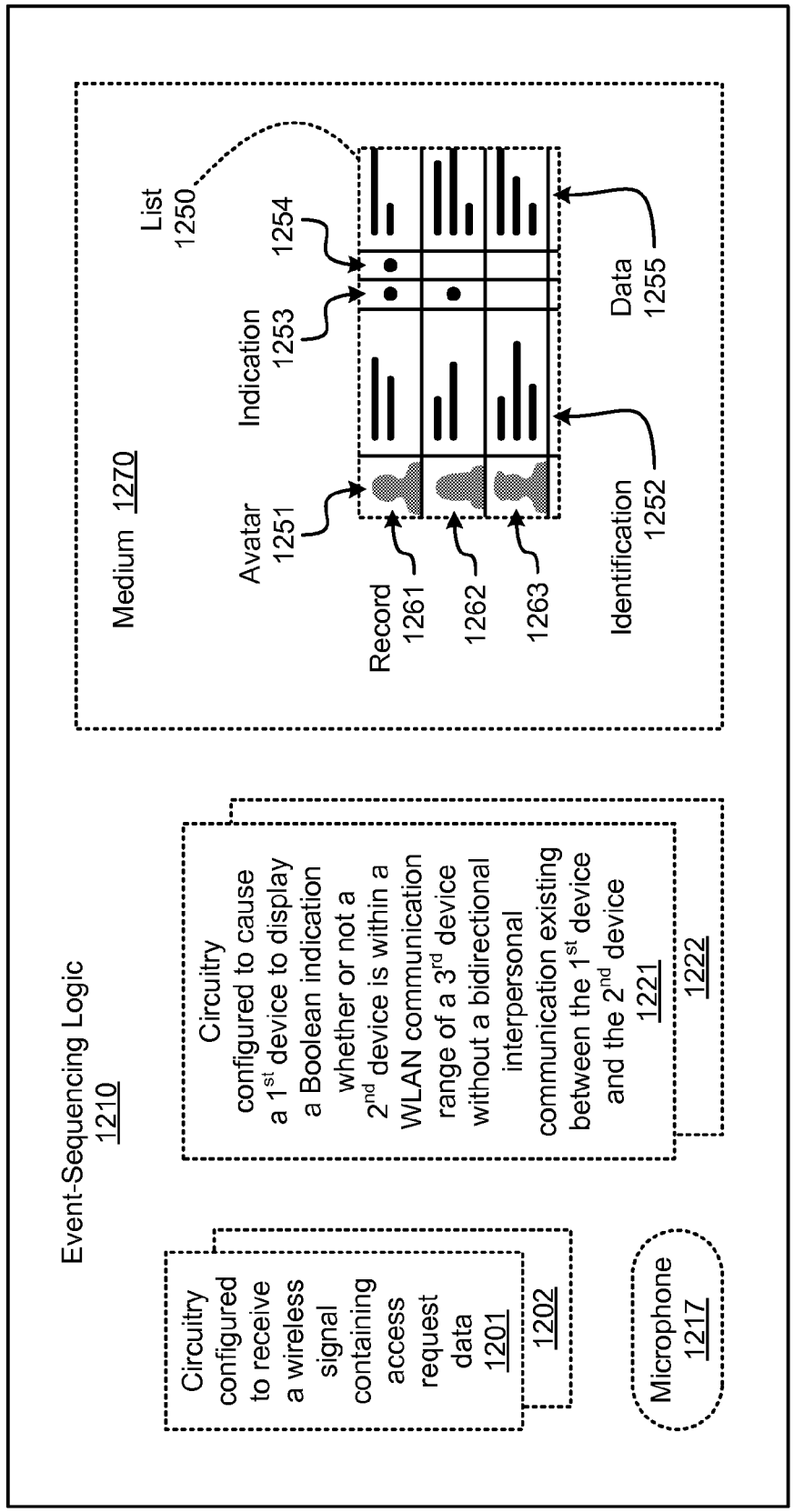

With reference now to FIG. 12, shown is an example of a system 1200 in which one or more technologies may be implemented. Contiguous or other event-sequencing logic 1210 may manifest (in an FPGA 870 or as a general-purpose processing core executing software, e.g.) one or more instances (a) of circuitry configured to receive a wireless signal containing access request data 1201, 1202; (b) of circuitry configured to cause a first device to display a Boolean indication whether or not a second device is within a WLAN communication range of a third device without a bidirectional interpersonal communication existing between the first device and the second device 1221, 1222; or (c) of microphones 1217. Alternatively or additionally, event-sequencing logic 1210 may include data-handling media 1270 (of storage or guided transmission or display, e.g.) containing a list 1250 of two or more records 1261, 1262, 1263. Each such record may include one or more instances of avatars 1251 or other identifications 1252 (representing a person or device known to a user, e.g.); of status indications 1253, 1254; or of other such data 1255 as described below. In some contexts, for example, event-sequencing logic 1210 may be implemented in a circuit board 360 or ASIC 540.

Figure 13:
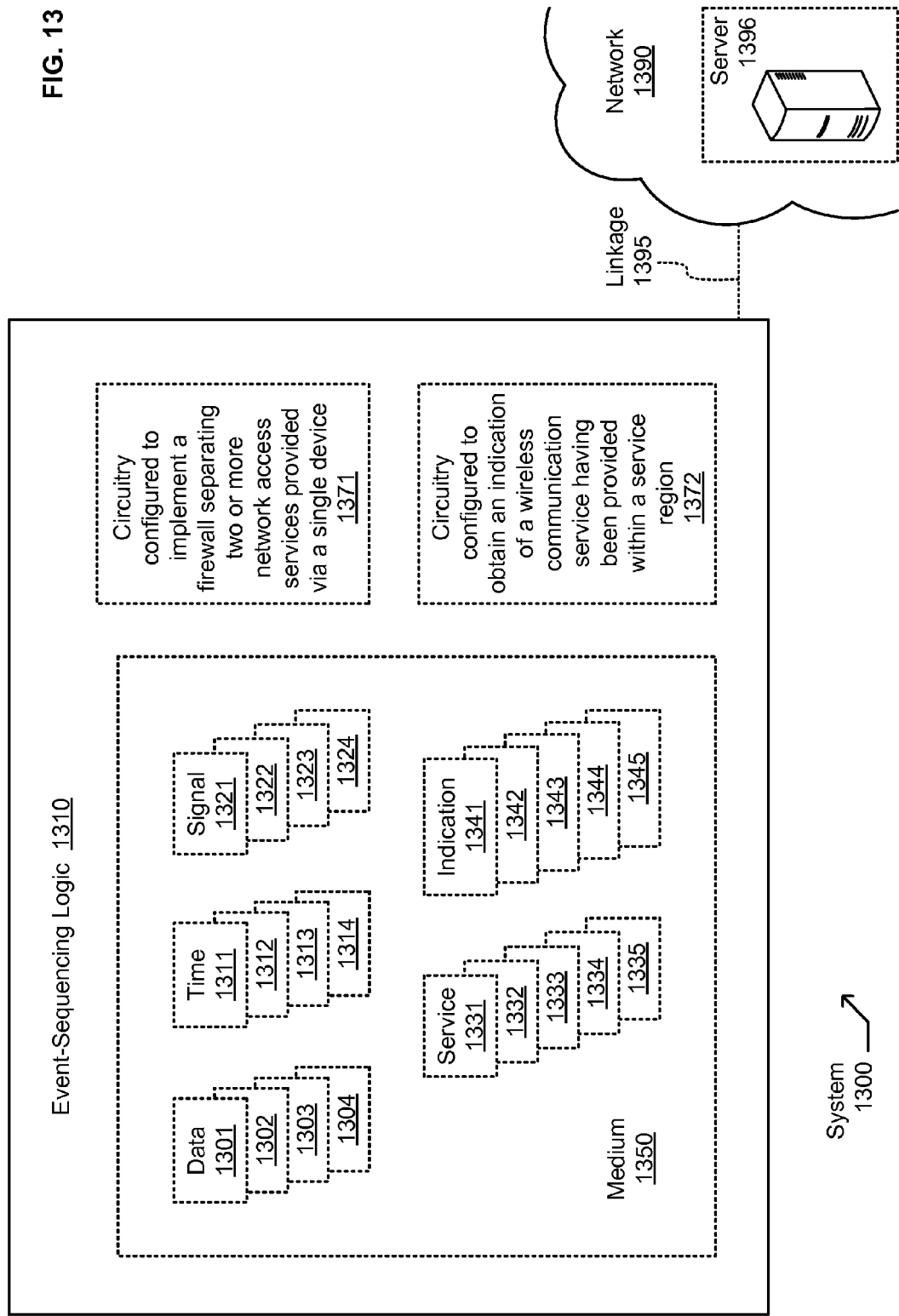

With reference now to FIG. 13, shown is an example of a system 1300 in which one or more technologies may be implemented. Event-sequencing logic 1310 may include various memories 431, 432 or other data-handling media 1350 containing one or more instances of data 1301, 1302, 1303, 1304; of digitally expressed times 1311, 1321, 1323, 1324; of signals 1321, 1322, 1323, 1324; of services 1331, 1332, 1333, 1334, 1335; or of indications 1341, 1342, 1343, 1344, 1345 as described below. Alternatively or additionally, event-sequencing logic 1310 may manifest (in an FPGA 870 or as a general-purpose processing core executing software, e.g.) one or more instances (a) of circuitry configured to implement a firewall separating two or more network access services provided via a single device 1371 or (b) of circuitry configured to obtain an indication of a wireless communication service having been provided within a service region 1372. In some variants, moreover, such logic may be operably coupled via linkage 1395 with a wireless local area network 1390 (comprising one or more servers 1396, e.g.). In some contexts, for example, event-sequencing logic 1310 may be implemented in a circuit board 360 or ASIC 540.

With reference now to FIG. 14, shown is an example of a system 1400 (a network subsystem, e.g.) in which one or more technologies may be implemented. User interface 1410 may include various data-handling media 1450 (of storage or guided transmission or display, e.g.) containing one or more instances of decisions 1401, 1402, 1403, 1404, 1405; of results 1411, 1412, 1413; of digitally expressed volumes 1416; of intervals 1421, 1422, 1423; of notifications 1425; or of other such expressions 1431, 1432 (comprising sequences 1435 of symbols, e.g.). In some variants, moreover, user interface 1410 may manifest (in an FPGA 870 or as a general-purpose processing core executing software, e.g.) one or more instances (a) of circuitry configured to obtain at one device an identifier of another device 1481; (b) of circuitry configured to signal an availability to participate in a telephonic communication responsive to a Boolean indication of a device being within a wireless communication range of another device 1482; or (c) of circuitry configured to detect an availability to participate in a telephonic communication responsive to a Boolean indication whether or not a device exceeded a boundary crossing rate threshold within a recent time interval 1483. In some contexts, for example, user interface 1410 may include a circuit board 360 or ASIC 540 as described above.

Figure 15:
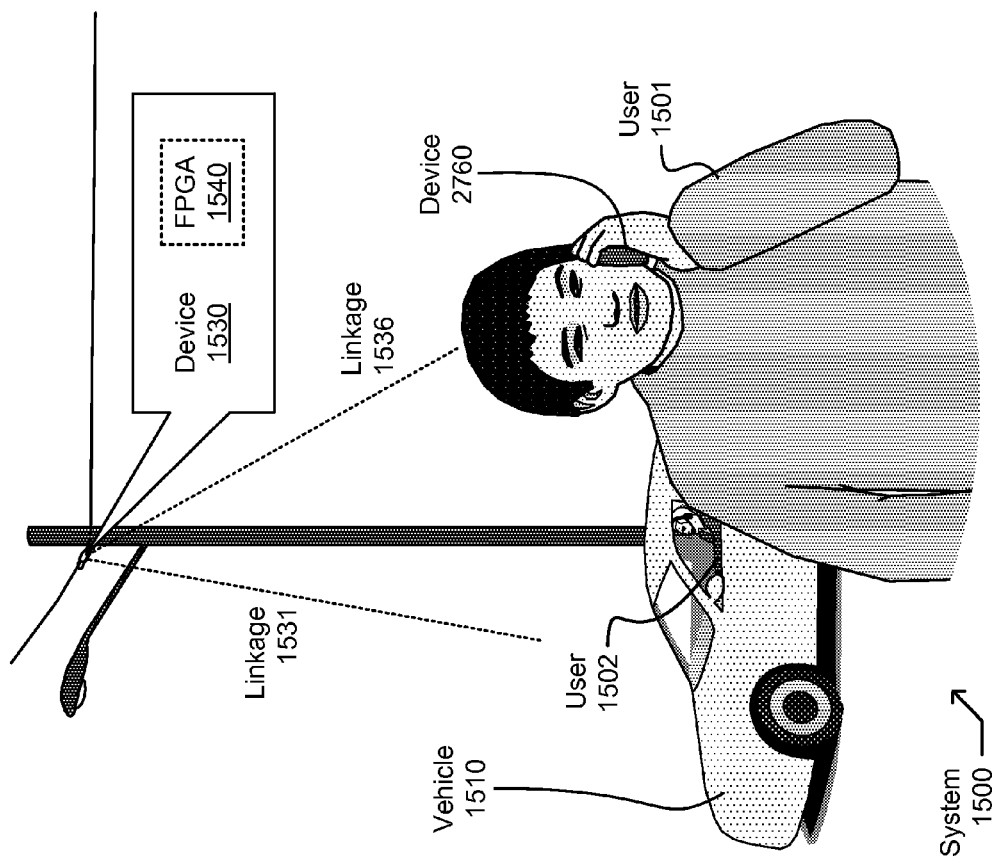
FIG. 15 depicts another exemplary environment in which one or more technologies may be implemented in a stationary device, a vehicle, or a handheld device.

With reference now to FIG. 15, shown is an example of a system 1500 in which one or more technologies may be implemented. Device 1530 may communicate via linkage 1531 with a vehicle 1510 (optionally implementing a mobile hotspot, e.g.) operated by user 1502 or with a handheld device 2760 operated by user 2701 (via a WLAN or other wireless linkage 1536, e.g.). Alternatively or additionally, device 1530 may (optionally) include one or more instances of FPGA 1540 configured to facilitate network management as described below. In some contexts, for example, device 1530 may include a circuit board 360 or ASIC 540 as described above.

In light of teachings herein, moreover, numerous existing techniques may be applied for configuring special-purpose circuitry or other structures effective for implementing such communication (in mesh networks comprising moving nodes, e.g.) as described herein without undue experimentation. See, e.g., U.S. Pat. No. 8,311,509 ("Detection, communication and control in multimode cellular, TDMA, GSM, spread spectrum, CDMA, OFDM WiLAN and WiFi systems"); U.S. Pat. No. 8,259,822 ("Polar and quadrature modulated cellular, WiFi, WiLAN, satellite, mobile, communication and position finder systems"); U.S. Pat. No. 8,249,256 ("Method for providing fast secure handoff in a wireless mesh network"); U.S. Pat. No. 8,248,968 ("Method and apparatus for providing mobile inter-mesh communication points in a multi-level wireless mesh network"); U.S. Pat. No. 8,223,694 ("Enhanced information services using devices in short-range wireless networks"); U.S. Pat. No. 8,219,312 ("Determining speed parameters in a geographic area"); U.S. Pat. No. 8,200,243 ("Mobile television (TV), internet, cellular systems and Wi-Fi networks"); U.S. Pat. No. 8,184,656 ("Control channel negotiated intermittent wireless communication"); U.S. Pat. No. 8,169,311 ("Wireless transmission system for vehicular component control and monitoring"); U.S. Pat. No. 8,165,091 ("Efficient handover of media communications in heterogeneous IP networks using LAN profiles and network handover rules"); U.S. Pat. No. 8,125,896 ("Individualizing a connectivity-indicative mapping"); U.S. Pat. No. 8,111,622 ("Signal routing dependent on a node speed change prediction"); U.S. Pat. No. 8,098,753 ("Infrared, touch screen, W-CDMA, GSM, GPS camera phone"); U.S. Pat. No. 7,646,712 ("Using a signal route dependent on a node speed change prediction"); U.S. patent application Ser. No. 13/317,988 ("Context-sensitive query enrichment"); U.S. patent application Ser. No. 11/252,206 ("Signal routing dependent on a loading indicator of a mobile node"); U.S. patent application Ser. No. 11/221,421 ("Heading dependent routing"); and U.S. patent application Ser. No. 11/221,396 ("Heading dependent routing method and network subsystem").

Figure 16:
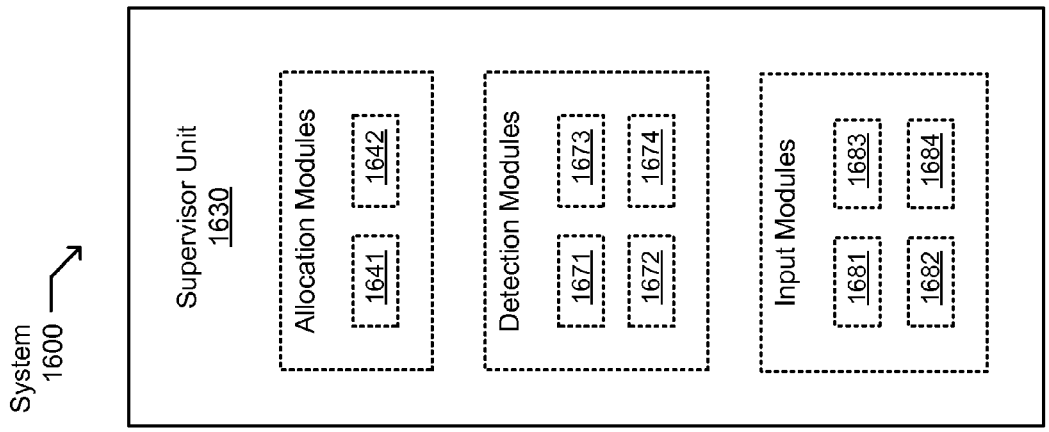
FIG. 16 depicts another exemplary environment in which one or more technologies may be implemented in a supervisor unit.

With reference now to FIG. 16, shown is an example of a system 1600 (a network subsystem, e.g.) in which one or more technologies may be implemented. Supervisor unit 1630 (instantiated in a vehicle 1510 or other device, e.g.) includes one or more instances of allocation modules 1641, 1642; of detection modules 1671, 1672, 1673, 1674; or of input modules 1681, 1682, 1683, 1684 as described below. In some contexts, for example, supervisor unit 1630 may include a circuit board 360 or ASIC 540 as described above.

With reference now to FIG. 17, shown is an example of a system 1700 comprising a portable or other device 1750 in a communication network 1790 (an ad hoc or mesh network, e.g.) in which one or more technologies may be implemented. Numerous other devices 1752, 1754, 1756, 1758, 1760, 1762, 1764, 1766, 1768, 1770, 1772, 1774, 1776, 1778, 1780, 1782, 1784, 1786 (each comprising a cell tower or handheld device or vehicle or other portable device, e.g.) are linked via various passive-media linkages 1771 (through air or cables, e.g.). In various implementations, device 1750 may (optionally) include one or more instances of interface modules 1721, 1722, 1723, 1724, 1725, 1726; of response modules 1731, 1732, 1733, 1734, 1735, 1736, 1737, 1738, 1739; or of notification modules 1741, 1742, 1743, 1744, 1745, 1746 described below. Alternatively or additionally, one or more devices 1754, 1786 (implemented as supervisor units having access to one or more databases defining service characteristics pertaining to a local jurisdiction, e.g.) may be configured to send configuration data (extracted or otherwise derived from such databases, e.g.) manifesting wireless channel attributes (implementing power and frequency limitations relating to regulatory specifications, e.g.) to other devices in network 1790, effectively specifying how they are to reconfigure themselves. See FIGS. 18-23. Such adjustments can be used for congestion relief (during peak usage times, e.g.), for example, or for other resource management as described herein. In some contexts, for example, such devices 1750 may include a circuit board 360 or ASIC 540 as described above.

Figure 18:
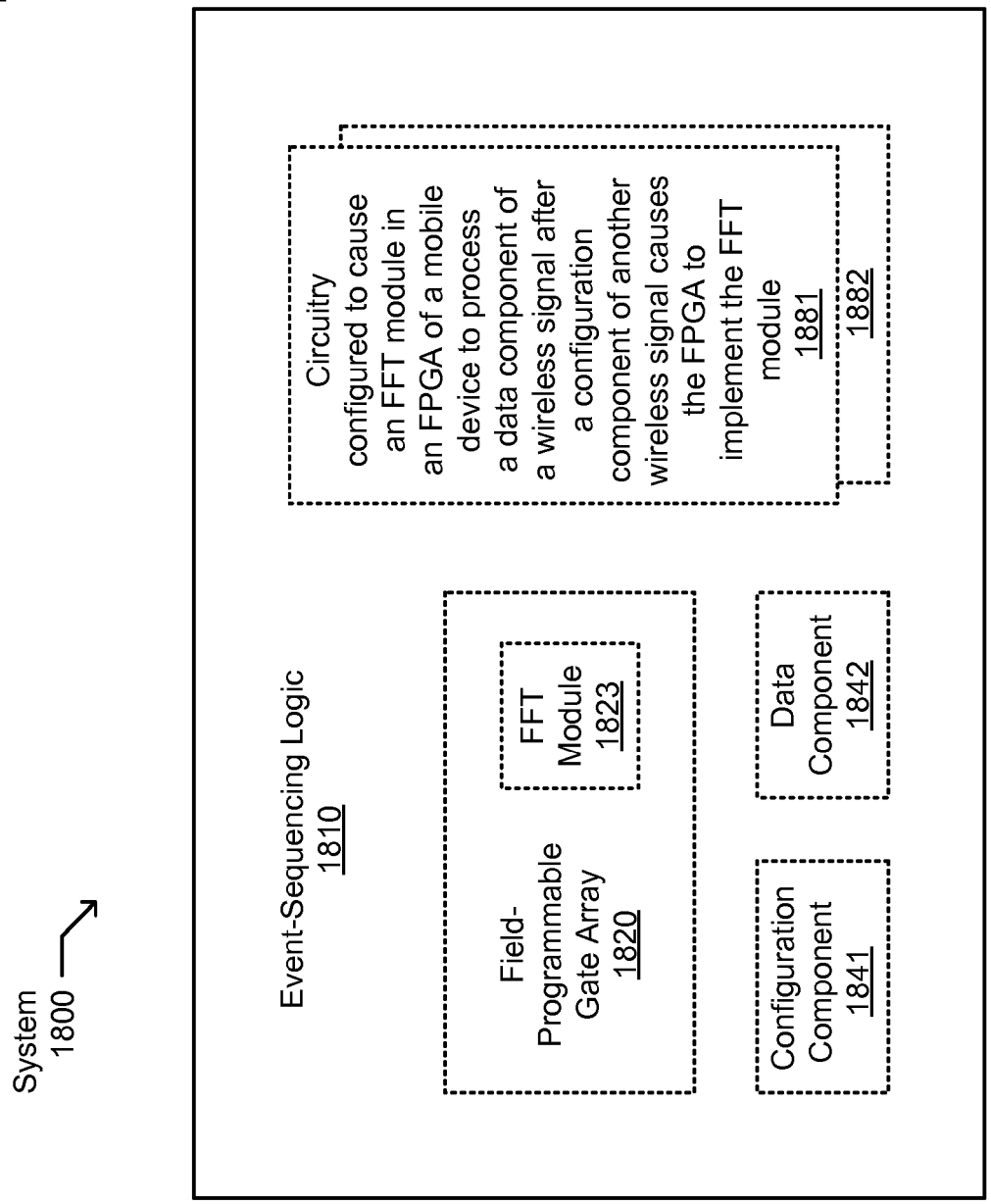
FIG. 18 depicts another exemplary environment in which one or more technologies may be implemented in circuitry or other event-sequencing logic.

With reference now to FIG. 18, shown is an example of a system 1800 in which one or more technologies may be implemented. Event-sequencing logic 1810 (implemented in a circuit board 360 or ASIC 540, e.g.) may include one or more instances of FPGAs 1820 or of configuration components 1841 and data components 1842 of signals. In some contexts, for example, an FPGA 1820 may be configured or reconfigured to include a Fast Fourier Transform (FFT) module 1823 or other event-sequencing structures as described below. Moreover some variants of event-sequencing logic 1810 may locally manifest one or more instances of circuitry configured to cause an FFT module in an FPGA of a mobile device to process a data component of a wireless signal after a configuration component of another wireless signal causes the FPGA to implement the FFT module 1881, 1882.

Figure 19:
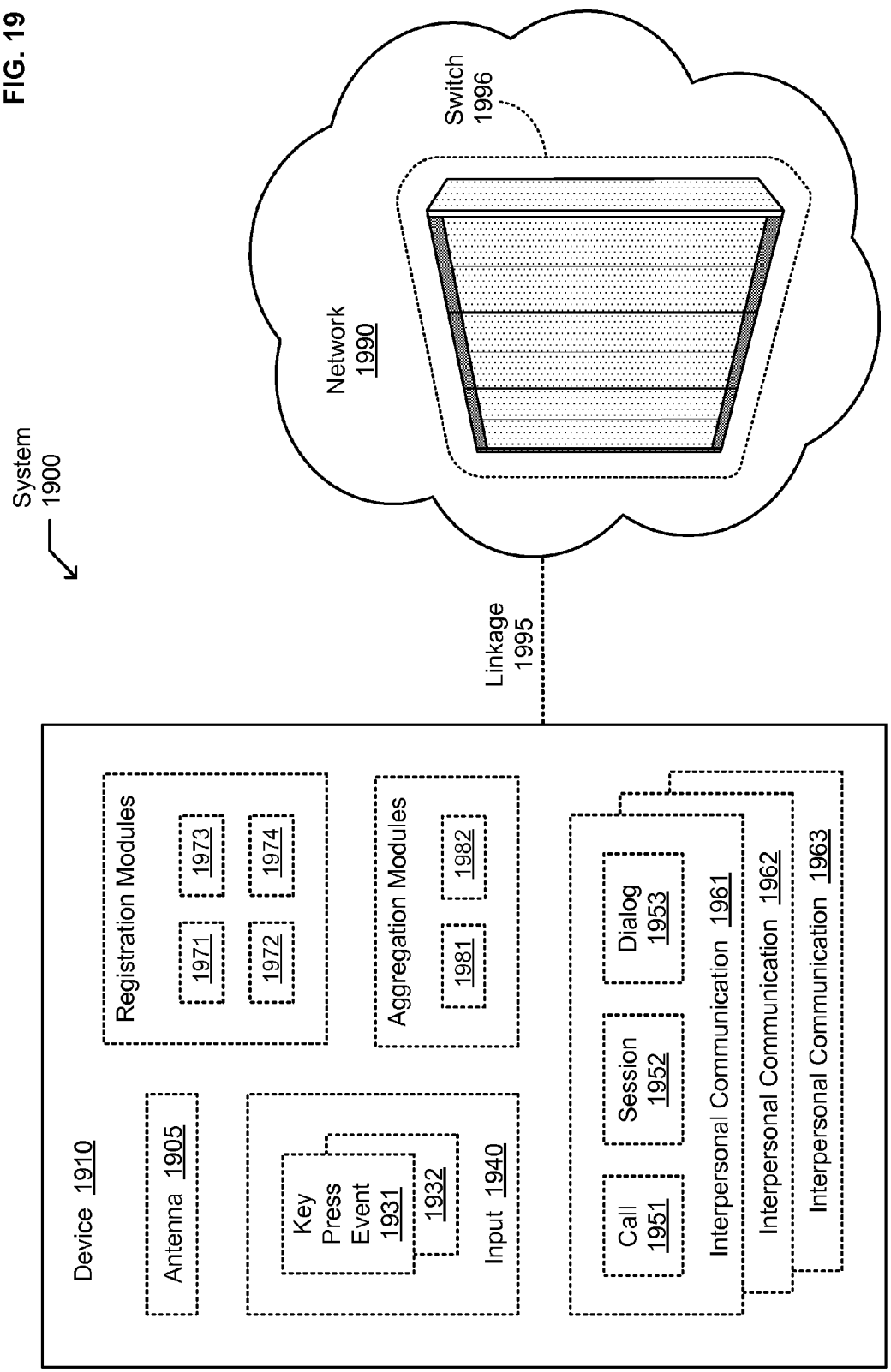
FIG. 19 depicts another exemplary environment in which one or more technologies may be implemented in a device that facilitates interpersonal communications.

With reference now to FIG. 19, shown is an example of a system 1900 in which one or more technologies may be implemented. Device 1910 (instantiated in one or more devices 1754, 1764 of network 1790, e.g.) may include one or more instances of key press events 1931, 1932 or other such user input 1940 (manifested digitally, e.g.); of interpersonal communications 1961, 1962, 1963 (calls 1951 or sessions 1952 or dialogs 1953, e.g.); of registration modules 1971, 1972, 1973, 1974; or of aggregation modules 1981, 1982. Such devices 1910 may be operably coupled via a wireless or other linkage 1995 with telephone network 1990 (comprising one or more telephone switches 1996, e.g.). Alternatively or additionally, such devices 1910 may comprise one or more antennas 1905 (parabolic or shortwave or whip or Yagi-Uda or metamaterial antennas, for example, instantiated in FIG. 17 mechanically coupled with most or all of devices 1750, 1752, 1754, 1756, 1758, 1760, 1762, 1764, 1766, 1768, 1770, 1772, 1774, 1776, 1778, 1780, 1782, 1784, 1786). In some contexts, for example, device 1910 may include a circuit board 360 or ASIC 540 as described above.

Figure 20:
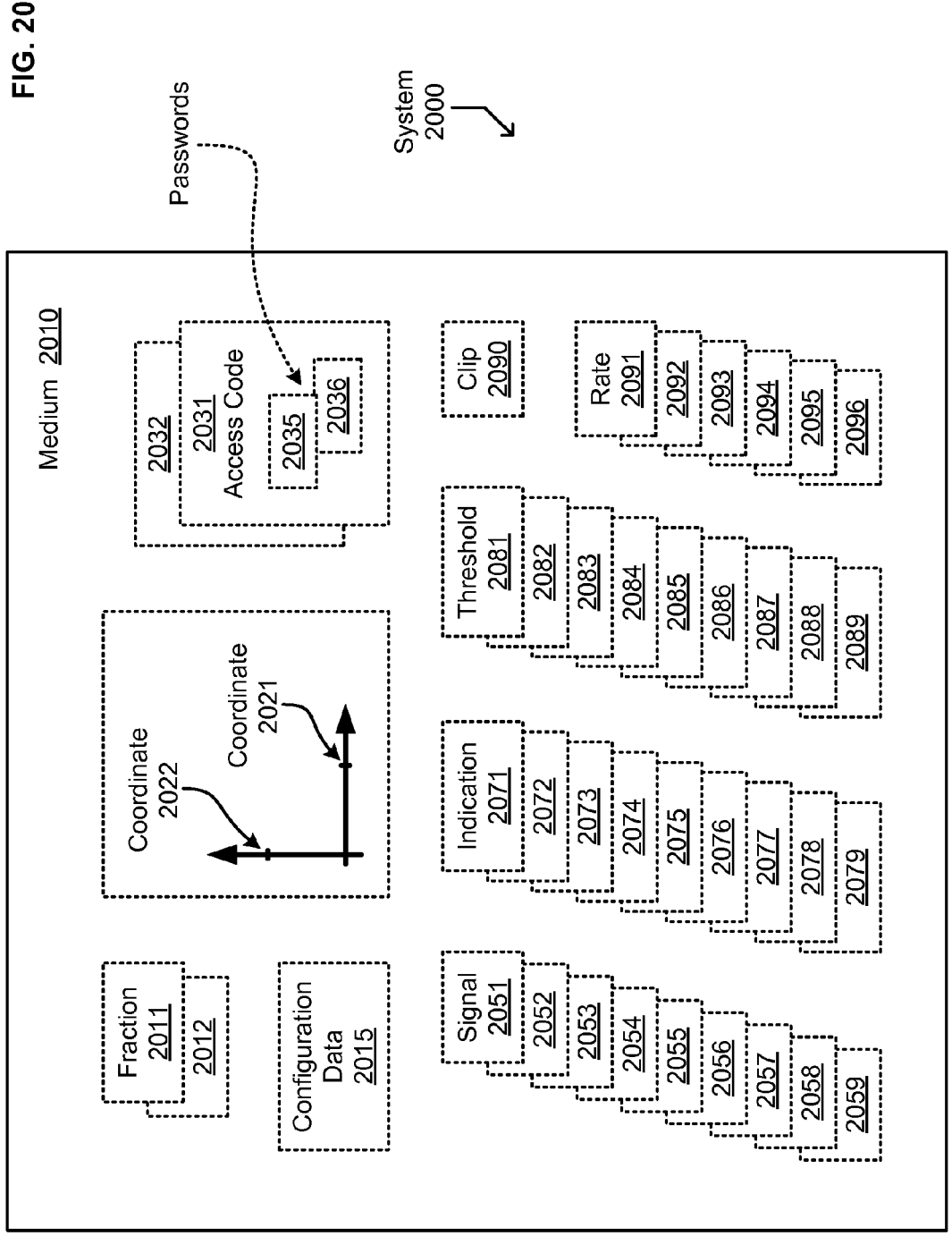
FIGS. 20-23 each depict an exemplary environment in which one or more technologies may be implemented in one or more data-handling media.

With reference now to FIG. 20, shown is an example of a system 2000 in which one or more technologies may be implemented. One or more media 2110 (of storage or guided transmission or display, e.g.) may contain one or more instances of digitally expressed fractions 2011, 2012; of configuration data 2015; of coordinates 2021, 2022; of passwords 2035, 2036 or other access codes 2031, 2032; of signals 2051, 2052, 2053, 2054, 2055, 2056, 2057, 2058, 2059; of indications 2071, 2072, 2073, 2074, 2075, 2076, 2077, 2078, 2079; of thresholds 2081, 2082, 2083, 2084, 2085, 2086, 2087, 2088, 2089; of clips 2090 (of video or audio data, e.g.); or of rates 2091, 2092, 2093, 2094, 2095, 2096.

Figure 21:
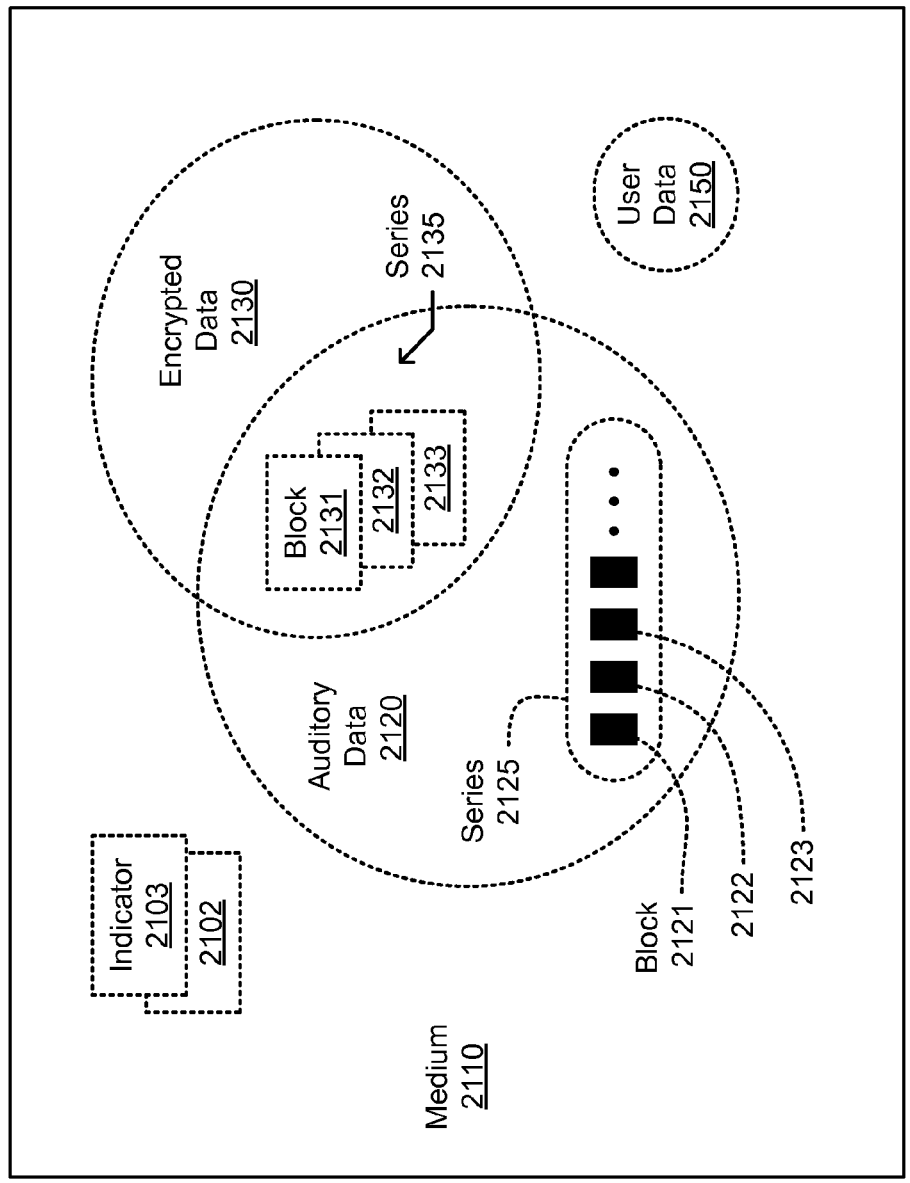

With reference now to FIG. 21, shown is an example of a system 2100 in which one or more technologies may be implemented. One or more memories or other media 2110 may contain one or more instances of indicators 2102, 2103; of series 2125 of data blocks 2121, 2122, 2123 of auditory data 2120 (primarily having been obtained via a microphone, e.g.); or of series 2135 of data blocks 2131, 2132, 2133 of encrypted data 2130. Other user data 2150 of interest for present purposes may (optionally) include other encrypted data 2130, video or other image data; or computational modeling data (pertaining to meteorology or research, e.g.).

Figure 22:
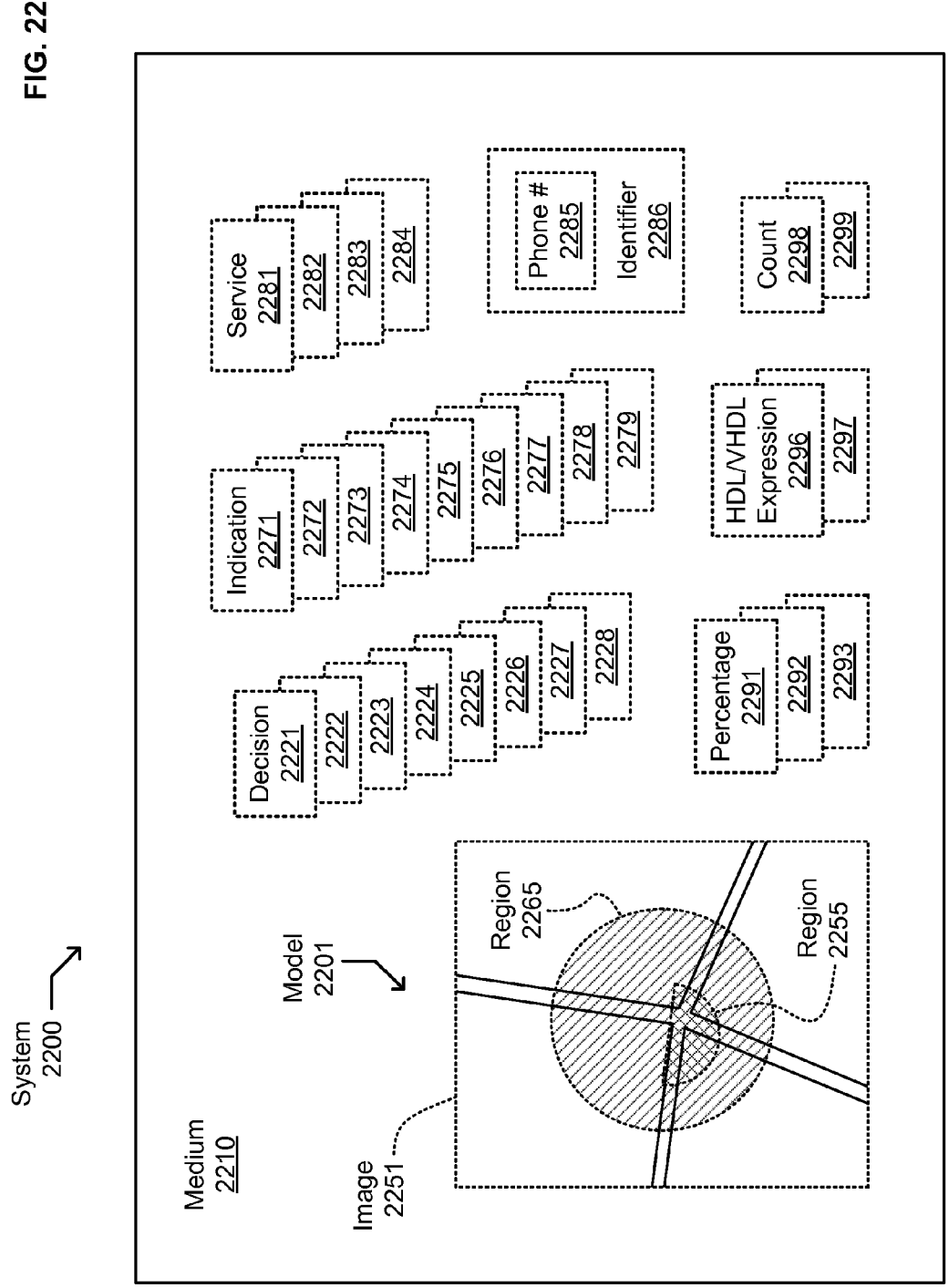

With reference now to FIG. 22, shown is an example of a system 2200 in which one or more technologies may be implemented. One or more memories or other media 2210 (of storage or guided transmission or display, e.g.) may comprise one or more instances of informational models 2301; of images 2251; of decisions 2221, 2222, 2223, 2224, 2225, 2226, 2227, 2228; of indications 2271, 2272, 2273, 2274, 2275, 2276, 2277, 2278, 2279; of services 2281, 2282, 2283, 2284; of phone numbers 2285 or other such identifiers 2286; of percentages 2291, 2292, 2293; of hardware description language (HDL or VHDL, e.g.) expressions 2296, 2297; or of counts 2298, 2299. Image 2251, for example, depicts virtual regions 2255, 2265 relating to actual regions 155, 165 as generally described below (with reference to FIG. 1, e.g.).

Figure 23:
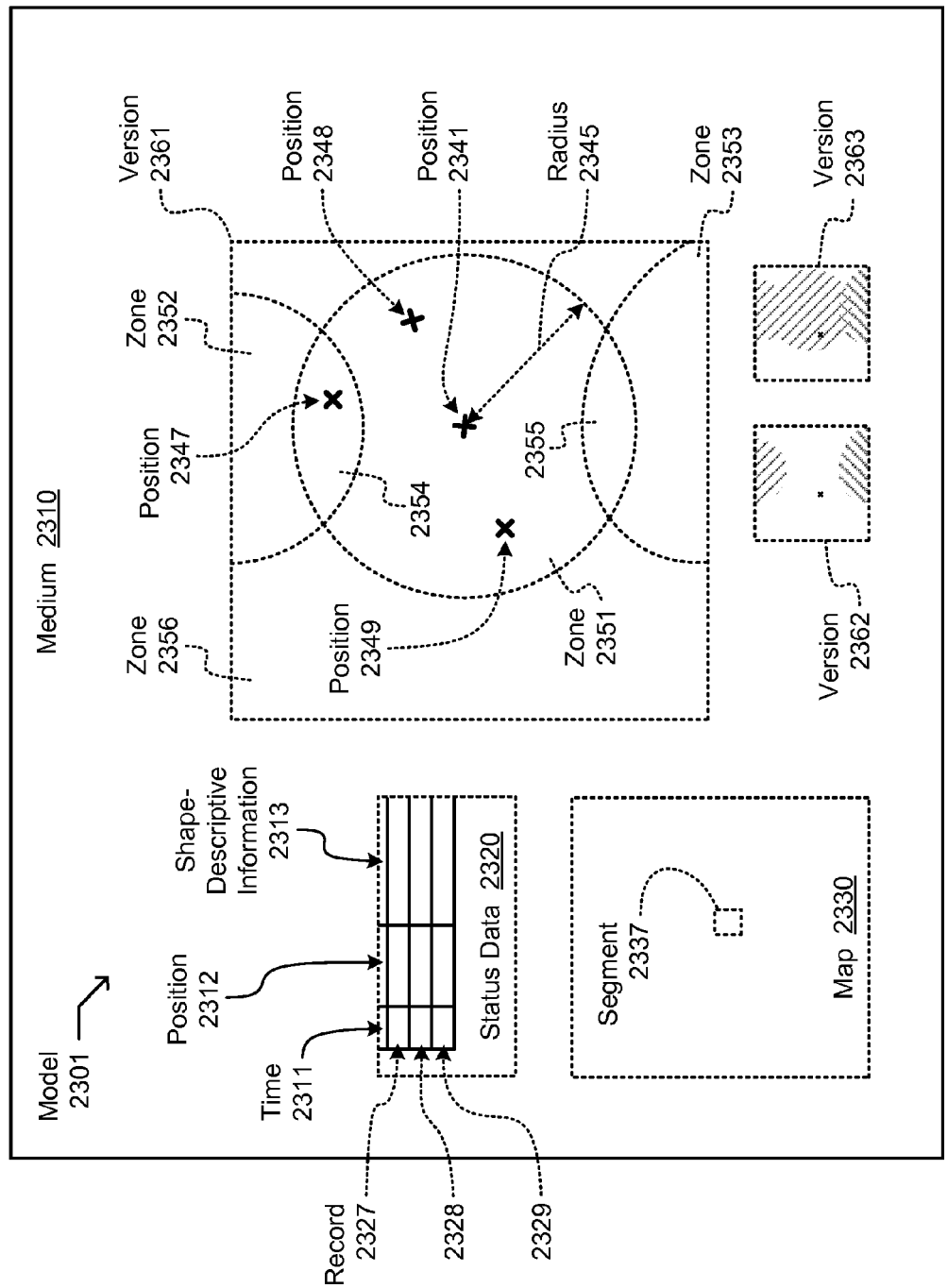

With reference now to FIG. 23, shown is an example of a system 2300 in which one or more technologies may be implemented. One or more memories or other media 2310 may comprise one or more instances of informational models 2301; of status data 2320; of maps 2330 or segments 2337 thereof; or of versions 2361, 2362, 2363 (of an image or other expression of model 2301, e.g.). In some contexts, for example, such status data may (optionally) include one or more records 2327, 2328, 2329 each comprising one or more expressions (1) of times 2311, (2) of positions 2312, or (3) of shape-descriptive information 2313 relating to one or more wireless service regions or devices. Several non-overlapping zones 2351, 2352, 2353, 2354, 2355, 2356 are shown. Some zones 2351, 2354, 2355 together form a circular region centered at position 2341, containing several identified positions 2347, 2348, 2349, and having a radius 2345 representing a real-world radius on the order (within an order of magnitude) of ten meters or of one kilometer. Another version 2362 depicts position 2349 outside a region (comprising zones 2352, 2354) of service 1331. Another version 2363 depicts position 2349 within a region (comprising zones 2351, 2352, 2354, 2355) of service 1331 but not within an overlapping region (comprising zones 2353, 2355) of service 1332. Such versions depict various states (including Wi-Fi service outages, e.g.), modes of model updates, or cost-indicative depictions of such services as generally described below (with reference to FIG. 31, e.g.).

Figure 24:
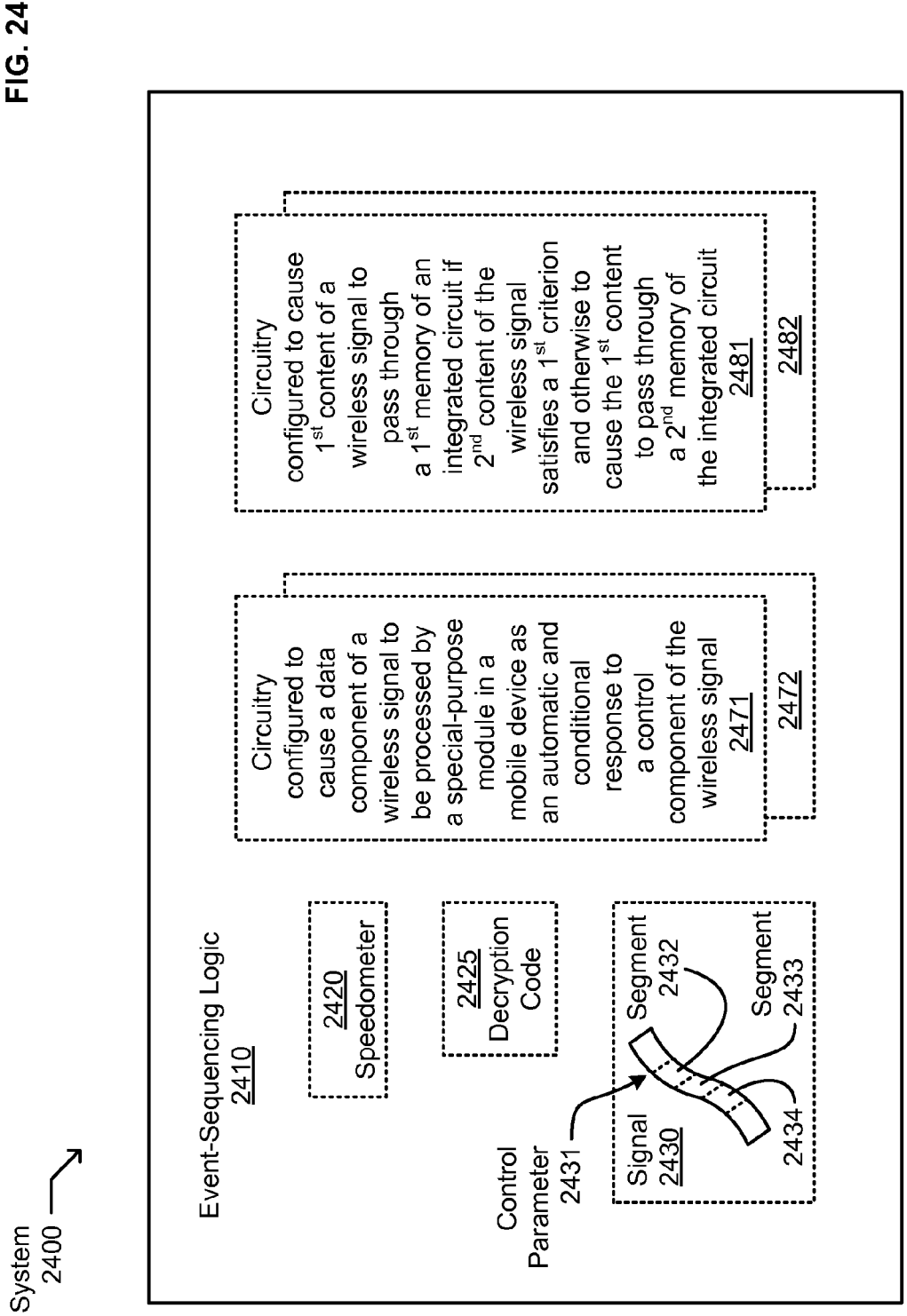
FIG. 24 depicts another exemplary environment in which one or more technologies may be implemented in circuitry or other event-sequencing logic.

With reference now to FIG. 24, shown is an example of a system 2400 in which one or more technologies may be implemented. Event-sequencing logic 2410 may bear (as a digital expression, e.g.) one or more instances of decryption code 2425 or signals 2430. In a context in which event-sequencing logic 2410 includes one or more digital or analog speedometers 2420 (instantiated in one or more vehicles 1510 or other mobile devices 160, 2760, e.g.), for example, such signals may comprise data indicating a ground speed or a geographic position (of GPS module 1122 or other event-sequencing logic 1110, 2410, e.g.). Alternatively or additionally, such signals may include one or more instances of control parameters 2431 or of data segments 2432, 2433, 2434 (user data, e.g.). In some variants, moreover, event-sequencing logic 2410 (instantiated in one or more devices 1750, 1772 of network 1790, e.g.) may manifest (in an FPGA 870, 1540, 1820 or as a general-purpose processing core executing software, e.g.) one or more instances (a) of circuitry configured to cause a data component of a wireless signal to be processed by a special-purpose module in a mobile device as an automatic and conditional response to a control component of the wireless signal 2471, 2472 or (b) of circuitry configured to cause first content of a wireless signal to pass through a first memory of an integrated circuit if second content of the wireless signal satisfies a first criterion and otherwise to cause the first content to pass through a second memory of the integrated circuit 2481, 2482. In some contexts, for example, event-sequencing logic 2410 may be implemented in a circuit board 360 or ASIC 540 as described above.

Figure 25:
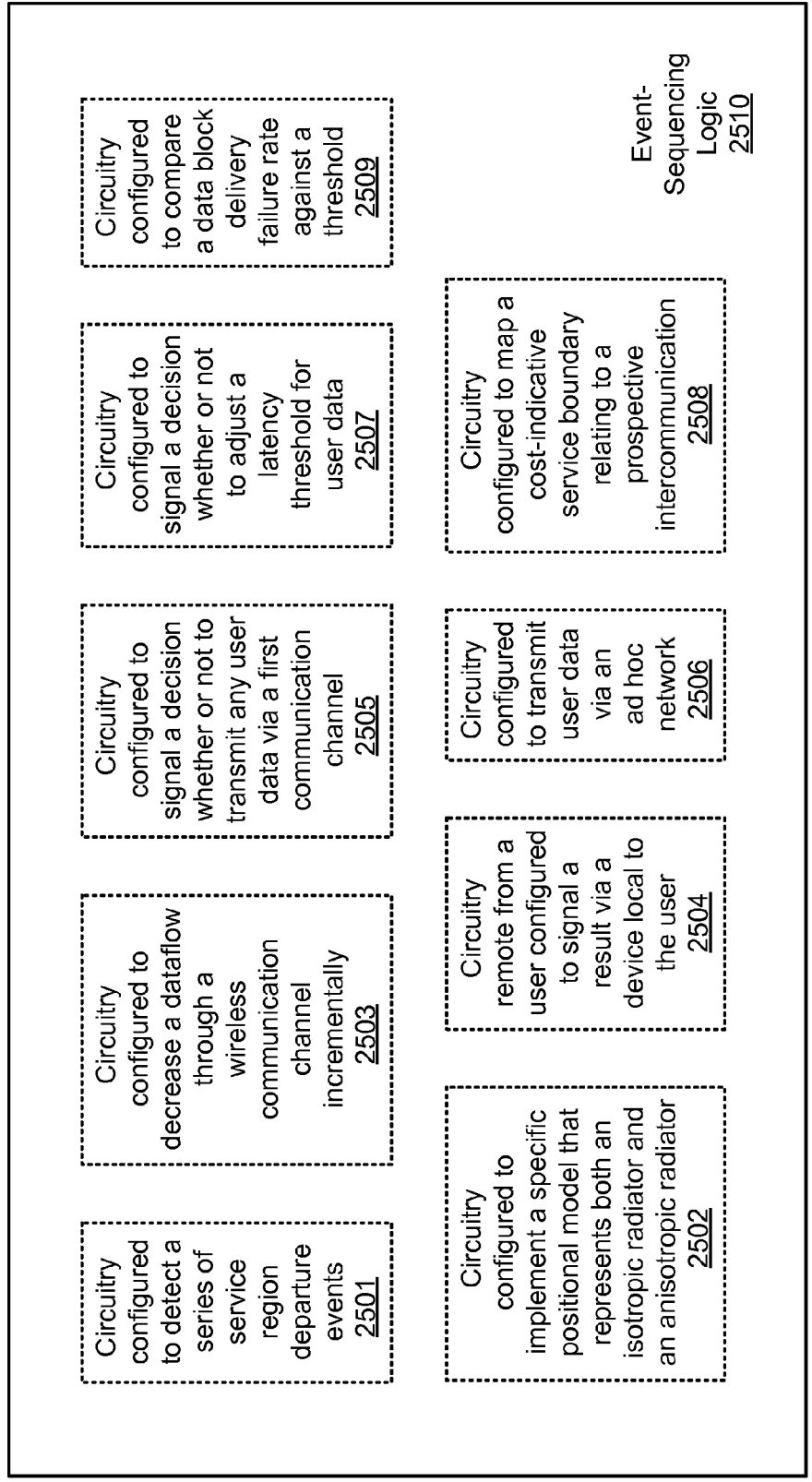
FIG. 25 depicts another exemplary environment in which one or more technologies may be implemented in circuitry or other event-sequencing logic.

With reference now to FIG. 25, shown is an example of a system 2500 in which one or more technologies may be implemented. Contiguous or other event-sequencing logic 2510 (instantiated in one or more devices 1758, 1768, 1778 of network 1790, e.g.) may include (in an FPGA 870, 1540, 1820 or as a general-purpose processing core executing software, e.g.) one or more instances (a) of circuitry configured to detect a series of service region departure events 2501; (b) of circuitry configured to implement a specific positional model that represents both an isotropic radiator and an anisotropic radiator 2502; (c) of circuitry configured to decrease a dataflow through a wireless communication channel incrementally 2503; (d) of circuitry remote from a user configured to signal a result via a device local to the user 2504; (e) of circuitry configured to signal a decision whether or not to transmit any user data via a first communication channel 2505; (f) of circuitry configured to transmit user data via an ad hoc network 2506; (g) of circuitry configured to signal a decision whether or not to adjust a latency threshold for user data 2507; (h) of circuitry configured to map a cost-indicative service boundary relating to a prospective intercommunication 2508; or (i) of circuitry configured to compare a data block delivery failure rate against a threshold 2509. In some contexts, for example, event-sequencing logic 2510 may be implemented in a circuit board 360 or ASIC 540 as described above.

Figure 26:
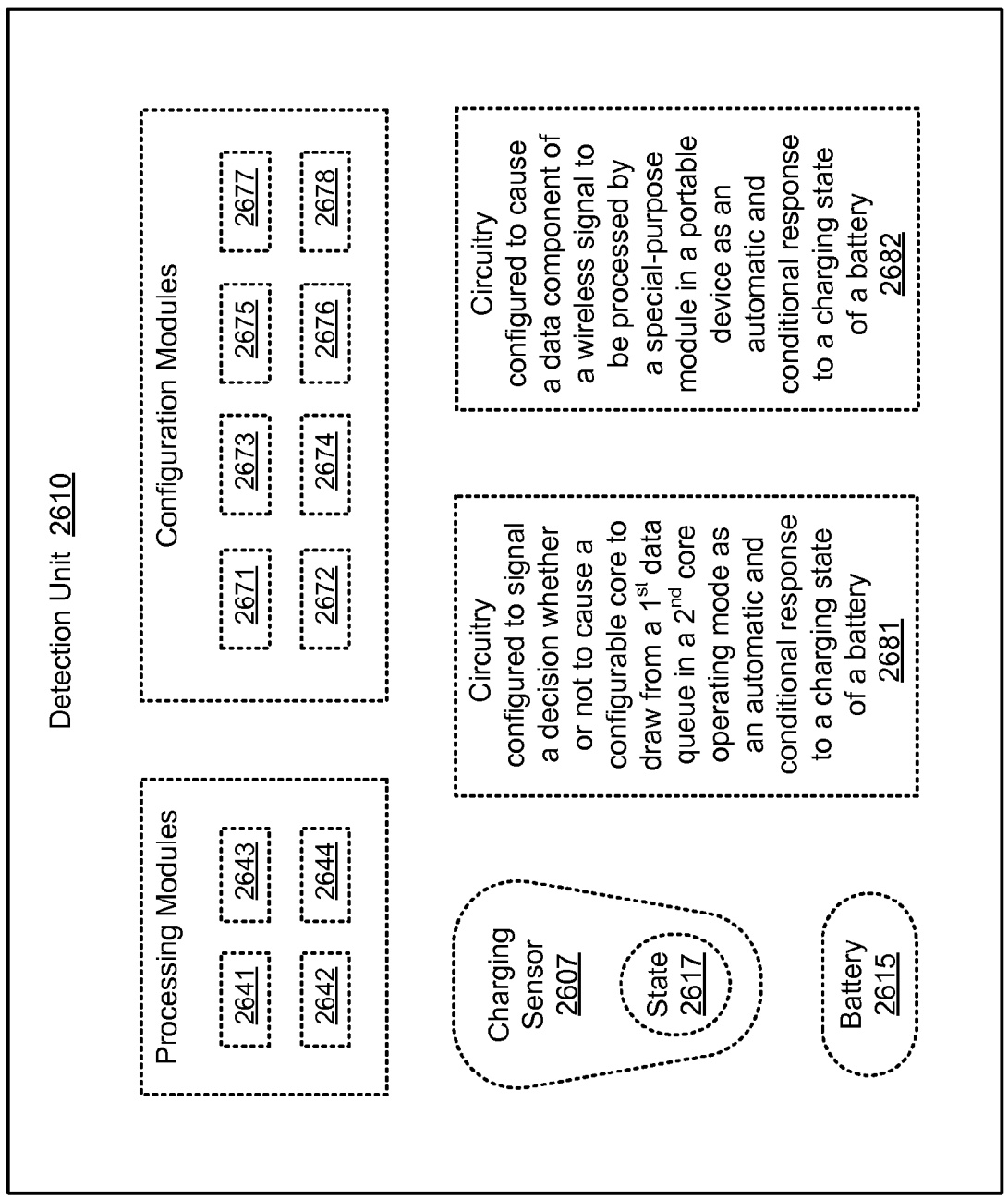
FIG. 26 depicts another exemplary environment in which one or more technologies may be implemented in a detection unit.

With reference now to FIG. 26, shown is an example of a system 2600 in which one or more technologies may be implemented. Detection unit 2610 may (optionally) include one or more instances of processing modules 2641, 2642, 2643, 2644; of configuration modules 2671, 2672, 2673, 2674, 2675, 2676, 2677, 2678; or of a charging sensor 2607 configured to indicate a charging state 2617 (as a Boolean or digital scalar expression, e.g.) of a battery 2615. In some variants, moreover, detection unit 2610 may manifest (on a circuit board 360 or as software executed by a processing core, e.g.) one or more instances of circuitry configured to signal a decision whether or not to cause a configurable core to draw from a first data queue in a second core operating mode as an automatic and conditional response to a charging state of a battery 2681 or of circuitry configured to cause a data component of a wireless signal to be processed by a special-purpose module in a portable device as an automatic and conditional response to a charging state of a battery 2682. In some contexts, for example, detection unit 2610 may be implemented in or operably coupled with a circuit board 360 or ASIC 540 as described above.

Figure 27:
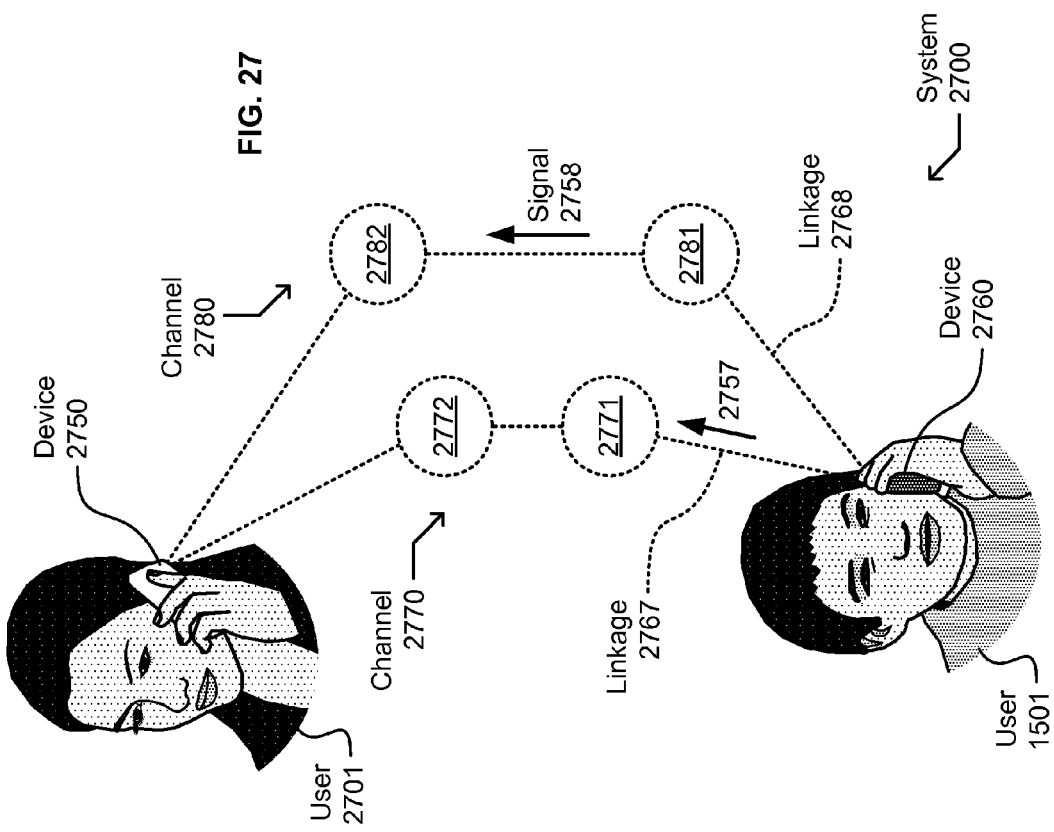
FIG. 27 depicts an exemplary environment in which one or more technologies may be implemented.

With reference now to FIG. 27, shown is an example of a system 2700 in which one or more technologies may be implemented. At least two parallel communication channels 2770, 2780 are established between endpoint devices 2750, 2760 so that an interpersonal communication can occur between device users 1501, 2701. This permits a signal 2757, for example, to travel via linkage 2767 and via one or more intermediate devices 2771, 2772 comprising channel 2770. Likewise a signal 2758 can travel via linkage 2768 and via one or more intermediate devices 2781, 2782 comprising channel 2780. In some variants, moreover, ASIC 540 may be configured either (a) so that channel 2770 includes queue 570 and so that channel 2780 includes queue 580 or (b) so that two or more channels 2770, 2780 are simultaneously processed each through a respective integrated circuit (instances of gate arrays or other IC's 365, 366 mounted on circuit board 360, e.g.).

Figure 32:
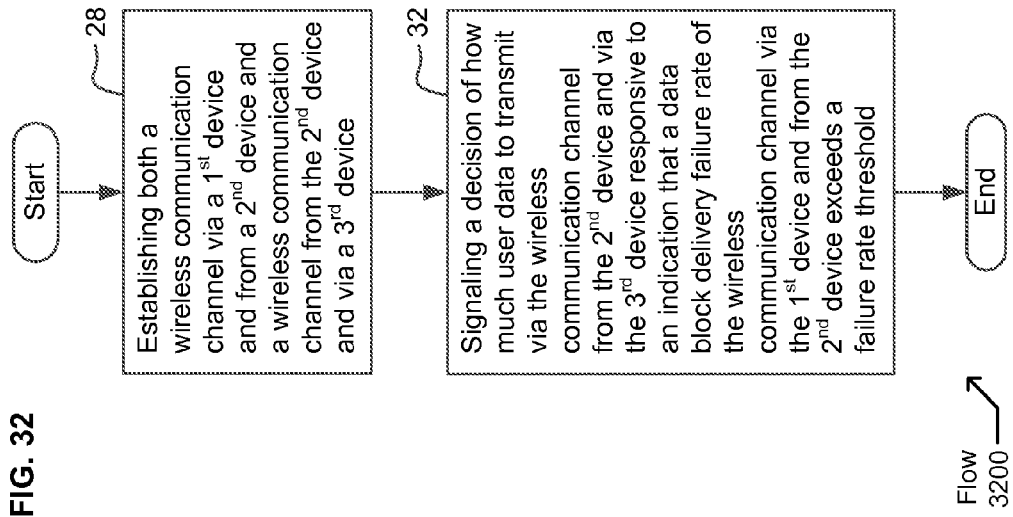
FIG. 32 depicts a high-level logic flow of an operational process (described with reference to FIG. 27, e.g.).

With reference now to FIG. 32, shown is a high-level logic flow 3200 of an operational process. Operation 28 describes establishing both a wireless communication channel via a first device and from a second device and a wireless communication channel from the second device and via a third device (e.g. initiation modules 171, 172 respectively creating parallel communication channels 2770, 2780 from device 2760, each including at least one wireless linkage 2767, 2768). This can occur, for example, in a context in which device 2771 (instantiated in one or more devices 1772, 1774 of network 1790, e.g.) is the "first" device; in which device 2760 (instantiated in one or more devices 1750, 1756, 1774 of network 1790, e.g.) is the "second" device; in which device 2782 is the "third" device; in which channel 2770 comprises one or more devices 2771, 2772 via which signals 2057, 2757 can travel (to and from device 2760, e.g.); in which channel 2780 comprises one or more devices 2781, 2782 via which signals 2058, 2758 can likewise travel in both directions; and in which such channels 2770, 2780 exist simultaneously. In a telephonic implementation, for example, such channels 2770, 2780 may both bear digitized auditory data 2120 simultaneously, optionally including a particular component of user data 2150 (block 2123, e.g.) passing simultaneously through a primary channel 2770 (as signal 2757, e.g.) and redundantly through another channel 2780 (as signal 2758, e.g.).

In light of teachings herein numerous existing techniques may be applied for configuring special purpose circuitry or other structures effective for establishing or characterizing a communication channel as described herein without undue experimentation. See, e.g., U.S. Pat. No. 8,234,523 ("Automatic determination of success of using a computerized decision support system"); U.S. Pat. No. 8,233,471 ("Wireless network system and method for providing same"); U.S. Pat. No. 8,145,975 ("Universal packet loss recovery system for delivery of real-time streaming multimedia content over packet-switched networks"); U.S. Pat. No. 8,054,856 ("Method for synchronizing voice traffic with minimum latency in a communications network"); U.S. Pat. No. 7,835,314 ("Physical layer interface system and method for a wireless communication system"); and U.S. Pat. No. 7,787,896 ("Dispatch service architecture framework").

Operation 32 describes signaling a decision of how much user data to transmit via the wireless communication channel from the second device and via the third device responsive to an indication that a data block delivery failure rate of the wireless communication channel via the first device and from the second device exceeds a failure rate threshold (e.g. allocation module 1641 causing one or more transmission modules 1181, 1182 to increase a fraction 2012 of digitized auditory data 2120 transmitted via channel 2780 as an incremental response to an indication 2076 that a data block delivery failure rate 2091 of channel 2770 exceeds a threshold 2081). This can occur, for example, in a context in which the incremental response causes a partial reduction in a volume of data block delivery failure events; in which data block delivery failure rate 2091 describes a percentage 2291 of data blocks 2121, 2122, 2123 transmitted via linkage 2767 that do not pass via an antenna of device 2771 or that do not reach device 2750 within a permissible latency threshold 2082; in which a volatile memory 262 of supervisor unit 1630 (instantiated in one or more devices 1766, 1772 of network 1790, e.g.) implements several media 2010, 2110, 2210 as described above; and in which such wireless communication channel allocations would otherwise be made in a crude or unduly computation-intensive fashion (by conventional signal strength or load balancing or bit error rate indicia, e.g.). In some contexts, for example, a latency threshold 2082 for digitized voice data communication routing may be less than 0.5 seconds and the effective threshold 2081 applied to data block delivery failure rate 2091 may be less than 5%. Alternatively or additionally, one or both such thresholds 2081, 2082 may effectively depend upon an indication 2075 of one or more attributes of channel 2780 (a data block delivery failure rate 2092 of linkage 2768, e.g.) or other such determinants as described herein. In some contexts, for example, allocation module 1641 may be configured to close channel 2780 when a traffic volume through channel 2780 becomes low enough (after several iterations of operation 32, e.g.).

In light of teachings herein numerous existing techniques may be applied for configuring special purpose circuitry or other structures effective for implementing a timing or other comparison as described herein without undue experimentation. See, e.g., U.S. Pat. No. 8,325,901 ("Methods and apparatus for providing expanded telecommunications service"); U.S. Pat. No. 8,321,727 ("System and method responsive to a rate of change of a performance parameter of a memory"); U.S. Pat. No. 8,320,261 ("Method and apparatus for troubleshooting subscriber issues on a telecommunications network"); U.S. Pat. No. 8,315,622 ("Motion adaptive communications device and integrated circuits for use therewith"); U.S. Pat. No. 8,311,579 ("Multi-mode mobile communication device with motion sensor and methods for use therewith"); U.S. Pat. No. 8,295,395 ("Methods and apparatus for partial interference reduction within wireless networks"); U.S. Pat. No. 8,290,509 ("Deactivation system and method for a transferable device"); U.S. Pat. No. 8,264,953 ("Resilient data communications with physical layer link aggregation, extended failure detection and load balancing"); U.S. Pat. No. 8,224,349 ("Timed fingerprint locating in wireless networks"); U.S. Pat. No. 8,195,478 ("Network performance monitor"); U.S. Pat. No. 8,184,580 ("Data packet communication scheduling in a communication system"); U.S. Pat. No. 7,881,992 ("Methods and systems for processing and managing corporate action information"); and U.S. Pat. No. 7,853,268 ("GPS enabled cell phone location tracking for security purposes").

Figure 28:
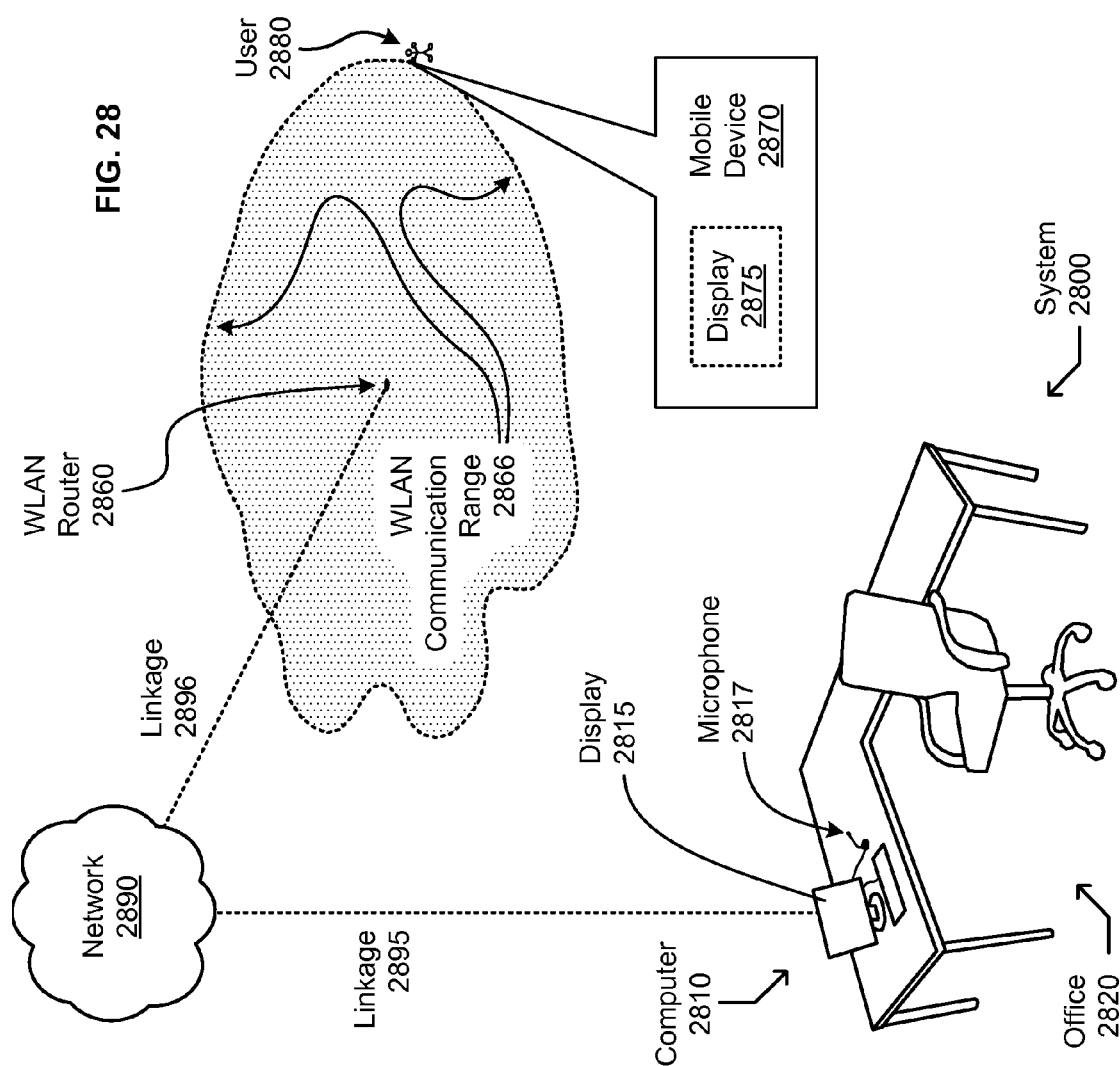
FIG. 28 depicts an exemplary environment in which one or more technologies may be implemented.

With reference now to FIG. 28, shown is an example of a system 2800 in which one or more technologies may be implemented. A computer 2810 in an office 2820 includes a display 2815, a microphone 2817, a keyboard, a speaker, and a mouse. An identifier (phone number 2285, e.g.) of a remote mobile device 2870 or its user 2880 are available (listed, e.g.) at computer 2810. When mobile device 2870 is within a wireless local area network (WLAN) communication range 2866 of one or more WLAN routers 2860 (instantiated in one or more devices 1768, 1784 of network 1700, e.g.), an interpersonal communication (a video chat via displays 2815, 2875 or telephone call, e.g.) can occur via computer 2810 and mobile device 2870 and via linkages 2895, 2896 with network 2890 as shown. In some contexts, moreover, status information concerning mobile device 2870 is available at computer 2810 even before such communication is initiated.

Figure 33:
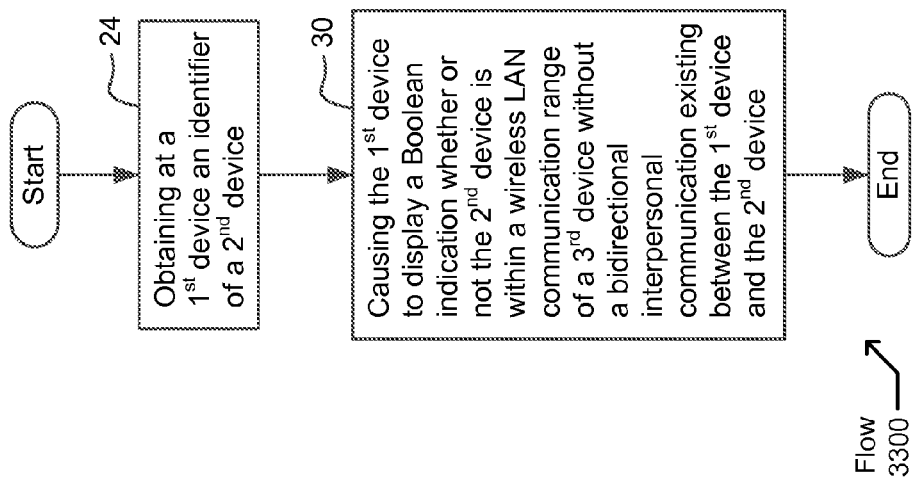
FIG. 33 depicts a high-level logic flow of an operational process (described with reference to FIG. 28, e.g.).

With reference now to FIG. 33, shown is a high-level logic flow 3300 of an operational process. Operation 24 describes obtaining at a first device an identifier of a second device (e.g. registration module 1971 maintaining a local instance of contact list 1250 within computer 2810 including a phone number 2285 or similar identification 1252 associated with user 2880). This can occur, for example, in a context in which computer 2810 is the "first" device (instantiated in one or more devices 1750, 1752 of network 1790, e.g.); in which mobile device 2870 is the "second" device; and in which a telephone switch 1996 or server 1396 associates phone number 2285 with one or more mobile devices 2870 owned by user 2880 (instantiated in one or more devices 1768, 1782, 1786 of network 1790, e.g.).

Operation 30 describes causing the first device to display a Boolean indication whether or not the second device is within a wireless local area network communication range of a third device without a bidirectional interpersonal communication existing between the first device and the second device (e.g. notification module 1744 triggering computer 2810 to display a positive status indication 1254 signifying that mobile device 2870 is within a wireless LAN communication range 2866 without first establishing a telephone call 1951 or similar bidirectional interpersonal communication 1961 between computer 2810 and mobile device 2870). This can occur, for example, in a context in which wireless LAN communication range 2866 is established as an operating range of one or more WLAN devices (wireless LAN router 2860, e.g.); in which display 2815 presents such an indication 1254 in conjunction with other information about user 2880 (in record 1261, e.g.); in which a user 101 of computer 2810 can initiate a telephone call 1951 or similar interpersonal communication 1961 to user 2880 via computer 2810 in response to one or more such indications 1253, 1254; in which such telephone calls 1951 are cost effective (free of charge to user 2880, e.g.); and in which user 2880 would otherwise be unable or displeased to participate in such communication (incurring a significant roaming charge, e.g.).

In light of teachings herein numerous existing techniques may be applied for configuring special purpose circuitry or other structures effective for signaling an availability or other status as described herein without undue experimentation. See, e.g., U.S. Pat. No. 8,306,005 ("Dynamic communication and method of use"); U.S. Pat. No. 8,289,210 ("Location measurement acquisition adaptive optimization"); U.S. Pat. No. 8,271,626 ("Methods for displaying physical network topology and environmental status by location, organization, or responsible party"); U.S. Pat. No. 8,260,896 ("Monitoring business machines using a mesh network on field nodes"); U.S. Pat. No. 8,249,616 ("Satellite (GPS) assisted clock apparatus, circuits, systems and processes for cellular terminals on asynchronous networks"); U.S. Pat. No. 8,208,489 ("Method for reporting downstream packet resequencing status in cable modem"); U.S. Pat. No. 8,195,198 ("System, method and apparatus for protecting privacy when a mobile device is located in a defined privacy zone"); U.S. Pat. No. 8,108,501 ("Searching and route mapping based on a social network, location, and time"); U.S. Pat. No. 8,059,788 ("Telephone software testing system and method"); U.S. Pat. No. 8,059,011 ("Outage notification system"); U.S. Pat. No. 8,037,126 ("Systems and methods of dynamically checking freshness of cached objects based on link status"); U.S. Pat. No. 8,010,230 ("Robotic ordering and delivery apparatuses, systems and methods"); U.S. Pat. No. 8,005,911 ("Systems for communicating current location information among mobile internet users and methods therefor"); U.S. Pat. No. 7,860,648 ("Map display system and method"); and U.S. Pat. No. 7,392,017 ("Assessing wireless network quality").

With reference now to FIG. 29, shown is an example of a system 2900 in which one or more technologies may be implemented. A mobile device 2910 (a communication-enabled vehicle 1510 or handheld device, e.g.) meanders along a path 2901 through a series of positions 2903, 2904, 2905, 2906, 2907, 2908, 2909 at each of which there is an apparent wireless service boundary 2961, 2971, 2981. Even if the devices that provide the wireless service zones 2960, 2970, 2980 in a region 2955 are unknown or unavailable or transient (by hot spot movements or intermittencies, e.g.), a rate at which some such crossings occur constitutes a useful availability determinant as described below.

With reference now to FIG. 34, shown is a high-level logic flow 3400 of an operational process. Operation 27 describes obtaining a Boolean indication of whether or not a first device exceeded a wireless service boundary crossing rate threshold within a recent time interval, the recent time interval being less than an hour (e.g. detection module 1671 generating a comparison result 1411 as a direct or indirect Boolean indication 2271 that a maximum crossing rate threshold 2084 was greater than an average rate 2094 at which device 2910 had apparently crossed wireless service zone boundaries 2961, 2971, 2981 in a region 2955 during a particular time interval 1421). This can occur, for example, in a context in which aggregation module 1171 has received a series of several indications 2071, 2072, 2073, 2074 of crossing events; in which one or more of such indications 2071 was not "qualifying" (because it did not pertain to an event within time interval 1421, e.g.); in which time interval 1421 is on the order of a second or of a minute; and in which detection module 1671 (comprising comparator 1161, e.g.) compares a count 2299 of such other indications 2072, 2073, 2074 with threshold 2084. In an implementation of detection module 1671 in which threshold 2084 is four, for example, a count 2299 of three crossings (e.g. at positions 2904, 2905, 2906) will result in a negative indication 2271 (signifying infrequent crossings, e.g.). In another context (in which only service region departures are "qualifying," e.g.) detection module 1671 may generate a positive indication 2271 (signifying frequent crossings, e.g.) by applying a nominal threshold 2084 of two against a count 2299 of three (signifying registration module 1974 detecting departure events at position 2905 from zone 2970 and at position 2908 from zone 2980 and at position 2909 from zone 2970, e.g.). Other variants of detection module 1671 may perform operation 27 using a variety of protocols. A crossing rate threshold 2084 may be effectively adapted by applying one or more offsets or multipliers to count 2299, for example, or by including other quantitative modifiers as described herein. Alternatively or additionally, detection module 1671 may implement conjunctive determinants (a Boolean value 744 configured to enable indication 2271 conditionally, e.g.); disjunctive determinants (a Boolean value 745 configured to override indication 2271 conditionally, e.g.); or other such modes of implementing comparisons as indicated herein.

Operation 33 describes signaling an availability to participate in a bidirectional interpersonal communication conditionally, partly based on the Boolean indication whether or not the first device exceeded the wireless service boundary crossing rate threshold within the recent time interval and partly based on a Boolean indication of the first device being within a wireless communication range of a second device (e.g. notification module 1743 causing a headset or display 2875 to provide a user 1502, 2880 with an automatic and conditional decision 1404 as to whether or not device 2910 is currently available to participate in a bidirectional interpersonal communication 1962). This can occur, for example, in a context in which device 2910 is the "first" device; in which device 160 is the "second" device; in which wireless service zone 2960 comprises a wireless communication range of device 160; in which decision 1404 will be positive (signaling availability, e.g.) if device 2910 remains continuously within wireless service zone 2960 for longer than time interval 1421; in which time interval 1421 is on the order of a second or of a minute; and in which much more resource-intensive modeling (requiring frequent monitoring of satellite 1093 by GPS module 1122, e.g.) would otherwise be required to determine whether the first device is currently viable for such a communication. In some variants, moreover, determining availability by another mode (purely by a ground speed of device 2910 being low enough, e.g.) might generate false negatives unduly (failing to recognize viable ongoing availability in a context of traveling within region 165 and alongside device 160 for an extended period, e.g.). Decision 1404 may (optionally) be signaled by a sound (a chord, e.g.) or by a word ("ready," e.g.) or other displayed symbol (a light-emitting diode coming on, e.g.), for example, or by other such expressions 1431 played or displayed at user interface 1410 (instantiated in one or more devices 1756, 1758 of network 1700, e.g.). In some embodiments notification module 1743 may signal a positive decision 1404 by establishing the bidirectional interpersonal communication 1962 (comprising a video chat session 1952 or similar dialog 1953, e.g.), moreover, or may signal a negative decision 1404 by doing nothing.

With reference now to FIG. 30, shown is an example of a system 3000 in which one or more technologies may be implemented. Two networks 3080, 3090 are each operably coupled with a communications tower 3085 (instantiated in one or more devices 1750, 1770 of network 1700, e.g.) and with a network access control (NAC) unit 3030 (implementing a wireless router, e.g.) comprising several control modules 3031, 3032, 3033, 3034. One such control module 3031 interacts with device 2750 and conditionally provides a first network access service (to network 3080, e.g.). One or more other devices (computer 3060, e.g.) are likewise conditionally provided (by one or more other corresponding control modules 3034, e.g.) with network access service(s) as described below.

With reference now to FIG. 35, shown is a high-level logic flow 3500 of an operational process. Operation 26 describes obtaining via a first device configuration data establishing a first security protocol (e.g. input module 1684 receiving via one or more linkages 295, 995 a secure access code 2031 effectively deeming one or more data patterns 1071 to be "acceptable"). This can occur, for example, in a context in which secondary device 220 includes data storage medium 2010 (non-volatile memory 271, e.g.); in which such linkages include a signal-bearing conduit (an antenna 205, 1905 or optical cable, e.g.) as the "first" device, via which configuration unit 980 transmits access code 2031 to supervisor unit 1630; and in which access code 2031 includes a current password 2035 provided by password generation module 986. In some contexts, for example, a secondary device 220 remote from supervisor unit 1630 may be configured to perform such transmissions regularly (daily, e.g.). Alternatively or additionally, one or more instances of configuration unit 980 may implement an initial security-protocol-implementing data pattern 1071 (during manufacture of supervisor unit 1630, e.g.) for limiting access to one or more services 2281, 2282 (network resources, e.g.) prior to any reconfiguration of supervisor unit 1630.

Operation 29 describes obtaining via a second device a wireless signal containing access request data (e.g. interface module 1721 receiving a wireless signal 1323 containing access request data 1301). This can occur, for example, in a context in which primary device 210 includes event-sequencing logic 1010, 1310 (instantiated in one or more devices 1782, 1784 of network 1700, e.g.); in which the "second" device is an antenna 1905 operably coupled to device 2750 or to NAC unit 3030 (instantiated in one or more devices 1750, 1768, 1774 of network 1790, e.g.); and in which device 2750 transmits wireless signal 1323 as a response to input 1940 (key press events 1931, 1932 or voice commands 1068, e.g.) from user 2701 (initiating a telephone call 1951, e.g.). Alternatively or additionally, device 2750 may transmit access request data 1301 (requesting to establish an open channel 2770, e.g.) as an automatic response to device 2750 entering a zone 2970 (comprising a wireless operating range of device 2772, e.g.).

Operation 31 describes signaling a decision whether or not to provide a first network access service via a third device responsive to whether or not the access request data in the wireless signal satisfies the first security protocol (e.g. registration module 1972 signaling a decision 1401 to provide device 2750 with a service 1333 that includes access to network 3080 via control module 3031 as an automatic and conditional response to application module 1041 determining that access request data 1301 matches security-protocol-implementing data pattern 1071).

In light of teachings herein numerous existing techniques may be applied for configuring special purpose circuitry or other structures effective for providing a limited access service as described herein without undue experimentation. See, e.g., U.S. Pat. No. 8,311,035 ("Methods and apparatus for communicating internet protocol based control signaling through a communications system"); U.S. Pat. No. 8,306,518 ("Handset service migration automation and subscriber identity module tracking"); U.S. Pat. No. 8,306,005 ("Dynamic communication and method of use"); U.S. Pat. No. 8,300,575 ("Priority bearers in a mobile telecommunication network"); U.S. Pat. No. 8,290,551 ("Systems and methods for efficiently positioning a directional antenna module to receive and transmit the most effective band width of wireless transmissions"); U.S. Pat. No. 8,279,838 ("Mobility mechanisms for home cellular network"); U.S. Pat. No. 8,223,752 ("Method for accessing service resource items that are for use in a telecommunications system"); U.S. Pat. No. 8,204,966 ("Map tile data pre-fetching based on user activity analysis"); U.S. Pat. No. 8,185,122 ("Method for creating a cellular telephone infrastructure"); U.S. Pat. No. 8,161,542 ("Wireless perimeter security device and network using same"); and U.S. Pat. No. 7,957,418 ("Data burst communication techniques for use in increasing data throughput to mobile communication devices").

Operation 35 describes signaling a decision whether or not to provide a second network access service via the third device responsive to whether or not the access request data satisfies a second security protocol, the third device implementing a firewall between the first network access service and the second network access service (e.g. allocation module 1642 signaling a conditional decision 1402 not to provide an entity that transmits access request data 1301 with a service 1334 that includes access to network 3090 as an automatic and conditional response to application module 1042 determining that access request data 1301 does not match security-protocol-implementing data pattern 1072). This can occur, for example, in a context in which device 2750 is the "second" device; in which NAC unit 3030 is the "third" device; in which control module 3031 provides the "second" device with access to network 3080 (as the "first" network access service, e.g.); in which control module 3034 would simultaneously provide a "fourth" device (computer 3060, e.g.) with access to network 3090 (as the "second" network access service, e.g.) if the "fourth" device had transmitted access request data 1302 matching data pattern 1072; in which NAC unit implements event-sequencing logic 810, 1810 (instantiated in one or more devices 1774, 1784 of network 1790, e.g.) and media 1350, 1450; and in which the "first" network access service would otherwise need to be provided by a "fifth" device (tower 3085, e.g.). In some contexts, for example, control module 3032 may implement the firewall between the "first" and "second" network access services (access to networks 3080, 3090 respectively, e.g.). Alternatively or additionally, control module 3033 may be remotely configurable (implemented in an FPGA 870, 1540, 1820 or non-volatile memory 243, e.g.) to permit an adjustment of the location of the firewall or otherwise control an allocation of resources in NAC unit 3030.

With reference now to FIG. 31, shown is an example of a system 3100 in which one or more technologies may be implemented. At an earlier time, router 3101 provided WLAN or other wireless service to any devices 3180 (communication-enabled vehicles 1510 or handheld devices, e.g.) that were within zone 3121. Other routers 3102, 3103 in the region 3155 provide ongoing wireless service within respective disjoint zones 3122, 3123 as shown, and both continue to communicate with network 3190. Another device 3160 obtains wireless service status versions 3162, 3163 (indicating service availability within zone 3121, e.g.) with corresponding timing data 3165 as described below.

In light of teachings herein numerous existing techniques may be applied for configuring special purpose circuitry or other structures effective for implementing a firewall as described herein without undue experimentation. See, e.g., U.S. Pat. No. 8,327,431 ("Managing configurations of a firewall"); U.S. Pat. No. 8,316,435 ("Routing device having integrated MPLS-aware firewall with virtual security system support"); U.S. Pat. No. 8,300,532 ("Forwarding plane configuration for separation of services and forwarding in an integrated services router"); U.S. Pat. No. 8,230,516 ("Apparatus, system, and method for network authentication and content distribution"); U.S. Pat. No. 8,209,400 ("System for data routing in networks"); U.S. Pat. No. 8,121,648 ("Adaptive beamforming configuration methods and apparatus for wireless access points serving as handoff indication mechanisms in wireless local area networks"); U.S. Pat. No. 8,065,357 ("Output management system and method for enabling access to private network resources"); U.S. Pat. No. 8,059,650 ("Hardware based parallel processing cores with multiple threads and multiple pipeline stages"); U.S. Pat. No. 8,024,482 ("Dynamic firewall configuration"); U.S. Pat. No. 8,018,856 ("Director device with visual display arrangement and methods thereof"); U.S. Pat. No. 8,004,971 ("Method and system for scaling network traffic managers using connection keys"); U.S. Pat. No. 7,924,927 ("Distributed functionality in a wireless communications network"); and U.S. Pat. No. 7,804,954 ("Infrastructure for enabling high quality real-time audio").

With reference now to FIG. 36, shown is a high-level logic flow 3600 of an operational process. Operation 25 describes obtaining an indication of a first wireless communication service having been provided within a first service region by a first device at an earlier time (e.g. aggregation module 1981 receiving a notification 1425 that mobile device 3180 was at coordinates 2021, 2022 three weeks ago at which time a wireless service 2283 had been established between device 3180 and network 3190 via router 3101). This can occur, for example, in a context in which FIG. 31 generally depicts the "earlier" time; in which the "first" service region comprises either zone 3121 or a subset of it that excludes zone 3122; in which router 3101 is the "first" device (instantiated in one or more devices 1768, 1770 of network 1790, e.g.); in which notification 1425 arrived at aggregation module 1981 almost three weeks ago; in which aggregation module 1981 maintains status data 2320 about the availability of wireless services within a region 3155 depicted by map 2330; and in which status data 2320 includes an estimated position 2341 of router 3101 (determined by a detection module 1672 using GPS or other triangulation protocols, e.g.) at the earlier time 1311 (three weeks ago, e.g.). In some contexts, for example, timing data 3165 (derived from a signal 1322 from an instance of device 3180 traveling across zones 3121-3123 and maintained in status data 2320, e.g.) may indicate that as of three weeks ago, service 1331 was operative in zones 3121, 3122 and service 1332 was operative in zone 3123. Alternatively or additionally, status data 2320 may (optionally) include indications 2278, 2279 of "latest" wireless service status in several zones 2351-2355 near the most-recent estimated position 2341 of router 3101.

In light of teachings herein numerous existing techniques may be applied for configuring special purpose circuitry or other structures effective for characterizing a position as described herein without undue experimentation. See, e.g., U.S. Pat. No. 8,301,159 ("Displaying network objects in mobile devices based on geolocation"); U.S. Pat. No. 8,295,853 ("Method and system for refining accuracy of location positioning"); U.S. Pat. No. 8,269,618 ("Method and system for remotely monitoring the location of a vehicle"); U.S. Pat. No. 8,165,600 ("System and method for advertising to a Wi-Fi device"); U.S. Pat. No. 8,155,077 ("Active mode internet protocol gateway relocation in a partial meshed deployment"); U.S. Pat. No. 8,108,145 ("Downloading map segment(s) to a cell phone based upon its GPS coordinates and mobility"); and U.S. Pat. No. 7,916,071 ("System and method for determining a reference location of a mobile device").

Operation 34 describes signaling a decision whether or not to indicate the first wireless communication service being operative within the first service region as an automatic and conditional response to an indication from a second device of the first wireless communication service having been operative within the first service region or not at a later time (e.g. response module 185 communicating to user 101 a decision 1403 that is responsive to a recent indication 2275 from device 2870 about one or more wireless services 1331 being operative or inoperative within zone 3121). This can occur, for example, in a context in which mobile device 2870 is the "second" device and has transmitted a signal 1323 at the "later" time 1313 (yesterday, e.g.) from within zones 3121, 3122 (corresponding roughly to map position 2347, e.g.) of which some is maintained (in status data 2320, e.g.); in which the decision 1403 is "negative" if it results in device 2760 displaying status version 3162 (indicating that service 1331 is unavailable within part of zone 3121, e.g.); in which the decision 1403 is "positive" (manifested as an instance of a voltage level 313 above a voltage threshold 2085, e.g.) if it results in device 2760 displaying status version 3163 (indicating that service 1331 is available throughout zone 3121, e.g.); and in which user 101 would otherwise have to traverse the first service region personally to discover whether or not service 1331 is still available there. In some contexts, for example, such a decision 1403 will dictate whether device 2760 will display image version 2362 (negatively indicative of service 1331 at position 2349, e.g.) or image version 2363 (positively indicative of service 1331 at position 2349, e.g.). Alternatively or additionally, such signals from various devices 160, 2760, 2870, 3180 traversing region 3155 may be used (1) by a response module 181 configured to determine an indication 1341 of an approximate range of each router 3101-3103; (2) by a response module 182 configured to determine an indication 1342 of what times of the day or week one of the routers 3102 goes offline; (3) by a response module 183 configured to determine a Boolean indication 2273 whether or not one of the routers 3101 appears to be stationary; (4) by a response module 184 configured to determine a Boolean indication 2272 of whether or not one of the routers 3103 (instantiated in one or more devices 1784, 1786 of network 1700, e.g.) is substantially isotropic; (5) by a response module 186 configured to display via a map 2330 of a user interface 1410 a cost-indicative service boundary relating to a prospective interpersonal communication 1963 via the user interface 1410; or (6) to perform such functions upon other devices described herein.

With reference now to flow 3700 of FIG. 37 and to other flows described above, in some variants, one or more of operations 3754, 3755, 3757, 3758 may be performed in preparation for or in response to or otherwise in conjunction with any of operations 24-35 described above.

Operation 3754 describes causing a data component of a wireless signal to be processed by a special-purpose module in a handheld device as an automatic and conditional response to a thermal state of a temperature sensor in the handheld device (e.g. response module 1735 routing some or all of wireless signal 1324 to a special-purpose video data processing module 2642 unless and until an indication 1343 is received that temperature sensor 608 exceeds a threshold). This can occur, for example, in a context in which a handheld device 2760 implements control logic 610 and other event-sequencing logic 1110, 1350; in which comparator 1162 is configured to determine whether a temperature-indicative signal 2051 therefrom exceeds threshold 2083 and to transmit a Boolean result 1413 of the comparison to response module 1735; in which threshold 2083 is calibrated so that the effective temperature threshold is 47° C.; and in which an extended use of processing module 2642 would otherwise make it uncomfortable for user 1501 to hold device 2760. In some contexts, for example, device 2760 may implement device 1750. Alternatively or additionally, an instance of application module 1043 may be implemented in a server 1396 remote from handheld device 2760 and configured to perform operation 3754 remotely (by controlling how much data 1303, 1304 to include in a wireless signal 1324 as a function of the state 618 of a temperature sensor 608 residing in handheld device 2760, e.g.). By postponing or refraining from transmitting some of the data 1304, for example, such an application module 1043 can effectively cause handheld device 2760 to cool down remotely (by deactivating or slowing operations in one or more processing modules 2641, 2642 aboard handheld device 2760, e.g.) without wasting transmission bandwidth. In another variant, moreover, operation 3754 may be performed by a special-purpose response module implemented as or operably coupled with circuitry 671 having an event-sequencing structure (an instance of numerous transistors 351, 352 and voltage levels 311-314 in one or more integrated circuits 361, e.g.) configured to cause a data component of a wireless signal to be processed by a special-purpose module in a handheld device 2760 as an automatic and conditional response to a thermal state 618 of a temperature sensor 608 in the handheld device 2760.

Operation 3755 describes causing a data component of a wireless signal to be processed by a special-purpose module in a portable device as an automatic and conditional response to a charging state of a battery in the portable device (e.g. response module 1736 causing one or more segments 2432-2434 of a wireless signal 2430 to be handled by a special-purpose processing module 2644 in a portable detection unit 2610 as an automatic and conditional response to a sufficient charging state 2617 of a battery 2615). This can occur, for example, in a context in which detection unit 2610 comprises a portable device 1750; in which at least some segments 2434 include coordinates 2021, 2022 in a virtual reality space (game data, e.g.); in which processing module 2644 comprises an FFT module 1823 or other such special-purpose components implemented in FPGA 1820; and in which real-time rendering in response to coordinates 2021, 2022 or other such processing-intensive functions would not otherwise be feasible in a production-grade portable device 1750. In another variant, moreover, operation 3755 may be performed by a special-purpose response module implemented as or operably coupled with circuitry 2682 having an event-sequencing structure configured to cause a data component of a wireless signal to be processed by a special-purpose module 425 in a portable secondary device 220 (instantiated in one or more devices 1750, 1758 of network 1700, e.g.) as an automatic and conditional response to a charging state of a battery 2615. This can occur, for example, in a context in which special-purpose module 425 comprises an FFT module 592, sorting module 595, or detection module 599 formed directly on integrated circuit 440 (implementing ASIC 540, e.g.).

Operation 3757 describes causing a data component of a wireless signal to be processed by a special-purpose module in a mobile device as an automatic and conditional response to a control component of the wireless signal (e.g. interface module 1724 directing one or more data segments 2431-2433 of a wireless signal 2430 from device 1774 to be processed by a special-purpose decryption module 1131 within device 1750 as a conditional response to a control parameter 2431 in the wireless signal 2430 being "10"). This can occur, for example, in a context in which interface module 1724 would direct data segments 2432, 2433 to be decrypted conventionally (by a general purpose central processing unit 212 executing decryption code 2425 resident in internal cache 215, e.g.) in response to control parameter 2431 being "00" or "01" or "11"; and in which the algorithm embodied in such decryption code 2425 would be more readily susceptible to reverse engineering (decompilation, e.g.) than special-purpose decryption module 1131. In some contexts, for example, such a data segment 2432 may (optionally) include telephonic or other encrypted audio data blocks 2131-2133. Alternatively or additionally, in some embodiments, an initiation module 174 in device 1774 may perform operation 3757 by configuring control parameter 2431 to have a value ("10" or "11," e.g.) that causes interface module 1723 to route unencrypted data blocks 2121-2123 to a special-purpose digital-to-analog converter 1125. This can occur, for example, in a context in which interface module 1723 would direct data segments 2432, 2433 to be converted conventionally (by DAC 1126, e.g.) in response to control parameter 2431 being "00" or "01". Alternatively or additionally, in some embodiments, a response module 1737 may be configured to perform an instance of operation 3757 by enabling one or more other response modules 1735, 1736 conditionally, based upon a control parameter 2431 in a received wireless signal 2430. In another variant, moreover, operation 3757 may be performed by a special-purpose interface module implemented as or operably coupled with circuitry 2471 having an event-sequencing structure configured to cause a data segment 2434 of a wireless signal 2430 to be processed by a special-purpose module (FFT module 592 or sorting module 595 or other detection module 599, e.g.) in a mobile device 2760 as an automatic and conditional response to a control parameter 2431 (access code 2032, e.g.) of the wireless signal 2430.

Operation 3758 describes causing first content of a wireless signal to pass either through a first memory of a particular device or through a second memory of the particular device selected as an automatic and conditional response to whether or not second content of the wireless signal satisfies a first criterion (e.g. interface module 1722 routing data blocks in a wireless signal 1321 to pass through queue 570 if they comprise auditory data 2120 and otherwise generally to pass through queue 580). This can occur, for example, in a context in which wireless signal 1321 also includes a Boolean indication 2102 of whether or not the data blocks comprise auditory data 2120, in which queue 570 resides in cache 255 or other volatile memory 262, in which queue 580 resides in phase change memory 231 or other non-volatile memory 242; and in which primary device 210 (instantiated in one or more devices 1752, 1754 of network 1700, e.g.) would otherwise need either to provide an ongoing bias current to volatile memory 262 or to incur performance degradation (resulting from excessive interaction with non-volatile memory 242, e.g.). Alternatively or additionally, interface module 1722 may be configured to route the data blocks in wireless signal 1321 to pass through queue 570 conditionally in response to a "positive" Boolean indication 2103 (signifying that they comprise encrypted data 2130, e.g.). In another variant, moreover, operation 3758 may be performed by a special-purpose interface module implemented as or operably coupled with circuitry 2481 having an event-sequencing structure configured to cause a data component 881 of a wireless signal 2430 to pass through a less-accessible non-volatile memory 243 of an integrated circuit (primary device 210, e.g.) if a configuration component 882 of wireless signal 2430 satisfies a 1st criterion and otherwise to cause the data component 881 to pass through more-accessible memory 242 of the integrated circuit.

Figure 38:
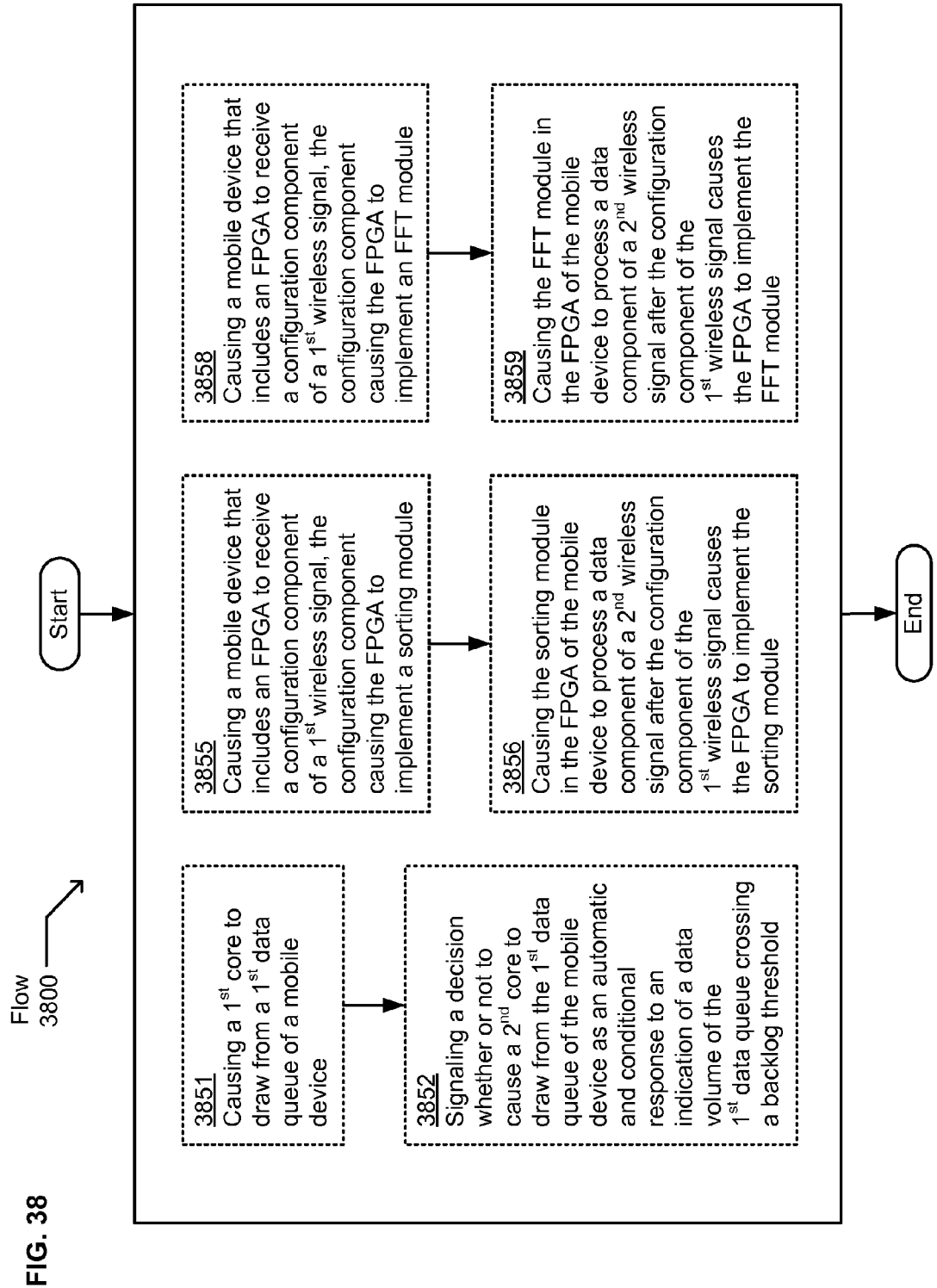
FIG. 38 likewise depicts variants of earlier-presented flows (in any of FIGS. 32-37).

With reference now to flow 3800 of FIG. 38 and to other flows described above, in some variants, several modes are presented. A first provides operation 3851 and operation 3852. A second provides operation 3855 and operation 3856. A third provides operation 3858 and operation 3859. One or more of these modes may be performed in preparation for or in response to or otherwise in conjunction with any of the operations described above.

Operation 3851 describes causing a first core to draw from a first data queue of a mobile device (e.g. configuration module 2697 causing core 701 to draw from data queue 570). This can occur, for example, in a context in which data queue 570 resides in mobile device 160 and in which items 570 comprise data blocks. response module 1734 transmitting a signal 2052 containing a decision 1405 whether or not to cause core 702 to draw from data queue 570 as an automatic and conditional response to an indication of a data volume 1416 of queue 570 crossing a volume threshold 2086). This can occur, for example, in a context in which data queue 570 (a circular buffer, e.g.) resides in a volatile memory 262; in which the volume threshold 2086 signifies more than 50% of a capacity of the volatile memory 262; and in which maintaining effective processing throughput would otherwise require a continuous power expenditure through a larger fraction of event-sequencing logic 710. In another variant, moreover, operations 3851, 3852 may be performed by a special-purpose response module implemented as or operably coupled with circuitry 751 having an event-sequencing structure (an instance of numerous transistors 351, 352 and voltage levels 311-314 in one or more integrated circuits 361, e.g.) configured to signal a decision 2221 of how many cores are to draw simultaneously from a single data queue 570 of a mobile device 160, 2760 as an automatic and conditional response to an indication of a data volume 706 of the data queue 570 crossing a volume threshold 2086.

Operation 3852 describes signaling a decision whether or not to cause a second core to draw from the first data queue of the mobile device as an automatic and conditional response to an indication of a data volume of the first data queue crossing a backlog threshold (e.g. response module 1734 transmitting a signal 2052 containing a decision 1405 whether or not to cause core 702 to draw from data queue 570 as an automatic and conditional response to an indication of a data volume 1416 of queue 570 crossing a volume threshold 2086). This can occur, for example, in a context in which data queue 570 (a circular buffer, e.g.) resides in a volatile memory 262; in which the volume threshold 2086 signifies more than 50% of a capacity of the volatile memory 262; and in which maintaining effective processing throughput would otherwise require a continuous power expenditure through a larger fraction of event-sequencing logic 710. In another variant, moreover, operations 3851, 3852 may be performed by a special-purpose response module implemented as or operably coupled with circuitry 751 having an event-sequencing structure (an instance of numerous transistors 351, 352 and voltage levels 311-314 in one or more integrated circuits 361, e.g.) configured to signal a decision 2221 of how many cores are to draw simultaneously from a single data queue 570 of a mobile device 160, 2760 as an automatic and conditional response to an indication of a data volume 706 of the data queue 570 crossing a volume threshold 2086.

Operation 3855 describes causing a mobile device that includes a field-programmable gate array (FPGA) to receive a configuration component of a first wireless signal, the configuration component causing the FPGA to implement a sorting module (e.g. configuration module 2698 transmitting a wireless signal 2053 that includes configuration data 2015 with which a configuration unit 280 in secondary device 220 implements a sorting module 594 in an FPGA (implemented in integrated circuit 365, e.g.). This can occur, for example, in a context in which configuration data 2015 comprises a Very high speed Hardware Description Language (VHDL) expression 2297; in which primary device 210 implements detection unit 2610; in which mobile device 2760 contains a circuit board 360 comprising secondary device 220; in which integrated circuit 363 comprises medium 2010; and in which integrated circuit 364 comprises ASIC 540; and in which linkage 295 spans a free space medium (air, e.g.). In some contexts, for example, such a transmission may trigger a local instance of an event-sequencing structure (a special-purpose configuration module 2698 in configuration unit 280, e.g.) configured to implement VHDL expression 2297.

Operation 3856 describes causing the sorting module in the FPGA of the mobile device to process a data component of a second wireless signal after the configuration component of the first wireless signal causes the FPGA to implement the sorting module (e.g. input module 1681 causing sorting module 594 to process some or all of wireless signal 2054 after the configuration component of wireless signal 2053 causes sorting module 594 to be implemented in the FPGA). This can occur, for example, in a context in which the mobile device comprises supervisor unit 1630 and in which effective sorting performance would otherwise require either (1) permanent special-purpose sorting circuitry or (2) a significantly larger general-purpose processing capacity. In another variant in which a mobile device 160 or device 2760 includes FPGA 870, moreover, operation 3856 may be performed by a special-purpose input module implemented as circuitry 861 having an event-sequencing structure configured to cause a sorting module 875 in FPGA 870 to process a data component 882 of wireless signal 2054 after a configuration component 881 of another wireless signal 2053 causes the sorting module 875 to be implemented.

Operation 3858 describes causing a mobile device that includes a field-programmable gate array (FPGA) to receive a configuration component of a first wireless signal, the configuration component causing the FPGA to implement a Fast Fourier Transform (FFT) module (e.g. configuration module 2694 receiving a wireless signal 2055 that includes configuration data 2015 with which a configuration unit 280 implements a Fast Fourier Transform module 591 in a field-programmable gate array comprising integrated circuit 366). This can occur, for example, in a context in which configuration data 2015 comprises a hardware description language expression 2296; in which primary device 210 comprises detection unit 2610; in which mobile device 2760 comprises secondary device 220; in which integrated circuit 363 comprises medium 2010; in which integrated circuit 364 comprises ASIC 540; and in which FFT module 591 occupies most of the capacity of the gate array. In some contexts, for example, such a transmission may trigger a local instance of an event-sequencing structure (a special-purpose configuration module 2694 in configuration unit 280, e.g.) configured to implement hardware description language expression 2296.

Operation 3859 describes causing the FFT module in the FPGA of the mobile device to process a data component of a second wireless signal after the configuration component of the first wireless signal causes the FPGA to implement the FFT module (e.g. input module 1682 causing FFT module 591 to process some or all of wireless signal 2056 after the configuration component of wireless signal 2055 causes FFT module 591 to be implemented in the FPGA). This can occur, for example, in a context in which the mobile device comprises supervisor unit 1630 and in which effective transform function performance would otherwise require either (1) a significantly larger general-purpose processing capacity or (2) an FPGA significantly larger than its resident implementation of FFT module 591. In another variant, moreover, operations 3858, 3859 may be performed by a special-purpose input module implemented as or operably coupled with circuitry 1881 having an event-sequencing structure configured to cause an FFT module 1823 in FPGA 1820 to process a data component 1842 of wireless signal 2056 after a configuration component 1841 of another wireless signal 2055 causes the FFT module 1823 to be implemented.

Figure 39:
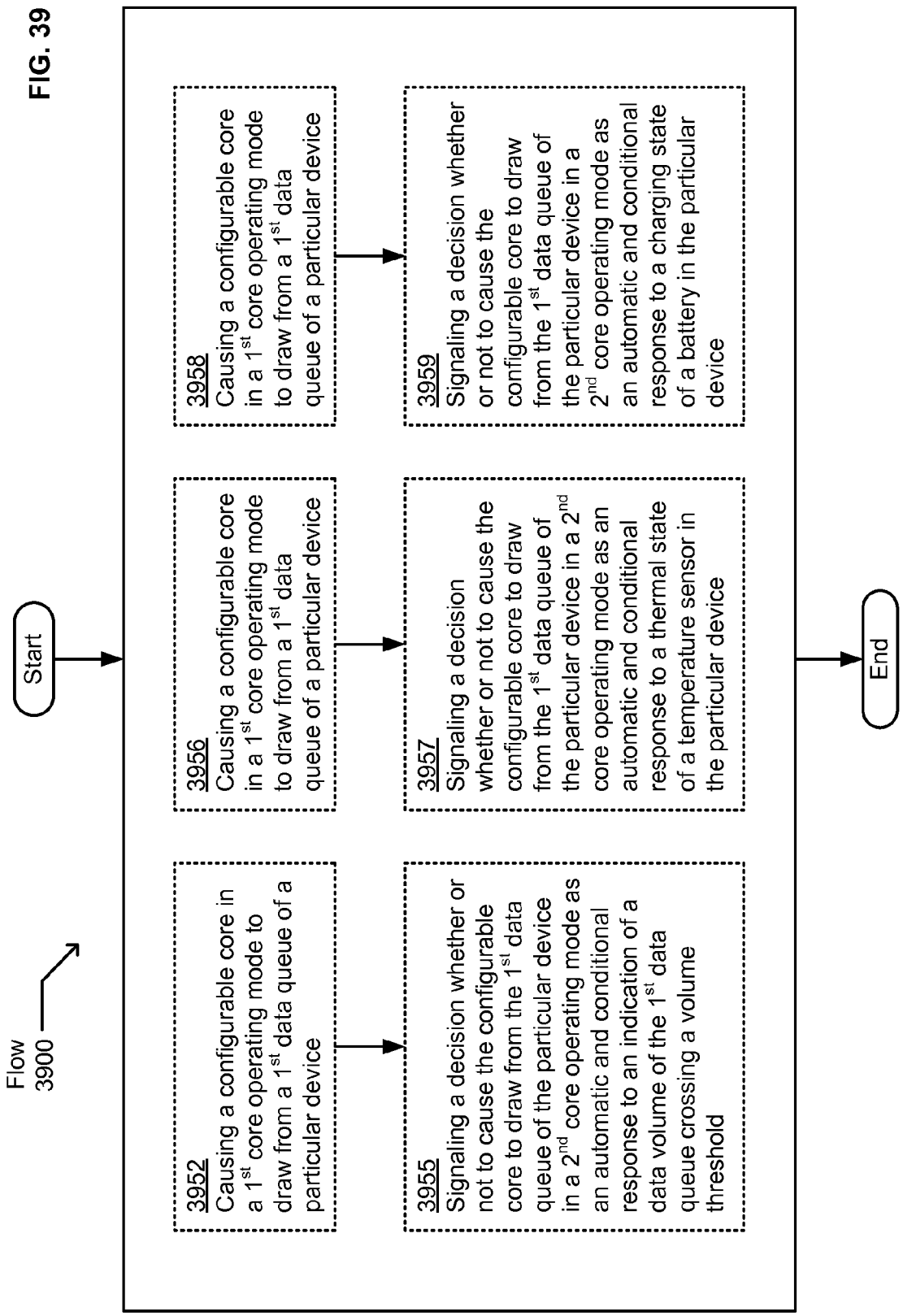
FIG. 39 likewise depicts variants of earlier-presented flows (in any of FIGS. 32-38).

With reference now to flow 3900 of FIG. 39 and to other flows described above, in some variants, several modes are presented. A first provides operation 3952 and operation 3955. A second provides operation 3956 and operation 3957. A third provides operation 3958 and operation 3959. One or more of these modes may be performed in preparation for or in response to or otherwise in conjunction with any of the operations described above.

Operation 3952 describes causing a configurable core in a first core operating mode to draw from a first data queue of a particular device (e.g. response module 1731 triggering a dual-mode core 711 to draw from data queue 580). This can occur, for example, in a context in which event-sequencing logic 710, 910 (instantiated ASIC 540 or in one or more devices 1750, 1760 of network 1700, e.g.) implements the first core operating mode as a "positive" Boolean value 743 (as a nominal voltage level less than one volt at electrical node 924, e.g.); and in which dual-mode core 711 is operating in a low-voltage core operating mode 721 (manifesting Boolean value 743, e.g.). Alternatively or additionally, such triggering may invoke special-purpose circuitry 681 having an event-sequencing structure (an arrangement of transistors and voltage levels in one or more integrated circuits, e.g.) configured to cause a multimodal core 635 or other configurable core 733 to draw from data queue 580.

Operation 3955 describes signaling a decision whether or not to cause the configurable core to draw from the first data queue of the particular device in a second core operating mode as an automatic and conditional response to an indication of a data volume of the first data queue crossing a volume threshold (e.g. configuration module 2691 manifesting a decision whether or not to cause the dual-mode core 711 or other configurable core 733 to draw from data queue 580 in another core operating mode as an automatic and conditional response to an indication 1345 of a volume 706 of data queue 580 crossing volume threshold 2087). This can occur, for example, in a context in which the "other" core operating mode 722 is a higher-voltage mode (implementing a "negative" Boolean value 743 as a nominal voltage level 314 greater than one volt at electrical node 924, e.g.) and in which maintaining effective processing throughput would otherwise require one or more additional cores 731, 732 drawing from data queue 580. In some variants, moreover, operation 3955 may be performed by a special-purpose configuration module implemented as or operably coupled with circuitry 761 having an event-sequencing structure configured to signal a decision 2222 whether or not to cause an activation module 709 to select and activate a different core operating mode for one or more cores 733 partly based on Boolean value 743 and partly based on a charging sensor state 2617 of a detection unit 2610 operably coupled to event-sequencing logic 710.

Operation 3956 describes causing a configurable core in a first core operating mode to draw from a first data queue of a particular device (e.g. response module 1732 directing a dual-mode core 712 to draw from data queue 580). This can occur, for example, in a context in which event-sequencing logic 910 implements Boolean value 742 at electrical node 922 (as a voltage level, e.g.); in which ASIC 540 includes event-sequencing logic 710, 910 (instantiated in one or more devices 1750, 1762 of network 1700, e.g.); and in which one or more dual-mode cores 712 are operating in a higher-voltage core operating mode 722 (manifesting Boolean value 742, e.g.). Alternatively or additionally, such operation may comprise special-purpose circuitry 682 having an event-sequencing structure configured to cause a multimodal core 635 or other configurable core 733 to draw from data queue 580.

Operation 3957 describes signaling a decision whether or not to cause the configurable core to draw from the first data queue of the particular device in a second core operating mode as an automatic and conditional response to a thermal state of a temperature sensor in the particular device (e.g. configuration module 2692 signaling a decision 2224 whether or not to cause dual-mode core 712 to use a lower-voltage operating mode 721 in processing item 582 as a conditional response to temperature sensor 608 indicating a thermal state 618 hotter than a design threshold 2088). This can occur, for example, in a context in which threshold 2088 is higher than 43° C.; in which temperature sensor 608 is calibrated to implement threshold 2088 by design (lacking any explicit access to thresholds 2081-2089, e.g.); in which device 1750 includes detection unit 2610 and medium 2210; in which ASIC 540 includes control logic 610; and in which such effective processing throughput would otherwise make device 1750 uncomfortable for user 1501 to hold for more than a minute. Alternatively or additionally, in some variants, threshold 2088 may be lower than 47° C. In some variants, moreover, operation 3957 may be performed by a special-purpose configuration module implemented as or operably coupled with circuitry 672 having an event-sequencing structure configured to signal a decision 2224 whether or not to cause a multimodal core 635 or other configurable core 733 to change core operating modes as an automatic and conditional response to a thermal state 618 of a temperature sensor 608.

Operation 3958 describes causing a configurable core in a first core operating mode to draw from a first data queue of a particular device (e.g. response module 1733 triggering a multimodal core 635 to draw from data queue 580). This can occur, for example, in a context in which ASIC 540 includes control logic 610 (instantiated in one or more devices 1760, 1770 of network 1700, e.g.) and in which control logic 610 implements a mode designation decision 2223 of "A" (signifying an error-tolerant operating mode 630 that is faster than operating mode 631 and that runs cooler than operating mode 632, e.g.). Alternatively or additionally, in some variants, such triggering may invoke special-purpose circuitry 683 having an event-sequencing structure configured to cause one or more dual-mode cores 711, 712 or other cores 731-733 to draw from data queue 580.

Operation 3959 describes signaling a decision whether or not to cause the configurable core to draw from the first data queue of the particular device in a second core operating mode as an automatic and conditional response to a charging state of a battery in the particular device (e.g. configuration module 2693 acting upon a mode designation decision 2223 of "B" before or while processing item 583 from data queue 580 partly based on charging sensor 2607 indicating a sufficient charging state 2617 and partly based on another Boolean value 741). This can occur, for example, in a context in which ASIC 540 is operatively coupled with detection logic 2610; in which a mode designation decision 2223 of "B" signifies a high-latency operating mode 631 (one that runs cooler than operating mode 632 and that results in a lower error rate than that of operating mode 630, e.g.); and in which optimizing a high-throughput processing application across a family of devices (having similar architecture but different power source attributes, e.g.) would otherwise be impractical. In some contexts, for example, activation module 708 may (optionally) be configured to implement such decision 2223 by switching multimodal core 635 into its high-latency operating mode 631 immediately. Alternatively or additionally, Boolean value 741 may manifest one or more of a thermal state 618 of a temperature sensor 608 (as decision 2224, e.g.) or an indication 1345 of a volume 706 of data queue 580 crossing volume threshold 2087. In some variants, moreover, operation 3959 may be performed by a special-purpose configuration module implemented as or operably coupled with circuitry 2681 having an event-sequencing structure configured to signal a decision 2225 whether or not to cause a dual-mode core 712 to draw from data queue 580 in a higher-voltage core operating mode 722 as an automatic and conditional response to charging sensor 2607 indicating a sufficient charging state 2617.

Figure 40:
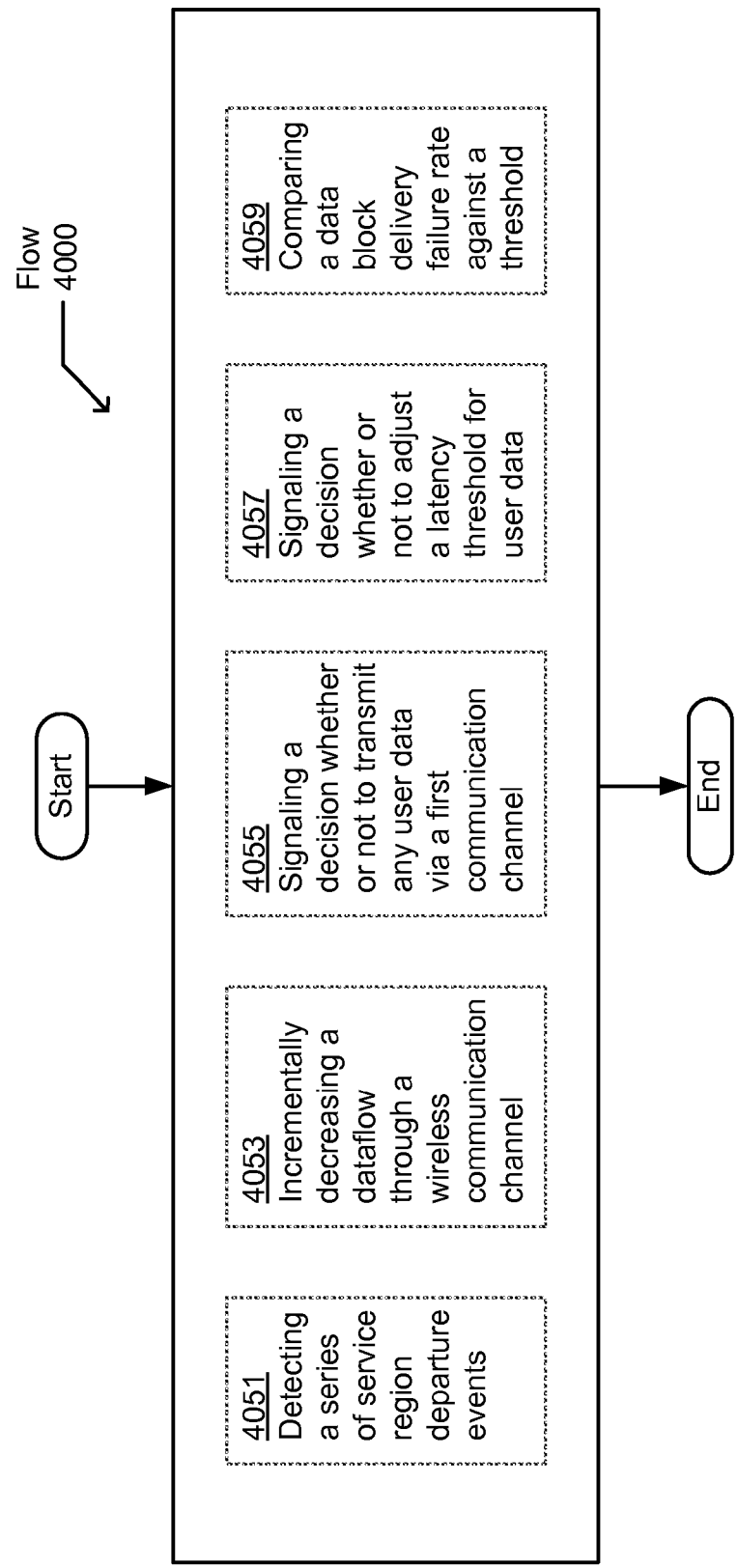
FIG. 40 likewise depicts variants of earlier-presented flows (in any of FIGS. 32-39).

With reference now to flow 4000 of FIG. 40 and to other flows described above, in some variants, one or more of operations 4051, 4053, 4055, 4057, 4059 may be performed in preparation for or in response to or otherwise in conjunction with any of the operations described above.

Operation 4051 describes detecting a series of service region departure events (e.g. registration module 1974 detecting occurrences of device 2910 departing from zone 2980 at position 2908 and from zone 2970 at position 2909, e.g.). This can occur, for example, in a context in which device 1910 comprises or receives data from device 2910 and in which registration module 1974 could not otherwise detect an unsuitable service availability context (driving through a thicket of noncontiguous service gaps, e.g.) would not otherwise be cost effective to implement commercially. In some contexts, for example, device 2910 can report such departure events some time later (via telephone switch 1996 or when device 2910 comes into a WLAN communication range 2866 of WLAN router 2860, e.g.). In another variant, moreover, operation 4051 may be performed by a special-purpose aggregation module implemented as or operably coupled with circuitry 2501 having an event-sequencing structure configured to detect status data 2320 that includes indications 2276, 2277 of two or more such departure events. See FIG. 34.

Operation 4053 describes incrementally decreasing a dataflow through a wireless communication channel (e.g. configuration module 2675 causing a somewhat smaller fraction 2011 of user data 2150 to pass via a wireless linkage 2767 as a conditional response to one or more Boolean values 741-745 described herein). This can occur, for example, in a context in which device 2760 includes event-sequencing logic 1210 (instantiated in one or more devices 1780, 1782 of network 1700, e.g.); in which user data 2150 comprises a series 2125 of data blocks 2121, 2122, 2123 most or all of which were obtained from user 1501 via a microphone 1217, 2817; in which at least a remainder of the user data 2150 comprises a signal 2758 passing through another channel 2780; in which channel 2770 is "wireless" by virtue of having at least one wireless linkage 2767; in which configuration module 2675 causes fraction 2011 to drop by at most about half during operation 4053; and in which such incremental decrease eases congestion in a vicinity of linkage 2767. In some contexts, for example, operation 4053 may result from one or more indications of faster processing of signal 2758 (manifested by one or more Boolean values 742, 743 described herein, e.g.). In another variant, moreover, operation 4053 may be performed by a special-purpose configuration module 2675 (in supervisor unit 1630, e.g.) implemented as circuitry 2503 having an event-sequencing structure configured to decrease a data flow rate 2095 through linkage 151 incrementally (by an incremental adjustment to a voice sampling rate 2096 applied to a signal 2059 from microphone 1217 during a telephone call 1951, e.g.). This can occur, for example, in a context in which a degradation of service (dropped call, e.g.) resulting from excessive network resource loading would not otherwise motivate a voluntary incremental attrition of participants in interpersonal communications (video chats, e.g.).

Operation 4055 describes signaling a decision whether or not to transmit any user data via a first communication channel (e.g. configuration module 2676 transmitting a Boolean decision 2226 whether or not to transmit any user data 2150 via linkage 161 as a conditional response to one or more Boolean values 741-745 described herein). This can occur, for example, in a context in which configuration module 2676 generates decision 2226 by combining Boolean values 741, 742 (with an AND gate or operation, e.g.). In some contexts, moreover, such decision 2226 may be overridden by one or more other Boolean values 743, 744 described herein being positive. In another variant, moreover, operation 4055 may be performed by a special-purpose configuration module implemented as or operably coupled with circuitry 2505 having an event-sequencing structure configured to signal a Boolean decision 2226 whether or not to transmit any user data 2150 via queue 580.

Operation 4057 describes signaling a decision whether or not to adjust a latency threshold for user data (e.g. a special-purpose processing module 2643 signaling a decision 2227 whether or not to adjust a latency threshold 2089 for user data 2150). This can occur, for example, in a context in which user data 2150 comprises sequential video or voice data segments 2431-2433 encoded at device 1768; in which segments 2431, 2433 arrive promptly at device 1750 via wireless linkage 1771 but in which segment 2432 is significantly delayed; in which a response module 1738 applies an effective latency threshold 2089 (and an arrival time of one or more other segments, e.g.) in deciding when to treat segment 2432 as lost and to play segment 2433 (via decoding module 1151 and via a speaker 442 or display 445, e.g.); in which device 2760 event-sequencing logic 1110; and in which such playing of segment 2433 would otherwise occur too late (due to a large latency threshold 2089 that was previously necessary being maintained unnecessarily, e.g.). In some contexts, for example, decision 2227 may result in an effective latency being reduced from 0.3 seconds to 0.1 seconds in response to an indication 2078 of a significant bit error rate decrease or to an indication 2079 of a significant signal strength increase or to other such manifestations of improved channel performance received from one or more detection modules 1673, 1674 described herein. (Except as noted, such quantitative changes as described herein are "significant" if they exceed 20% of a baseline value.) In another variant, moreover, operation 4057 may be performed by a special-purpose processing module implemented as or operably coupled with circuitry 2507 having an event-sequencing structure configured to signal a conditional decision 2227 whether or not to increase the effective latency threshold 2089 (to more than 1 second, e.g.) in response a user's activation of a speech recognition module 1123 (implemented in device 1768 or device 2760, e.g.) so that words are recognized in data segments 2431-2433 there. In some contexts, such recognized words may then be processed by a translation module (an instance of interlingual translation application module 1044 or text-to-speech translation module 1124, e.g.) before being played (via speaker 442 or display 445, e.g.).

Operation 4059 describes comparing a data block delivery failure rate against a threshold (e.g. detection module 1673 comparing a data block delivery failure rate 2091 against a threshold 2081. This can occur, for example, in a context in which device 2771 includes one or more antennas 205, 1905 operably connected (via channel 2770, e.g.) with network 1990 (including device 2750, e.g.) and in which detection module 1673 would otherwise need to rely upon cruder channel metrics (signal strength or resource loading, e.g.) in deciding how to route user data 2150. Alternatively or additionally, operation 4059 may be performed by a special-purpose detection module implemented as or operably coupled with circuitry 2509 having an event-sequencing structure configured to compare a data block delivery failure rate against a threshold as described above with reference to flow 3200.

Figure 41:
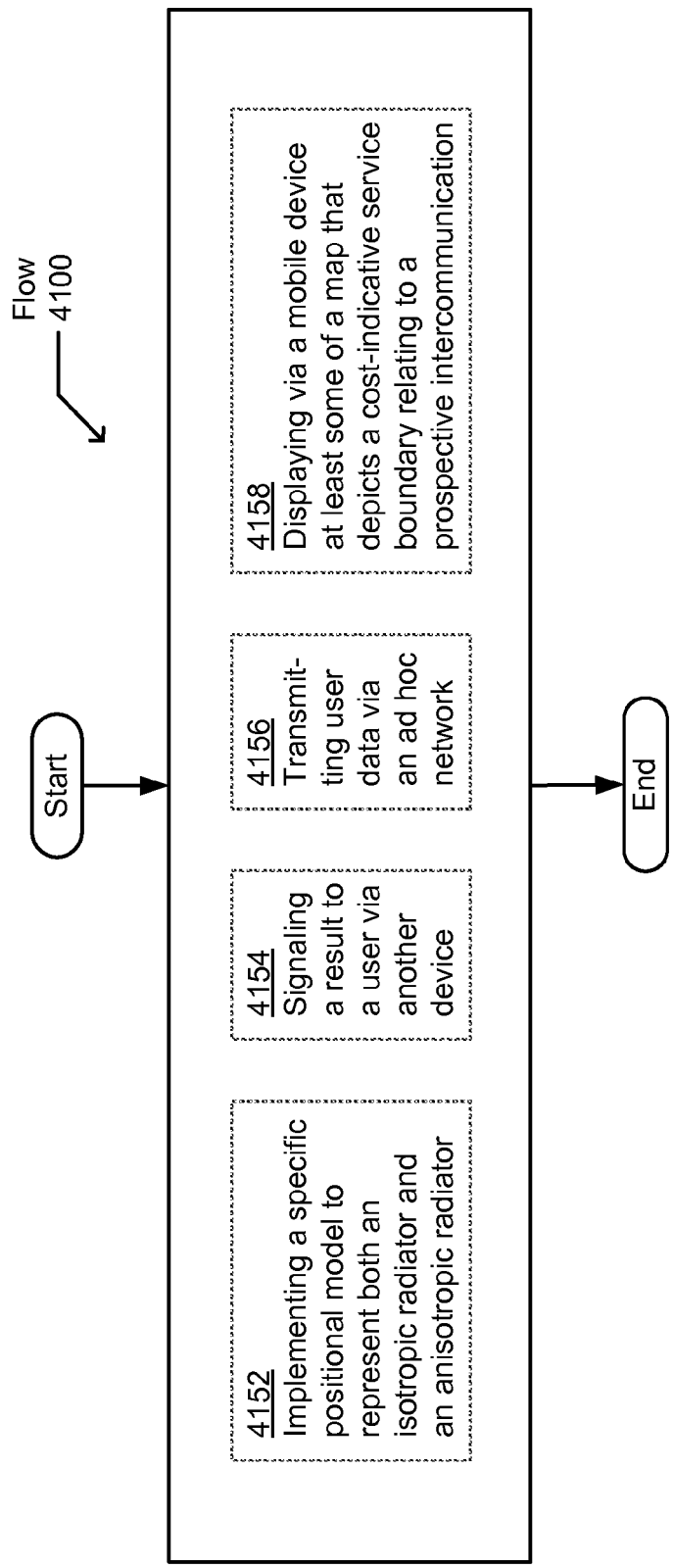
FIG. 41 likewise depicts variants of earlier-presented flows (in any of FIGS. 32-40).

With reference now to flow 4100 of FIG. 41 and to other flows described above, in some variants, one or more of operations 4152, 4154, 4156, 4158 may be performed in preparation for or in response to or otherwise in conjunction with any of the operations described above.

Operation 4152 describes implementing a specific positional model to represent both an isotropic radiator and an anisotropic radiator (e.g. aggregation module 1172 generating or updating a geographic model 2301 that includes a record 2327 indicating an approximate position 2341 and radius 2345 relating to a range of router 3101 and also a record 2328 indicating more complex shape-descriptive information 2313 relating to a range of router 3103). This can occur, for example, in a context in which record 2327 identifies a round region (approximating the zone 3121 served by router 3101 and having a radius 2345, e.g.); in which record 2328 identifies an oblong region (approximating the zone 3123 served by router 3103, e.g.); and in which model 2301 could not otherwise maintain an accurate geographical distribution of wireless service status in region 3155 effectively on an ongoing basis. In a context of one or more routers 3101-3103 reportedly failing to provide service (based upon a report from a device 3180 that failed to obtain service via router 3101 at position 2348, e.g.), aggregation module 1172 may update model 2301 (from version 2363 indicating service in zone 2351, e.g.) to a version 2362 showing loss of service at other positions 2349 also. Alternatively or additionally, in some contexts, operation 4152 may be performed by a special-purpose aggregation module implemented as or operably coupled with circuitry 2502 having an event-sequencing structure (an instance of numerous transistors 351, 352 and voltage levels 311-314 in one or more integrated circuits 361, e.g.) configured to implement a model 2201 comprising an image 2251 (shown via display 445, e.g.) depicting a region 165 (served by device 160, modeled as an isotropic radiator, e.g.) and another region 155 (approximated as a semicircular map region 2255, e.g.) served by device 150 (represented as an anisotropic radiator, e.g.).

Operation 4154 describes signaling a result to a user via another device (e.g. transmission module 1183 transmitting one or more indications 1253, 1254, 1341-1345, 2071-2079 as described herein remotely to a device 2760 held by user 101). This can occur, for example, in a context in which an instance of event-sequencing logic 1110 (implemented in device 1776, e.g.) comprises a transmission module 1183 that is remote from device 2760. In some contexts, for example, the result can comprise one or more instances (1) of clips 2090 generated by an audio capture module 1121 or by a video capture module 1121; (2) of coordinates 2021, 2022 from GPS module 1122; (3) of textual expressions 1432 of a word from speech recognition module 1123; (4) of decrypted data blocks from decryption module 1132; (5) of decoded data blocks 2122 from decoding module 1152; (6) of maps 2330, records 2327-2329, or other manifestation of a model 2201, 2301 from aggregation module 1174; or (7) of other such results from special-purpose event-sequencing logic (depicted in FIGS. 7-13, e.g.) or flows (depicted in FIGS. 32-41, e.g.) described herein. In some contexts, moreover, operation 4154 may be performed by a special-purpose transmission module implemented as or operably coupled with circuitry 2471 remote from user 101 and having an event-sequencing structure configured to transmit a wireless signal so as to cause a manifestation of such result(s) as voltage levels (at electrical nodes 921-928, e.g.) via an instance of event-sequencing logic 2410 (and via a speaker 442 or display 445, e.g.) that is local to user 101. This can occur, for example, in a context in which integrated circuit 440 includes event-sequencing logic 2410.

Operation 4156 describes transmitting user data via an ad hoc network (e.g. interface module 1725 or notification module 1745 routing at least some user data 2150 via one or more wireless linkages of an ad hoc network 1790). This can occur, for example, in a context in which transmission module 1184 comprises software (resident in phase-change memory 231 or removable memory 232, e.g.) executable by CPU 212 and in which one or more devices 210, 1750, 2760 send or receive such user data 2150 (comprising one or more interpersonal communications 1961-1963, e.g.) as described herein via wireless linkage 1771. Alternatively or additionally, operation 4156 may be performed by a special-purpose transmission module implemented as or operably coupled with circuitry 2506 having an event-sequencing structure configured to transmit status data 2320 or other signals 2051-2059 relating to user-owned devices, e.g.) via network 1790.

Operation 4158 describes displaying via a mobile device at least some of a map that depicts a cost-indicative service boundary relating to a prospective intercommunication (e.g. notification module 1741 causing a map 2330 that depicts a geographic cost transition relating to an interpersonal communication 1961 with a user 2701 of a remote device 2750 to be displayed before the communication begins). This can occur, for example, in a context in which user 101 views a display 445 that depicts one or more versions 2361, 2362, 2363 of a segment of map 2330 (successively, e.g.); in which map 2330 represents one or more such cost-indicative service boundaries as a low-cost-service region (a zone 2353 shown in green, e.g.) bordering a higher-cost-service region or free-service region (a zone 2356 shown in white, e.g.); in which such costs will be incurred by user 101 if the interpersonal communication 1961 takes place; and in which such costs would otherwise (without notification module 1741, e.g.) be incurred without adequate warning. In some contexts, for example, one or more such versions 2361 depict a cost transition relating to costs that will be incurred by the user 2701 of the remote device 2750 (a zone 2351 shown in orange bordered by another cost-indicative service boundary, e.g.). Alternatively or additionally, such zone 2351 depicted in orange may become available (in a newer version 2363 of segment 2337, e.g.) as a response to user 2701 placing a call to device 2760 (while device 2760 is ringing, e.g.). Alternatively or additionally, such zone 2351 depicted in orange may become available (to user 101, activated by saying "local roaming map" or by pushing a button, e.g.) as a response to user 101 entering user data 2150 (via a keypad of device 2760, e.g.) that identifies device 2750 (phone number 2285, e.g.). In another variant, moreover, operation 4158 may be performed by a special-purpose notification module implemented as or operably coupled with circuitry 2508 having an event-sequencing structure configured to maintain a regional map 2330 (on server 1396, e.g.) that features one or more cost-indicative service boundaries 2961, 2971 relating to prospective intercommunications via device 2910. One or more versions of regional map 2330 may be updated, in some variants, in response to a positional or other status indication (signifying coordinates 2021, 2022 or operability status, e.g.) relating one or more service facilitation devices. In some contexts, for example, such devices (instantiated in one or more devices 1772, 1782 of network 1700, e.g.) may include a tower 3085 or vehicle 1510 or mounted device 1530.

Referring again to the flow variants of FIGS. 32-41 described above and in particular to flow 3200, operation 28 may be performed by one or more special-purpose initiation modules implemented as or operably coupled with circuitry 1031 having an event-sequencing structure configured to establish a first wireless communication channel via linkage 1771 (e.g. including intermediate devices 1770, 1772) and from device 1750 and a second wireless communication channel from device 1750 and via device 1776. This can occur, for example in a context in which such channels both extend to a remote device 1782. Also in such variants, operation 32 may be performed by a special-purpose allocation module implemented as circuitry 1141 having an event-sequencing structure (an arrangement of numerous transistors and electrical nodes 921 at decision-indicative voltage levels, e.g.) configured to implement an adjusted target percentage 2293 of user data 2150 being transmitted via linkage 1771 responsive to data block delivery failures of the second wireless communication channel becoming to frequent.

Referring again to the flow variants of FIGS. 32-41 described above and in particular to flow 3300, operation 24 may be performed by a special-purpose registration module implemented as or operably coupled with circuitry 1481 having an event-sequencing structure configured to obtain at primary device 2760 an internet protocol address or other identifier of device 2760. Also in such variants, operation 30 may be performed by a special-purpose notification module implemented as circuitry 1221 having an event-sequencing structure (an arrangement of numerous transistors and electrical nodes 925 at decision-indicative voltage levels, e.g.) configured to cause a primary device 2760 to indicate whether or not device 2760 is within zone 2960. This can occur, for example, in a context in which the "third" device comprises a vehicle or mounted device 1530 providing wireless service 1335; in which the WLAN communication range comprises region 165 or zone 2960; in which primary device 2760 is not currently engaged in a bidirectional interpersonal communication via device 2760; and in which primary device 2760 includes a light-emitting diode or other suitable display 445 configured to display the Boolean indication. Alternatively or additionally, in some variants, the third device may comprise a moving vehicle 1510

(instantiated in one or more devices 1750, 1776 of network 1700, e.g.) or parked vehicle (comprising device 160, e.g.) providing Wi-Fi service.

Referring again to the flow variants of FIGS. 32-41 described above and in particular to flow 3400, operation 27 may be performed by a special-purpose detection module implemented as or operably coupled with circuitry 1483 having an event-sequencing structure configured to detect an availability to participate in one or more modes of telephonic dialog 1953 as a conditionally response to an indirect Boolean indication 2274 whether or not a device 2910 (instantiated in one or more devices 1750, 1780 of network 1700, e.g.) crossed boundaries too rapidly (as a determination of whether an average or other interval 1423 between events exceeded a threshold, said determination being an inverse of Boolean indication 2274, e.g.) within time interval 1421. Also in such variants, operation 33 may be performed by a special-purpose notification module implemented as circuitry 1482 having an event-sequencing structure (an arrangement of numerous transistors and electrical nodes 926 at decision-indicative voltage levels operably coupled to detection the module, e.g.) configured to signal the availability to participate in telephonic dialog 1953 in response to a successful communication via router 3101. This can occur, for example, in a context in which device 2910 is at position 2349 and in which router 3101 is online (providing wireless service 1331 in zone 2351, e.g.).

Referring again to the flow variants of FIGS. 32-41 described above and in particular to flow 3500, operation 26 may be performed by a special-purpose notification module implemented as or operably coupled with circuitry 931 having an event-sequencing structure configured to obtain via an antenna 1905 (and via a wireless linkage 995 from configuration unit 980, e.g.) configuration data (a VHDL expression 2297 or password 2036, e.g.) establishing a security protocol (manifested as an event-sequencing structure in an FPGA 870, 1540, 1820 or as a protocol implementation code 1088 executable by CPU 212, e.g.). This can occur, for example, in a context in which event-sequencing logic 910 and media 2010, 2210 reside in device 1750 and in which a scripting language is used to generate VHDL expression 2297 or in which a password generation module 986 (resident in a device 1750,1758 of network 1700, e.g.) is used to generate password 2036. Also in such variants, operation 29 may be performed by a special-purpose interface module implemented as circuitry 1201 having an event-sequencing structure configured to receive a wireless signal that includes password 2036. This can occur, for example, in a context in which device 1750 includes event-sequencing logic 1210 and receives the wireless signal from device 2760 (as the "second" device, e.g.). Also in such variants, operation 31 may be performed by a special-purpose registration module implemented as circuitry 1021 having an event-sequencing structure configured to signal a decision 2228 whether or not to provide a network access service 2284 responsive to whether or not access request data in the wireless signal (password 2036, e.g.) satisfies the security protocol (a watermark or checksum, e.g.). Also in such variants, operation 35 may be performed by a special-purpose allocation module implemented as circuitry 1022 having an event-sequencing structure (an arrangement of numerous transistors and electrical nodes 927 at decision-indicative voltage levels, e.g.) configured to signal a decision whether or not to provide another network access service 2282, 2283 responsive to whether or not access request data from another mobile device 2870 satisfies another security protocol (e.g. controlling access to one or more other services 2282, 2283). This can occur, for example, in a context in which allocation module 1622 also implements circuitry 1371 having an event-sequencing structure configured to implement a firewall separating two or more network access services 2282-2284 provided via a single device 1750.

Referring again to the flow variants of FIGS. 32-41 described above and in particular to flow 3600, operation 25 may be performed by a special-purpose aggregation module implemented as or operably coupled with circuitry 1372 having an event-sequencing structure configured to obtain an indication 1344 of one or more wireless communication services 1331-1335 having been provided within zone 2970. Also in such variants, operation 34 may be performed by a special-purpose response module implemented as circuitry 941 having an event-sequencing structure (an arrangement of numerous transistors and electrical nodes 928 at decision-indicative voltage levels, e.g.) configured to signal a decision 1403 whether or not to indicate the wireless communication service(s) provided within zone 2970 by a device 3160 as a response to an indication 2077 from another device 2910 of the wireless communication service(s) being operative within zone 2970.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

CLAUSES 1. (Independent) A communication management system comprising (at least):
   an article of manufacture including (at least)
   transistor-based circuitry having (at least) an event-sequencing structure configured (at least) for obtaining (at least) an indication of (at least) a first wireless communication service having been provided (at least) within a first service region (at least) by a first device (at least) at an earlier time; and
   transistor-based circuitry having (at least) an event-sequencing structure configured for signaling (at least) a decision (at least) whether or not to indicate (at least) the first wireless communication service (at least) being operative within (at least) the first service region as an (at least)

automatic and conditional response to (at least) an indication from (at least) a second device of (at least) the first wireless communication service having been operative (at least) within the first service region or not (at least) at a later time (the article of manufacture intersecting or not intersecting the first device, the article of manufacture intersecting or not intersecting the second device).

2. The communication management system of any of the above SYSTEM CLAUSES, further comprising:
the article of manufacture further comprising one or more metamaterial elements configured for directional signal transmission.

3. The communication management system of any of the above SYSTEM CLAUSES, further comprising:
the article of manufacture further comprising an antenna that transmits a Boolean indication of whether or not the second device exceeded a wireless service boundary crossing rate threshold within a recent time interval.

4. The communication management system of any of the above SYSTEM CLAUSES, further comprising:
the article of manufacture comprising a smartphone or comprising a tablet computer.

5. The communication management system of any of the above SYSTEM CLAUSES, further comprising:
the article of manufacture comprising an integrated circuit chip or comprising a motor vehicle.

6. The communication management system of any of the above SYSTEM CLAUSES, further comprising:
the article of manufacture configured to display at least some of a map that includes a cost-indicative service boundary relating to a prospective interpersonal communication via the article of manufacture.

7. The communication management system of any of the above SYSTEM CLAUSES, further comprising:
the article of manufacture further comprising a field-programmable gate array configured to implement a Fast Fourier Transform (FFT) module.

8. The communication management system of any of the above SYSTEM CLAUSES, further comprising:
the article of manufacture further comprising a microphone configured to generate user data from a vocalization.

9. The communication management system of any of the above SYSTEM CLAUSES, further comprising:
the event-sequencing structure configured for signaling the decision whether or not to indicate the first wireless communication service being operative within the first service region as the automatic and conditional response to the indication from the second device of the first wireless communication service having been operative within the first service region or not at the later time comprising one or more electrical nodes, the indication of the first wireless communication service having been provided within the first service region by the first device at the earlier time being manifested as an arrangement of one or more voltage levels on the one or more electrical nodes.

10. The communication management system of any of the above SYSTEM CLAUSES, further comprising:
the event-sequencing structure configured for signaling the decision whether or not to indicate the first wireless communication service being operative within the first service region as the automatic and conditional response to the indication from the second device of the first wireless communication service having been operative within the first service region or not at the later time comprising one or more electrical nodes, the decision whether or not to indicate the first wireless communication service being operative within the first service region being manifested as an arrangement of one or more voltage levels on the one or more electrical nodes.

11. The communication management system of any of the above SYSTEM CLAUSES, further comprising:
the article of manufacture being configured not to transmit data indicating a ground speed of the article of manufacture.

12. The communication management system of any of the above SYSTEM CLAUSES, further comprising:
the article of manufacture being configured not to transmit data indicating a geographic position of the article of manufacture.

13. The communication management system of any of the above SYSTEM CLAUSES, further comprising:
the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including
transistor-based circuitry having an event-sequencing structure configured for causing a data component of a wireless signal to be processed by a special-purpose module in a handheld device as an automatic and conditional response to a thermal state of a temperature sensor in the handheld device, the handheld device comprising the article of manufacture.

14. The communication management system of any of the above SYSTEM CLAUSES, further comprising:
the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including
transistor-based circuitry having an event-sequencing structure configured for causing a data component of a wireless signal to be processed by a special-purpose module in a portable device as an automatic and conditional response to a charging state of a battery in the portable device, the portable device comprising the article of manufacture.

15. The communication management system of any of the above SYSTEM CLAUSES, further comprising:
the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including
transistor-based circuitry having an event-sequencing structure configured for causing a data component of a wireless signal to be processed by a special-purpose module in a mobile device as an automatic and conditional response to a control component of the wireless signal, the mobile device comprising the article of manufacture.

16. The communication management system of any of the above SYSTEM CLAUSES, further comprising:
the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for causing first content of a wireless signal to pass either through a first memory of a particular device or through a second memory of the particular device selected as an automatic and conditional response to whether or not second content of the wireless signal satisfies a first criterion, the particular device comprising the article of manufacture.

17. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for causing a first core to draw from a first data queue of a mobile device, the mobile device comprising the article of manufacture; and transistor-based circuitry having an event-sequencing structure configured for signaling a decision whether or not to cause a second core to draw from the first data queue of the mobile device as an automatic and conditional response to an indication of a data volume of the first data queue crossing a backlog threshold.

18. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for causing a mobile device that includes a field-programmable gate array (FPGA) to receive a configuration component of a first wireless signal, the configuration component causing the FPGA to implement a sorting module, the mobile device comprising the article of manufacture; and transistor-based circuitry having an event-sequencing structure configured for causing the sorting module to process a data component of a second wireless signal after the configuration component of the first wireless signal causes the FPGA to implement the sorting module.

19. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for causing a mobile device that includes a field-programmable gate array (FPGA) to receive a configuration component of a first wireless signal, the configuration component causing the FPGA to implement a Fast Fourier Transform (FFT) module; and transistor-based circuitry having an event-sequencing structure configured for causing the FFT module to process a data component of a second wireless signal after the configuration component of the first wireless signal causes the FPGA to implement the FFT module, the mobile device comprising the article of manufacture.

20. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for causing a configurable core in a first core operating mode to draw from a first data queue of a particular device, the particular device comprising the article of manufacture; and transistor-based circuitry having an event-sequencing structure configured for signaling a decision whether or not to cause the configurable core to draw from the first data queue of the particular device in a second core operating mode as an automatic and conditional response to an indication of a data volume of the first data queue crossing a volume threshold.

21. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for causing a configurable core in a first core operating mode to draw from a first data queue of a particular device, the particular device comprising the article of manufacture; and transistor-based circuitry having an event-sequencing structure configured for signaling a decision whether or not to cause the configurable core to draw from the first data queue of the particular device in a second core operating mode as an automatic and conditional response to a thermal state of a temperature sensor in the particular device.

22. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for causing a configurable core in a first core operating mode to draw from a first data queue of a particular device, the particular device comprising the article of manufacture; and transistor-based circuitry having an event-sequencing structure configured for signaling a decision whether or not to cause the configurable core to draw from the first data queue of the particular device in a second core operating mode as an automatic and conditional response to a charging state of a battery in the particular device.

23. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for detecting a series of service region departure events at the article of manufacture.

24. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for incrementally decreasing a dataflow through a wireless communication channel at the article of manufacture.

25. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for signaling a decision whether or not to transmit any user data via a first communication channel at the article of manufacture while the article of manufacture uses the first communication channel and a second communication channel in parallel.

26. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for signaling a decision whether or not to adjust a latency threshold for user data at the article of manufacture.

27. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for comparing a data block delivery failure rate against a failure rate threshold at the article of manufacture.

28. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for implementing a specific positional model to represent both an isotropic radiator and an anisotropic radiator at the article of manufacture.

29. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for signaling a result to a user of the article of manufacture, the result being the decision whether or not to indicate the first wireless communication service being operative within the first service region.

30. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for transmitting user data via an ad hoc network that includes the second device.

31. The communication management system of any of the above SYSTEM CLAUSES, further comprising:

the transistor-based circuitry having the event-sequencing structure configured for signaling the decision whether or not to indicate the first wireless communication service being operative within the first service region as the automatic and conditional response to the indication from the second device of the first wireless communication service having been operative within the first service region or not at the later time including transistor-based circuitry having an event-sequencing structure configured for displaying via a mobile device at least some of a map that depicts a cost-indicative service boundary relating to a prospective intercommunication, the mobile device comprising the article of manufacture.

32. (Independent) A communication management method comprising:

obtaining an indication of a first wireless communication service having been provided within a first service region by a first device at an earlier time; and signaling a decision whether or not to indicate the first wireless communication service being operative within the first service region as an automatic and conditional response to an indication from a second device of the first wireless communication service having been operative within the first service region or not at a later time.

33. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including causing a data component of a wireless signal to be processed by a special-purpose module in a handheld device as an automatic and conditional response to a thermal state of a temperature sensor in the handheld device, the handheld device comprising the third device.

34. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including causing a data component of a wireless signal to be processed by a special-purpose module in a portable device as an automatic and conditional response to a charging state of a battery in the portable device, the portable device comprising the third device.

35. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including causing a data component of a wireless signal to be processed by a special-purpose module in a mobile device as an automatic and conditional response to a control component of the wireless signal, the mobile device comprising the third device.

36. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including causing first content of a wireless signal to pass either through a first memory of a particular device or through a second memory of the particular device selected as an automatic and conditional response to whether or not second content of the wireless signal satisfies a first criterion, the particular device comprising the third device.

37. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including causing a first core to draw from a first data queue of a mobile device, the mobile device comprising the third device; and signaling a decision whether or not to cause a second core to draw from the first data queue of the mobile device as an automatic and conditional response to an indication of a data volume of the first data queue crossing a backlog threshold.

38. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including causing a mobile device that includes a field-programmable gate array (FPGA) to receive a configuration component of a first wireless signal, the configuration component causing the FPGA to implement a sorting module, the mobile device comprising the third device; and causing the sorting module to process a data component of a second wireless signal after the configuration component of the first wireless signal causes the FPGA to implement the sorting module.

39. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including causing a mobile device that includes a field-programmable gate array (FPGA) to receive a configuration component of a first wireless signal, the configuration component causing the FPGA to implement a Fast Fourier Transform (FFT) module; and causing the FFT module to process a data component of a second wireless signal after the configuration component of the first wireless signal causes the FPGA to implement the FFT module, the mobile device comprising the third device.

40. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including causing a configurable core in a first core operating mode to draw from a first data queue of a particular device, the particular device comprising the third device; and signaling a decision whether or not to cause the configurable core to draw from the first data queue of the particular device in a second core operating mode as an automatic and conditional response to an indication of a data volume of the first data queue crossing a volume threshold.

41. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including causing a configurable core in a first core operating mode to draw from a first data queue of a particular device, the particular device comprising the third device; and signaling a decision whether or not to cause the configurable core to draw from the first data queue of the particular device in a second core operating mode as an automatic and conditional response to a thermal state of a temperature sensor in the particular device.

42. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including causing a configurable core in a first core operating mode to draw from a first data queue of a particular device, the particular device comprising the third device; and signaling a decision whether or not to cause the configurable core to draw from the first data queue of the particular device in a second core operating mode as an automatic and conditional response to a charging state of a battery in the particular device.

43. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including detecting a series of service region departure events at the third device.

44. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including incrementally decreasing a dataflow through a wireless communication channel at the third device.

45. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including signaling a decision whether or not to transmit any user data via a first communication channel at the third device while the third device uses the first communication channel and a second communication channel in parallel.

46. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including signaling a decision whether or not to adjust a latency threshold for user data at the third device.

47. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including comparing a data block delivery failure rate against a failure rate threshold at the third device.

48. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including implementing a specific positional model to represent both an isotropic radiator and an anisotropic radiator at the third device.

49. The communication management method of any of the above METHOD CLAUSES further comprising:

the signaling the decision whether or not to indicate the first wireless communication service being operative within the first service region as the automatic and conditional response to the indication from the second device of the first wireless communication service having been operative within the first service region or not at the later time by a third device and including
  signaling a result to a user of the third device, the result being the decision whether or not to indicate the first wireless communication service being operative within the first service region.
50. The communication management method of any of the above METHOD CLAUSES further comprising:
  the signaling the decision whether or not to indicate the first wireless communication service being operative within the first service region as the automatic and conditional response to the indication from the second device of the first wireless communication service having been operative within the first service region or not at the later time by a third device and including
  transmitting user data via an ad hoc network that includes the second device.
51. The communication management method of any of the above METHOD CLAUSES further comprising:
  the signaling the decision whether or not to indicate the first wireless communication service being operative within the first service region as the automatic and conditional response to the indication from the second device of the first wireless communication service having been operative within the first service region or not at the later time by a third device and including
  displaying via a mobile device at least some of a map that depicts a cost-indicative service boundary relating to a prospective intercommunication, the mobile device comprising the third device.
52. (Independent) A communication management method comprising:
  establishing both a wireless communication channel via a first device and from a second device and a wireless communication channel from the second device and via a third device; and
  signaling a decision of how much user data to transmit via the wireless communication channel from the second device and via the third device responsive to an indication that a data block delivery failure rate of the wireless communication channel via the first device and from the second device exceeds a failure rate threshold.
53. The communication management method of CLAUSE 52 further comprising:
  performing the operation(s) of any one or more of the above METHOD CLAUSES that depend from METHOD CLAUSE 32.
54. (Independent) A communication management method comprising:
  obtaining at a first device an identifier of a second device; and
  causing the first device to display a Boolean indication whether or not the second device is within a wireless local area network communication range of a third device without a bidirectional interpersonal communication existing between the first device and the second device.
55. The communication management method of CLAUSE 54 further comprising:
  performing the operation(s) of any one or more of the above METHOD CLAUSES that depend from METHOD CLAUSE 32.
56. (Independent) A communication management method comprising:
  obtaining a Boolean indication of whether or not a first device exceeded a wireless service boundary crossing rate threshold within a recent time interval, the recent time interval being less than an hour; and
  signaling an availability to participate in a bidirectional interpersonal communication conditionally, partly based on the Boolean indication whether or not the first device exceeded the wireless service boundary crossing rate threshold within the recent time interval and partly based on a Boolean indication of the first device being within a wireless communication range of a second device.
57. The communication management method of CLAUSE 56 further comprising:
  performing the operation(s) of any one or more of the above METHOD CLAUSES that depend from METHOD CLAUSE 32.
58. (Independent) A communication management method comprising:
  obtaining via a first device configuration data establishing a first security protocol;
  obtaining via a second device a wireless signal containing access request data;
  signaling a decision whether or not to provide a first network access service via a third device responsive to whether or not the access request data in the wireless signal satisfies the first security protocol; and
  signaling a decision whether or not to provide a second network access service via the third device responsive to whether or not the access request data satisfies a second security protocol, the third device implementing a firewall between the first network access service and the second network access service.
59. The communication management method of CLAUSE 58 further comprising:
  performing the operation(s) of any one or more of the above METHOD CLAUSES that depend from METHOD CLAUSE 32.
60. (Independent) A system comprising:
  means for performing the operation(s) of any one or more of the above METHOD CLAUSES.
61. (Independent) An article of manufacture comprising:
  one or more physical media configured to bear a device-detectable implementation of a method including at least
  obtaining an indication of a first wireless communication service having been provided within a first service region by a first device at an earlier time; and
  signaling a decision whether or not to indicate the first wireless communication service being operative within the first service region as an automatic and conditional response to an indication from a second device of the first wireless communication service having been operative within the first service region or not at a later time.
62. The article of manufacture of CLAUSE 61 in which a portion of the one or more physical media comprises:
  one or more signal-bearing media configured to transmit a binary sequence manifesting one or more device-executable instructions configured to perform the operation(s) of any one or more of the above METHOD CLAUSES.
63. (Independent) An article of manufacture comprising:
  one or more physical media bearing a device-detectable output manifesting an occurrence of
  obtaining an indication of a first wireless communication service having been provided within a first service region by a first device at an earlier time; and
  signaling a decision whether or not to indicate the first wireless communication service being operative within the first service region as an automatic and conditional response to an indication from a second device of the first wireless communication service having been operative within the first service region or not at a later time.

64. The article of manufacture of CLAUSE 63 in which a portion of the one or more physical media comprises:
one or more signal-bearing media bearing at least one binary sequence from an event-sequencing structure configured to perform the operation(s) of any one or more of the above METHOD CLAUSES.

All of the patents and other publications referred to above are incorporated herein by reference generally—including those identified in relation to particular new applications of existing techniques—to the extent not inconsistent herewith (in each respective latest edition, where applicable). While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A communication management system comprising:
circuitry for obtaining, from at least one of a router device or a first mobile device, an indication of a wireless communication service having been established, between the mobile device and a network via the router device, within a service region at a first time;
circuitry for obtaining, from a second mobile device, an indication whether or not the wireless communication service is operative within the service region at a second time; and
circuitry for causing a third mobile device to provide a user notification, at a third time, indicating whether or not the wireless communication service was operative within the service region responsive to the indication from the second mobile device whether or not the wireless communication service was operative within the service region.

2. The communication management system of claim 1, wherein the circuitry for obtaining, from at least one of a router device or a first mobile device, an indication of a wireless communication service having been established, between the mobile device and a network via the router device, within a service region at a first time includes:
circuitry for obtaining, from at least one of a smartphone or a tablet computer, an indication of a first wireless communication service having been established within a first service region between the at least of a smartphone or a tablet computer and a network via the router device at a first time.

3. The communication management system of claim 1, wherein the circuitry for obtaining, from at least one of a router device or a first mobile device, an indication of a wireless communication service having been established, between the mobile device and a network via the router device, within a service region at a first time includes:
obtaining, from a motor vehicle, an indication of a first wireless communication service having been established within a first service region between the motor vehicle and a network via the router device at a first time.

4. The communication management system of claim 1, wherein the circuitry for causing a third mobile device to provide a user notification, at a third time, indicating whether or not the wireless communication service was operative within the service region responsive to the indication from the second mobile device whether or not the wireless communication service was operative within the first service region includes:
circuitry for causing a third mobile device to display at least some of a map that includes a cost-indicative service boundary relating to a prospective interpersonal communication.

5. A communication management system comprising:
an article of manufacture including
means for obtaining, from at least one of a router device or a first mobile device, an indication of a wireless communication service having been established, between the mobile device and a network via the router device, within a service region at an first time;
means for obtaining, from a second mobile device, an indication whether or not the wireless communication service is operative within the service region at a second time; and
means for causing a third mobile device to provide a user notification, at a third time, indicating whether or not the wireless communication service was operative within the service region responsive to the indication from the second mobile device whether or not the wireless communication service was operative within the service region.

6. A communication management method comprising:
obtaining, from at least one of a router device or a first mobile device, an indication of a wireless communication service having been established, between the mobile device and a network via the router device, within a service region at an first time;
obtaining, from a second mobile device, an indication whether or not the wireless communication service is operative within the service region at a second time; and
causing a third mobile device to provide a user notification, at a third time, indicating whether or not the wireless communication service was operative within the service region responsive to the indication from the second mobile device whether or not the wireless communication service was operative within the service region.

7. The communication management system of claim 1, wherein the obtaining, from at least one of a router device or a first mobile device, an indication of a wireless communication service having been established, between the mobile device and a network via the router device, within a service region at a first time includes:
obtaining, from at least one of a router device or a first mobile device, an indication of a global positioning system (GPS) location of the service region.

8. The communication management system of claim 1, wherein the obtaining, from at least one of a router device or a first mobile device, an indication of a wireless communication service having been established, between the mobile device and a network via the router device, within a service region at a first time includes:
obtaining, from at least one of a router device or a first mobile device, timing data indicating a time period where the wireless communication service was established, between the mobile device and a network via the router device, within a service region.

9. The communication management system of claim 1, wherein the causing a third mobile device to provide a user notification, at a third time, indicating whether or not the wireless communication service was operative within the service region responsive to the indication from the second mobile device whether or not the wireless communication service was operative within the first service region includes:

causing a third mobile device to provide a user notification, at a third time, displaying a map position associated with the wireless communication service within the service region.

10. The communication management system of claim 1, wherein the causing a third mobile device to provide a user notification, at a third time, indicating whether or not the wireless communication service was operative within the service region responsive to the indication from the second mobile device whether or not the wireless communication service was operative within the first service region includes:

causing a third mobile device to provide a user notification, at a third time, displaying a map indicating an approximate range of the router device.

11. The communication management system of claim 1, wherein the causing a third mobile device to provide a user notification, at a third time, indicating whether or not the wireless communication service was operative within the service region responsive to the indication from the second mobile device whether or not the wireless communication service was operative within the first service region includes:

causing a third mobile device to provide a user notification, at a third time, indicating one or more time periods where the router device goes offline.

12. The communication management system of claim 1, wherein the causing a third mobile device to provide a user notification, at a third time, indicating whether or not the wireless communication service was operative within the service region responsive to the indication from the second mobile device whether or not the wireless communication service was operative within the first service region includes:

causing a third mobile device to provide a user notification, at a third time, indicating whether or not the router device appears to be stationary.

13. The communication management system of claim 1, wherein the causing a third mobile device to provide a user notification, at a third time, indicating whether or not the wireless communication service was operative within the service region responsive to the indication from the second mobile device whether or not the wireless communication service was operative within the first service region includes:

causing a third mobile device to provide a user notification, at a third time, indicating whether or not a second wireless communication service proximate to the wireless service region was operative.

* * * * *

UNITED STATES PATENT AND TRADEMARK OFFICE
CERTIFICATE OF CORRECTION

PATENT NO. : 9,451,394 B2  
APPLICATION NO. : 13/732004  
DATED : September 20, 2016  
INVENTOR(S) : Barnes et al.

Page 1 of 1

It is certified that error appears in the above-identified patent and that said Letters Patent is hereby corrected as shown below:

In the Specification

In Column 1, Line 34 "U.S. patent application Ser. No. To Be Assigned" should be --U.S. patent application Ser. No. 13/731,907--

In Column 1, Line 44 "U.S. patent application Ser. No. To Be Assigned" should be --U.S. patent application Ser. No. 13/731,930--

In Column 1, Line 54 "U.S. patent application Ser. No. To Be Assigned" should be --U.S. patent application Ser. No. 13/731,952--

In Column 1, Line 64 "U.S. patent application Ser. No. To Be Assigned" should be --U.S. patent application Ser. No. 13/731,982--

Signed and Sealed this  
Seventh Day of March, 2017

Michelle K. Lee  
*Director of the United States Patent and Trademark Office*